(12) United States Patent
Nakayama

(10) Patent No.: US 9,166,816 B2
(45) Date of Patent: Oct. 20, 2015

(54) NETWORK SYSTEM AND AUDIO SIGNAL PROCESSOR

(75) Inventor: Kei Nakayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 981 days.

(21) Appl. No.: 12/580,144

(22) Filed: Oct. 15, 2009

(65) Prior Publication Data

US 2010/0150162 A1 Jun. 17, 2010

(30) Foreign Application Priority Data

Oct. 15, 2008 (JP) .................. 2008-266751
Oct. 15, 2008 (JP) .................. 2008-266760
Oct. 15, 2008 (JP) .................. 2008-266762

(51) Int. Cl.
*H04J 1/16* (2006.01)
*H04L 12/437* (2006.01)
*H04J 3/08* (2006.01)

(52) U.S. Cl.
CPC ............... *H04L 12/437* (2013.01); *H04J 3/085* (2013.01)

(58) Field of Classification Search
None
See application file for complete search history.

(56) References Cited

U.S. PATENT DOCUMENTS

| | | | | |
|---|---|---|---|---|
| 8,055,826 B2 * | 11/2011 | Janssen et al. | ............. | 710/110 |
| 2008/0025207 A1 * | 1/2008 | Akahane et al. | ............. | 370/217 |
| 2008/0232525 A1 * | 9/2008 | Nakayama et al. | ......... | 375/356 |
| 2009/0222606 A1 | 9/2009 | Janssen et al. | | |

FOREIGN PATENT DOCUMENTS

| | | | |
|---|---|---|---|
| EP | 1 575 200 A2 | 9/2005 | |
| EP | 1 575 200 A3 | 9/2005 | |
| EP | 2 045 962 A1 | 4/2009 | |
| JP | 06-069937 A | 3/1994 | |
| JP | 06-209327 A | 7/1994 | |
| JP | 09-326816 A | 12/1997 | |
| JP | 2000-101620 A | 4/2000 | |
| JP | 2000-134244 A | 5/2000 | |
| JP | 2000-183934 A | 6/2000 | |
| JP | 2002-261782 A | 9/2002 | |
| JP | 2005-333505 A | 12/2005 | |
| JP | 2007-259347 A | 10/2007 | |

(Continued)

OTHER PUBLICATIONS

European Search Report mailed Feb. 17, 2010, for EP Application No. 09173099.4, 10 pages.

(Continued)

*Primary Examiner* — John Blanton
*Assistant Examiner* — Thinh Tran
(74) *Attorney, Agent, or Firm* — Morrison & Foerster LLP

(57) ABSTRACT

In the case of forming an audio network system in which a plurality of processors each having two sets of transmission I/Fs and reception I/Fs are connected and a TL frame generated by a master node and including a plurality of storage regions for audio signals circulates among the processors in each constant period to transport audio signals the among processors, the system is configured such that when a transmitted TL frame does not return to the reception I/F on the forward side but returns to the reception I/F on the backward side in a single mode of transmitting the TL frame to the forward side and circulating the TL frame through one transmission route, the system shifts to a twin mode of transmitting and circulating TL frames through two transmission routes.

11 Claims, 31 Drawing Sheets

(56) References Cited

FOREIGN PATENT DOCUMENTS

| | | |
|---|---|---|
| JP | 2008-072363 A | 3/2008 |
| WO | WO-2006/108527 A1 | 10/2006 |

OTHER PUBLICATIONS

Partial European Search Report mailed Jan. 15, 2010, for EP Application No. 09173099.4, four pages.

BALCOM Co., Ltd. (Date Unknown). CobraNet™ Peak Audio, Inc., Product Description, located at <http://www.balcom.co.jp/cobranet.html>, last visited Sep. 10, 2009, with English Translation, four pages.

Conrad, C. (Nov. 30, 2004). "EtherSound in a Studio Environment," EtherSound News: News & Press room Latest News, located at <http://www.ethersound.com/news/getnews.php?enews_key=101>, last visited Mar. 21, 2006, four pages.

Foundation for MultiMedia Communications (2002). SONET/SDH: Description, located at <http://www.fmmc.or.jp/fm/nwmg/keyword/fujitsu/sonet.html>, last visited Sep. 10, 2009, with English Translation, seven pages.

Notification of Reason(s) for Refusal mailed on Dec. 11, 2012, for JP Application No. 2008-266760, with English Translation, four pages.

Notification of Reason(s) for Refusal mailed on Dec. 11, 2012, for JP Application No. 2008-266762, with English Translation, six pages.

Questioning mailed Aug. 20, 2013, for JP Application No. 2008-266760, with English translation, six pages.

Decision of Refusal mailed Mar. 5, 2013, for Japanese Patent Application No. 2008-266760, with English translation, 4 pages.

* cited by examiner

WAVEFORM DATA REGION

ETHERNET FRAME REGION

ITL FRAME REGION

FIG. 4A

ITL FRAME 110

| HEAD 111 | 112 | 113 | 114 | 115 | 116 | 117 | 118 | 118a | 119 TAIL |
|---|---|---|---|---|---|---|---|---|---|
| PREAMBLE | FRAME TYPE | DATA SIZE | ORIGIN ID | DESTINATION ID | TRANSMISSION SOURCE PORT | COMMAND TYPE | PARAMETER | DUMMY DATA | FCS |

FIG. 4B

ITL FRAME 120

| HEAD 111 | 112 | 119 TAIL |
|---|---|---|
| PREAMBLE | FRAME TYPE | FCS |

F I G. 1 1

| BACKWARD SIDE | | | FORWARD SIDE | | |
|---|---|---|---|---|---|
| NETWORK ID | NODE ID | MAC ADDRESS | NETWORK ID | NODE ID | MAC ADDRESS |
| — | — | 00-00-00-00-00-07 | — | — | 00-00-00-00-00-09 |
| — | — | 00-00-00-00-00-06 | — | — | 00-00-00-00-00-0A |
| — | — | 00-00-00-00-00-05 | — | — | 00-00-00-00-00-0B |
| — | — | 00-00-00-00-00-04 | — | — | — |
| ⋮ | ⋮ | ⋮ | ⋮ | ⋮ | ⋮ |

FIG. 16
(a) PROCESSORS A AND B ARE TURNED ON
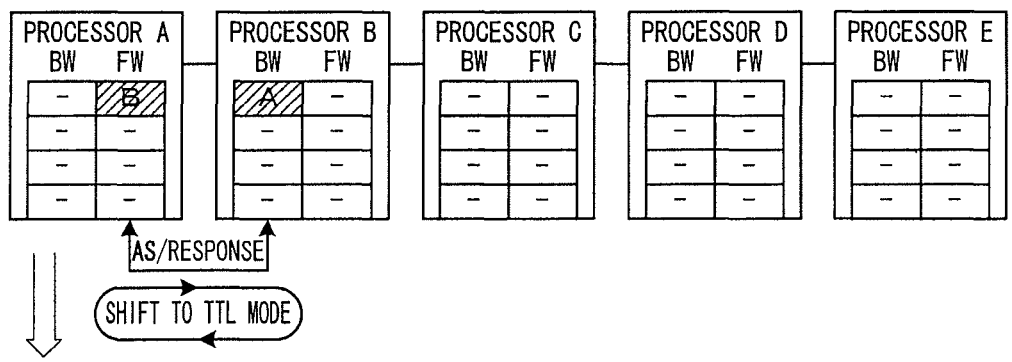
(b) PROCESSOR C IS TURNED ON
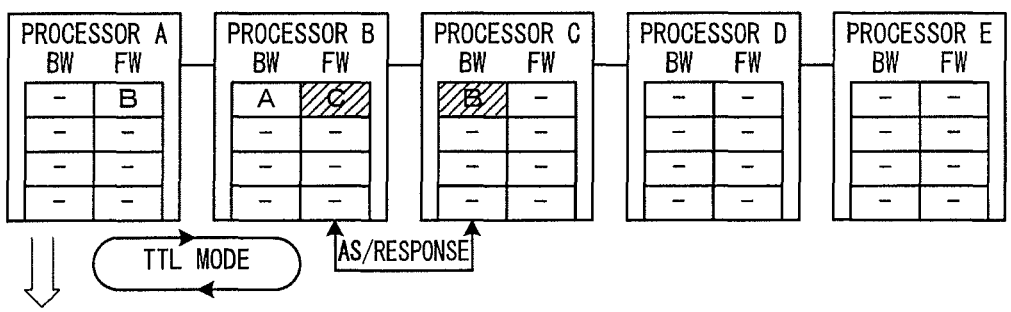
(c)
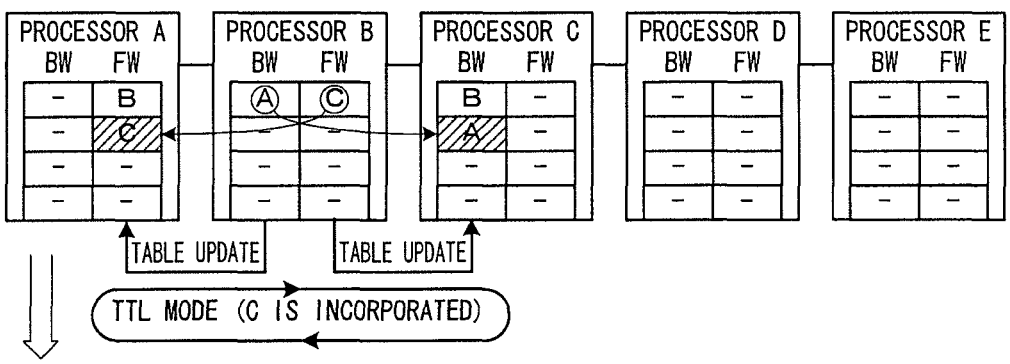
(d) PROCESSOR D IS TURNED ON
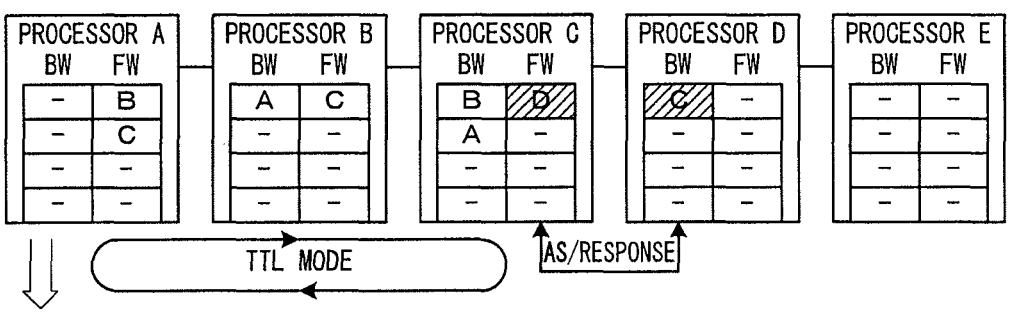

F I G. 1 7
(e)
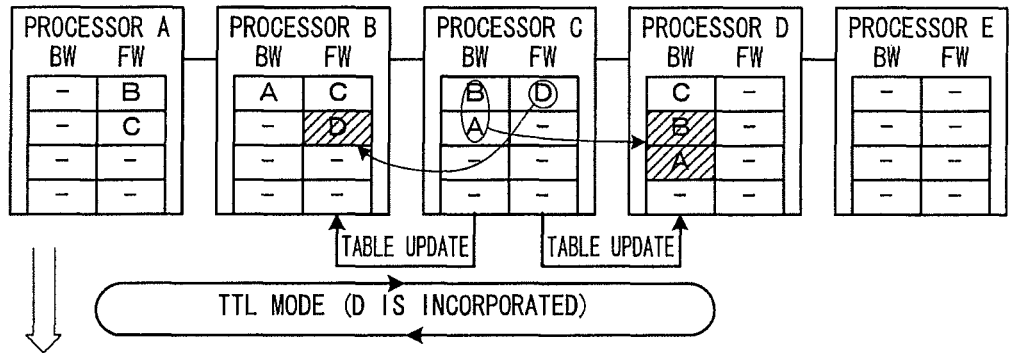
(f)
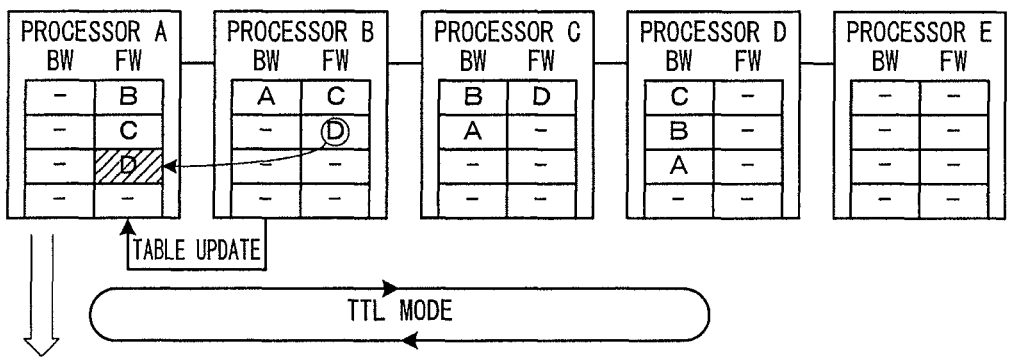
(g) PROCESSOR E IS TURNED ON
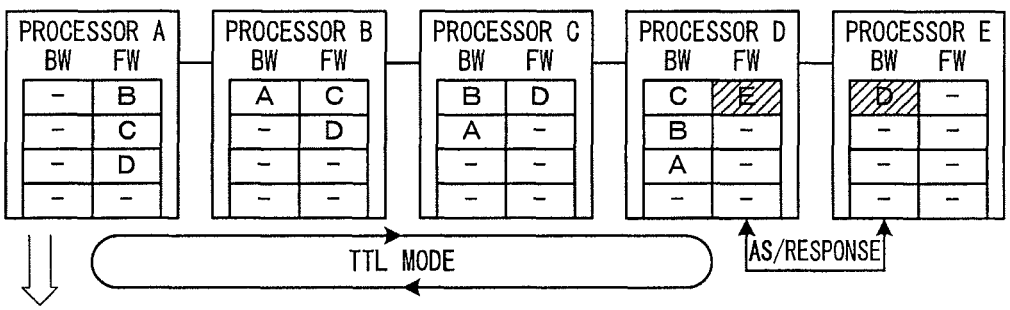
(h)
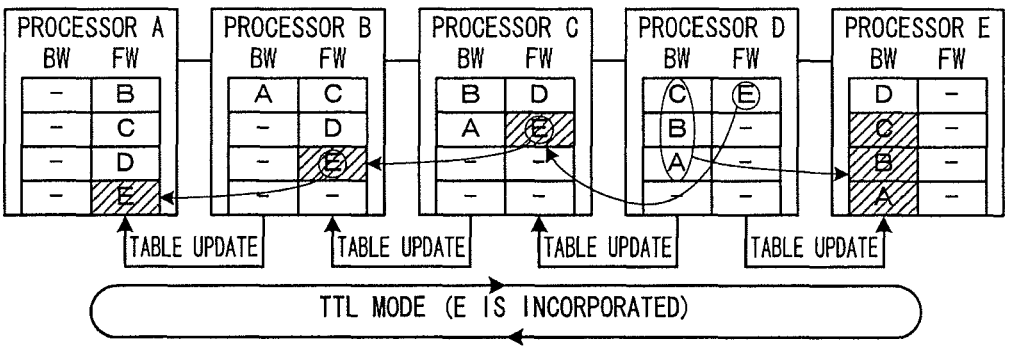

FIG. 20
(a)
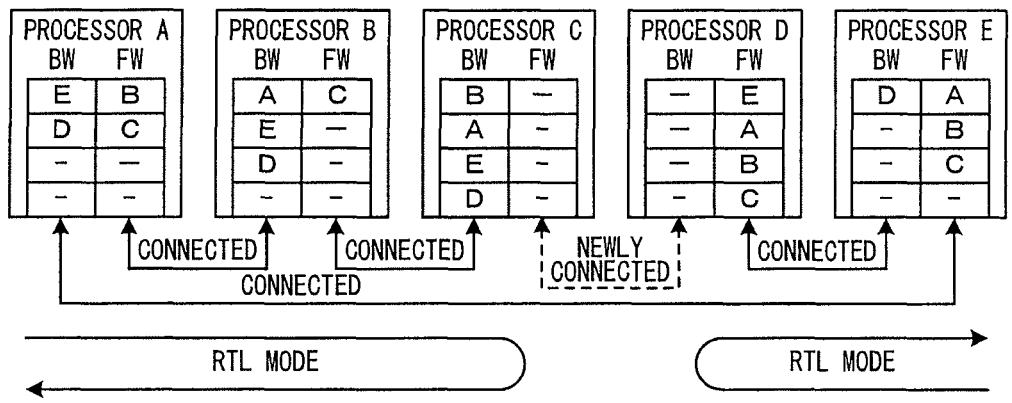
(b)
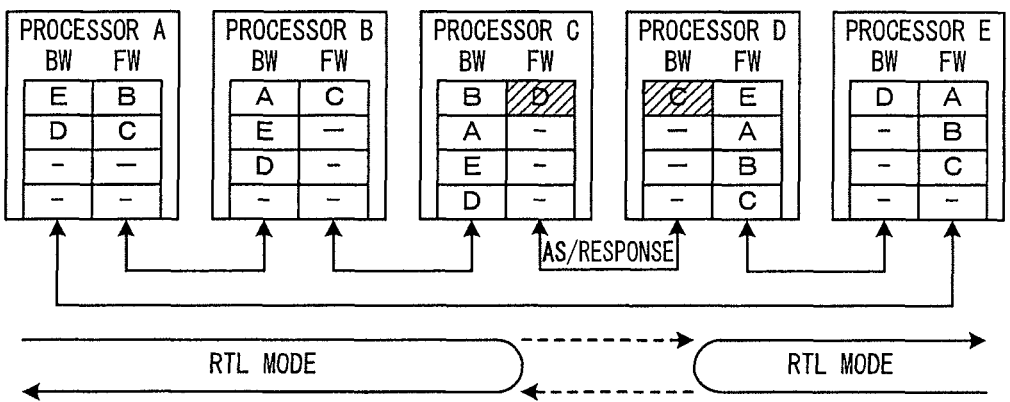
(c)
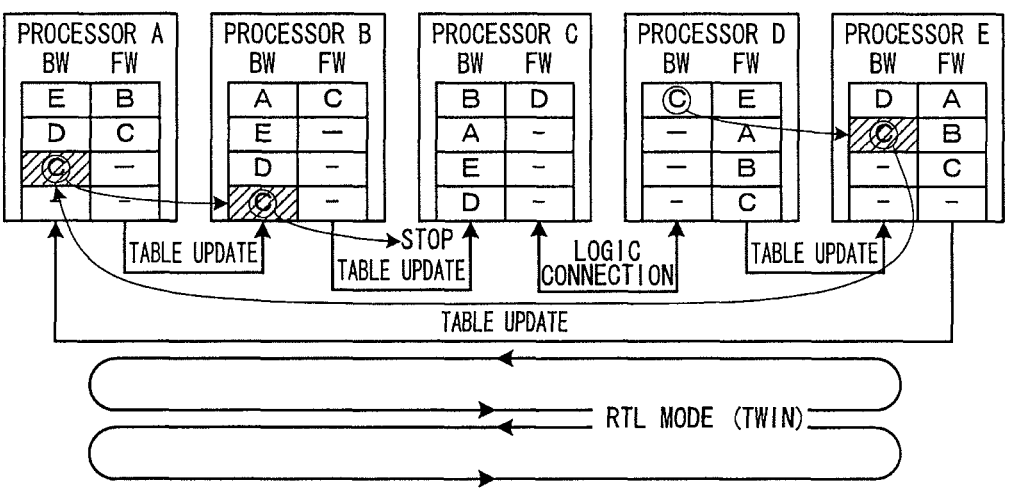

F I G. 3 4
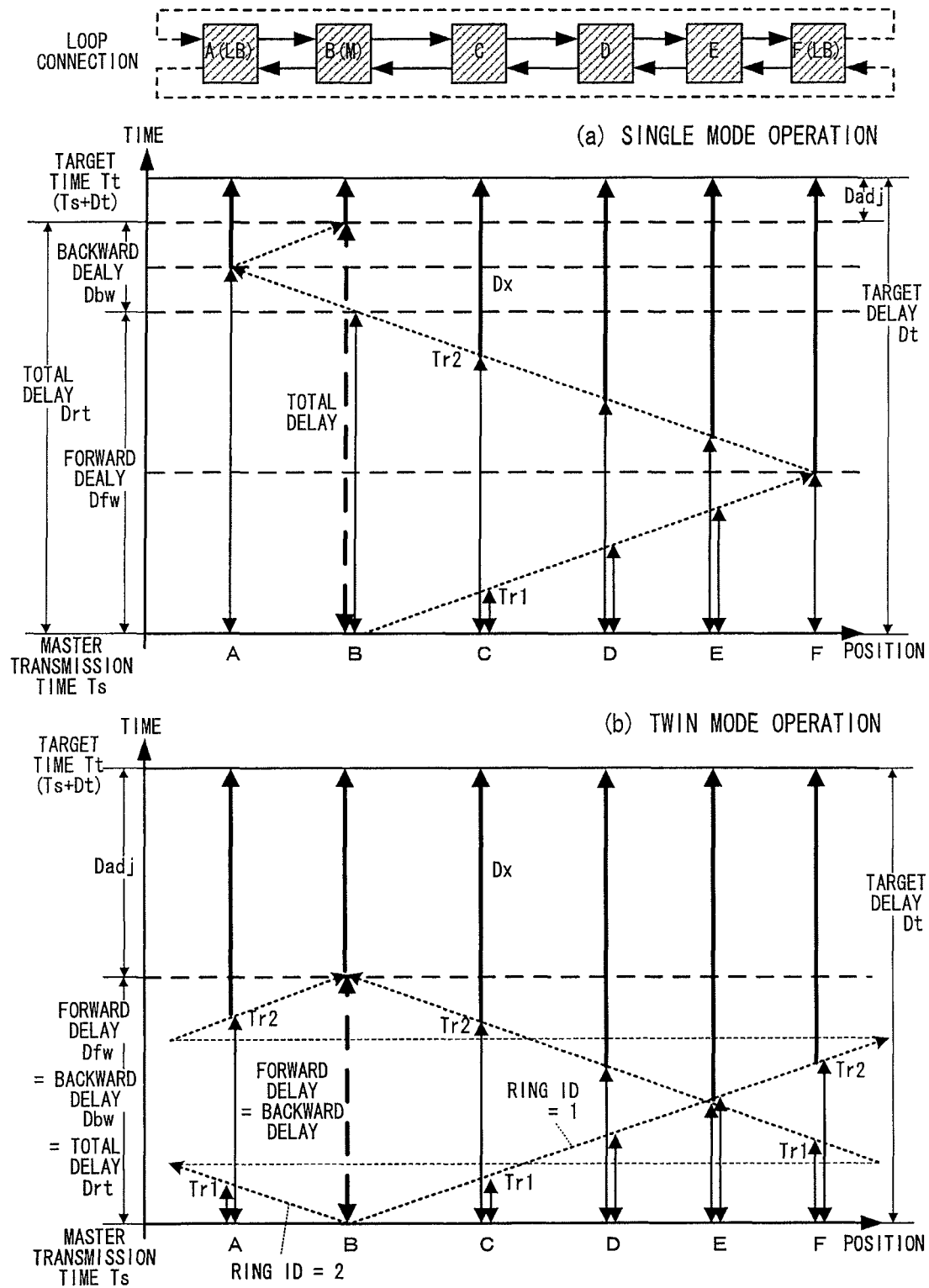

(c) CONNECTION BETWEEN NODE D AND E IS BROKEN

NETWORK SYSTEM AND AUDIO SIGNAL PROCESSOR

BACKGROUND OF THE INVENTION

1. Field of the Invention

The invention relates to a network system for transporting audio signals among a plurality of nodes and an audio signal processor capable of being incorporated into the network system as one node.

2. Description of the Related Art

Conventionally, an audio network system has been known for transporting audio signals between a plurality of nodes, and is used in concerts, dramas, music production, private broadcasting, and so on. Known examples of such an audio network system include CobraNet™, and EtherSound™ as described in the following Documents 1 and 2.

Document 1: "CobraNet™", [online], Balcom Co. [Retrieved on Mar. 21, 2006] Internet <URL: http://www.balcom.co.jp/cobranet.htm>

Document 2: Carl Conrad, "EtherSound™ in a studio environment", [online], Digigram S. A., [Retrieved on Mar. 21, 2006] Internet <URL: http://www.ethersound.com/news/get-news.php?enews_key=101>

Known methods of transmitting digital data includes the method called SONET/SDH disclosed in the following Document 3.

SONET/SDH is the generic name of SONET (Synchronous Optical NETwork) and SDH (Synchronous Digital Hierarchy) and is a standard of the optical transmission technique realizing speed up of the line by hierarchically stacking and multiplexing low-speed lines. SONET and SDH can be considered as substantially the same standards though their details are different, and can also be mutually connected. SONET/SDH is a transmission method that is the base for construction of MAN (Metropolitan Area Network).

SONET/SDH is designed to construct a high-speed and highly reliable network utilizing the ability of the optical fiber. SONET/SDH includes various functions for operation and management, and is excellent in the backup function of responding to disturbance of the line. This function is called a protection (switch) function, and a ring protection is famous in which SONET/SDH is configured in a ring shape called SONET/SDH ring (simply referred to as a "SONET ring").

Document 3: "SONET/SDH", [online], Foundation for MultiMedia Communications, [Retrieved on Jun. 27, 2007] Internet <URL: http://www.fmmc.or.jp/fm/nwmg/keyword/fujitsu/sonet.htm>

SUMMARY OF THE INVENTION

However, the conventional audio network systems described in the Documents 1 and 2 have the following problems.

Specifically, for example, in CobraNet (trademark), since a plurality of nodes transmit respectively generated frames (a plurality of frames) to a bus-type network, gaps between the frames occur, thus causing a problem of low transport efficiency.

Further, it is needed to configure the system in such a manner that data of a required number of channels can be transported in consideration of the transmission route of the frames because the physical transportation limit of number of channels varies due to change of wires between nodes (the configuration of the network), thus causing a problem of difficulties in designing the system.

This is because the time required to transmit data from a transmission source node to a node at the end varies depends on the number of nodes, and also because it takes long time to transfer data when a larger number of nodes constitute the network because the subsequent communication starts after the data is transmitted to all of the nodes, resulting in a loss of band, and so on.

Besides, in EtherSound™, any measure to prevent sound interruption upon occurrence of a fault is not taken, causing a problem of stop of sound when disconnection of the wire between the nodes occurs. Another problem is that since a plurality of packets are included in a frame, the transport control becomes complicated and the data transmission rate (amount/time) is not enough.

It is needed to configure the system in such a manner that data of a required number of channels can be transported in consideration of the transmission route of the frames, as in the case of CobraNet (trademark), thus causing still another problem of difficulties in designing it.

Hence, Yamaha Corporation has proposed, as a technique to solve the above-described problems, an audio network system having a ring transmission route in which an audio transport frame circulates in a constant period as described in the following Document 4.

Document 4: Japanese Patent Laid-open Publication No. 2007-259347

In this audio network system, waveform data is written solidly into the audio transport frame, so that the management of transportation is easy and the communication band can be efficiently utilized to perform audio transport. Since the audio transport frame circulates through all of the nodes in the system, wiring between the nodes can be easily changed regardless of the transmission route of the frame.

Further, even when an abnormality occurs in some nodes in the system, the part where the abnormality has occurred can be easily separated from the system and the remaining part of the system can keep operating.

Document 4 discloses that one transmission route for the audio transport frame is formed in cascaded nodes constituting the system, and while the frame is circulating through the one transmission route, if the nodes at both ends of the cascade are connected to each other so that the connection among the nodes is brought into a loop shape, two transmission routes for the audio transport frame are formed so that frames circulate through the respective transmission routes.

The Document 4 also discloses that the nodes constituting the system are connected in a loop shape to form two transmission routes for the audio transport frame so that when a failure occurs between two nodes and communication is disabled there, the transport of the frame is looped back on both sides of the failure, whereby the system functions as a system having one transmission route in which the nodes are cascaded, so as to continue the transport of audio signals among the nodes.

However, the process of shifting from/to a state in which one transmission route for the audio transport frame is formed and a frame circulates through the transmission route to/from a state in which two transmission routes for the audio transport frame are formed and frames circulate through the transmission routes respectively, is somewhat complicated in the method disclosed in Document 4, and therefore a control method executable simply and at a high speed is demanded.

The ring protection in SONET/SDH disclosed in Document 3 is similar to the system disclosed in Document 4 in that the communication among the nodes can be continued even if a failure occurs in the communication at a part of the nodes connected in the loop shape as described above.

However, applying the process of ring protection in the ring protection to the system disclosed in Document 4 is difficult for the following reason.

Namely, SONET/SDH includes an excellent protection mechanism but is not originally the data transmission method for a professional audio system, and therefore has some troubles when it is used for the usage of the professional audio system (live audio, public address, preproduction, postproduction, broadcast facilities, and so on) which transports audio signals.

More specifically, since SONET/SDH is not aimed at real-time transport of audio signals, a delay of 10 milliseconds or more occurs from when a signal is inputted into a node till when the signal is transmitted to another node and outputted from the other node. The delay time is not fixed but varies depending on from which transmission node the data is transmitted to which reception node. The maintenance of communication at occurrence of failure is not performed in real time, but a time period of several milliseconds is required from when the failure occurs till when transport through another route is started to miss 100 samples or more assuming that the sampling frequency is 96 kHz (kilohertz).

The invention has been made in consideration of the above points, and its object is to make it possible for a network system in which an audio transport frame generated by a master node and including a plurality of regions for audio signals circulates along a loop transmission route formed among nodes to transport audio signals among the series of connected nodes, to shift automatically and in a short time by a simple process from/to a state in which one transmission route for the audio transport frame is formed and a frame circulates through the transmission route to/from a state in which two transmission routes for the audio transport frame are formed and frames circulate through the transmission routes respectively.

Further, Yamaha Corporation also proposed a technique to make it possible to stably transmit a timing of a wordclock indicating the reference of a timing to process transported audio signals using the same transmission route as that for the waveform data in the network system as disclosed in the following Document 5.
Document 5: Japanese Patent Laid-open Publication No. 2008-72363

However, the technique disclosed in the Document 5 is a technique that is useful for the case where nodes constituting the system are cascaded to form one transmission route for the audio transport frame and a frame circulates through the transmission route, but is difficult to apply to the case where the nodes are connected in loop form to form two transmission routes for the audio transport frame and frames circulate through the transmission routes respectively.

The invention has been made also in consideration of the above points, and its object is to make a network system, in which an audio transport frame generated by a master node and including a plurality of regions for audio signals circulates along a loop transmission route formed among nodes to transport audio signals among the series of connected nodes, such that even when the nodes constituting the system are connected in a loop form to form two transmission routes for the audio transport frame and frames circulate through the transmission routes respectively, a timing of a wordclock can be stably transmitted using the same transmission route as that for the audio signals.

In order to achieve the above-described object, network system of the invention is a network system constructed by connecting in series a plurality of nodes respectively having two sets of receivers and transmitters each performing communication in a single direction in such a manner that one set of the receiver and transmitter in one node are connected with one set of the transmitter and receiver in a next node by communication cables, respectively, wherein among the nodes connected in series, if there is an end node in which only one set of the receiver and the transmitter are connected with the next node, the end node performs a loopback transmission wherein the end node transmits a frame received by the receiver in the one set from the transmitter in the same set, and each of the nodes other than the end node in which both sets of the receivers and the transmitters are connected with the next nodes performs a straight transmission wherein the node transmits a frame received by the receiver in one set from the transmitter in another set, thereby a ring transmission route is formed among the nodes connected in series, one of the nodes operates as a master node, an audio transport frame generated by the master node circulates along the formed ring transmission route at a constant period, the audio transport frame including a plurality of storage regions for audio signals, and each of the nodes writes and/or reads audio signals to/from the audio transport frame to thereby transport the audio signals between the nodes connected in series, the master node operates in an operation mode selected at least from a single mode in which the master node transmits the audio transport frame generated by the master node from the transmitter in one set among the two sets at the constant period, and a twin mode in which the master node transmits the audio transport frame generated by the master node from the respective transmitters in the two sets at the constant period, the master node including following devices for operation in the single mode: a first judging device that judges whether or not the master node receives, within a first predetermined time after transmitting an audio transport frame from the transmitter in the one set, the audio transport frame by the receiver in the same set; a second judging device that judges whether or not the master node receives, within a second predetermined time after transmitting an audio transport frame from the transmitter in the one set, the audio transport frame by the receiver in another set; and a mode shifting device that shifts the master node to operation in the twin mode, if judge by the first judging device is positive and judge by the second judging device is negative.

In such a network system, it is preferable that the master node includes: a first clock generator that generates a wordclock for transmission at constant period which indicates transmission timing of the audio transport frame; a second clock generator that generates a wordclock for signal processing which corresponds to the wordclock for transmission delayed by a predetermined target delay; a signal processor that processes audio signals in synchronization with the wordclock for signal processing; and a writing device that writes a reference information for reproducing timing of the wordclock for signal processing into respective audio transport frames which the master node transmits, each of the nodes other than the master node includes; a wordclock generator that generates a wordclock for signal processing with its phase almost same as that of the wordclock for signal processing generated in the master node, based on the reference information written in the audio transport frames received by the node and reception timing of the audio transport frames; and a signal processor that processes audio signals in synchronization with the wordclock for signal processing generated by the word clock generator of the node, and fluctuation of the phase of the wordclock for signal processing generated in each of the nodes other than the master node is suppressed even when operation mode of the master node shifts from the single mode to the twin mode, because of timing control on wordclock generation based on the reference information and the reception timing by the wordclock generator of the node.

Alternatively, it is also preferable that, when a master node is newly determined in the network system or the whole network system is reset, the master node starts operation in the single mode.

Alternatively, it is also preferable that, when two the end nodes are connected to each other and as a result the nodes constructing the network system are connected in loop form, the connected end nodes stop the loopback transmission and start the straight transmission as nodes other than the end nodes in one to several cycles of the circulation, thereby two ring transmission routes each having opposite directions are formed among the nodes connected in loop form.

Alternatively, it is also preferable that the end node includes a detector that detects connection with another node newly provided at the receiver and the transmitter in another set other than the one set, and when the detector detects the connection with the another node, the end node automatically changes its operation from the loopback transmission to the straight transmission.

Further, in the above network systems, it is also preferable that wherein while the master node operates in the twin mode, the master node generates one audio transport frame and transmits the generated one audio transport frame to each of the two ring transmission routes every period of the constant period, and each of the plurality of nodes writes and/or reads audio signals to/from only the audio transport frame circulating along predetermined one transmission route among the two ring transmission routes.

Alternatively, in the above network systems, it is also preferable that while the master node operates in the twin mode, the master node generates two audio transport frames respectively corresponding to the two ring transmission routes and transmits the generated audio transport frames to the corresponding transmission route every period of the constant period, and each of the plurality of nodes writes and/or reads audio signals to/from only the audio transport frame circulating along predetermined one transmission route among the two ring transmission routes.

Alternatively, in the above network systems, it is also preferable that while the master node operates in the twin mode, the master node generates two audio transport frames respectively corresponding to the two ring transmission routes and transmits the generated audio transport frames to the corresponding transmission route every period of the constant period, and each of the plurality of nodes writes and/or reads audio signals to/from the audio transport frame circulating along predetermined one or two transmission route among the two ring transmission routes.

Further, in the above network systems, it is also preferable that an error check code is included in the audio transport frame which the master node generates, and each of the nodes other than the master node detects an error in the received audio transport frame based on the error check code included in the audio transport frame, and if the node detects an error in the received audio transport frame, the node prevents the audio signals read from the received audio transport frame from being outputted from the node.

An audio signal processor of the invention is an audio signal processor which can be included in the above described network systems as a node being capable of operating as a master node.

Further, another network system according to the invention is a network system constructed by connecting in series a plurality of nodes respectively having two sets of receivers and transmitters each performing communication in a single direction in such a manner that one set of the receiver and transmitter in one node are connected with one set of the transmitter and receiver in a next node by communication cables, respectively, and further connecting one end node of the series with another end node of the series, thereby connecting the plurality of nodes in loop form, wherein each of the nodes connected in loop form performs a straight transmission wherein the node transmits a frame received by the receiver in one set from the transmitter in another set, thereby two ring transmission routes each having opposite directions are formed among the nodes connected in loop form, one of the nodes operates as a master node, audio transport frame generated by the master node circulates along the formed two ring transmission routes respectively at a constant period, the audio transport frame including a plurality of storage regions for audio signals, and each of the nodes writes and/or reads audio signals to/from the audio transport frame circulating along at least one transmission route to thereby transport the audio signals between the nodes connected in loop form, the master node is capable of operating in a single mode in which the master node transmits the audio transport frame generated by the master node from the transmitter in one set among the two sets at the constant period in addition to a twin mode in which the master node transmits the audio transport frame generated by the master node from the respective transmitters in the two sets at the constant period, each of the nodes connected in loop form includes: a detector that detects disconnection from the another node at the receiver and the transmitter in one set; and an operation switching device that, when the detector detects the disconnection, in one to several cycles of the circulation, stops the straight transmission which the node performs and has the node start a loopback transmission wherein the node transmits a frame received by the receiver in another set other than the one set at which the disconnection is detected from the transmitter in the another set, and the master node including following devices for operation in the twin mode: a judging device that judges whether or not the master node receives the audio transport frame transmitted from the transmitter in at least one set, by the receiver in the set same as that of the transmitter used for the transmission; and a shifting device that shifts the master node to operation in the single mode, if judge by the judging device is positive.

In such a network system, it is preferable that the judging device of the master node includes a writing device that writes an identification data to identify the set to which the transmitter used for transmission of the audio transport frame belongs, into the audio transport frame transmitted from the two transmitters, respectively, and the judging device judges whether or not the master node receives the audio transport frame transmitted from the transmitter in at least one set, by the receiver in the set same as that of the transmitter used for the transmission, based on the identification data written in the audio transport frame each of the receiver receives.

Alternatively, it is also preferable that, the master node includes: a first clock generator that generates a wordclock for transmission at constant period which indicates transmission timing of the audio transport frame; a second clock generator that generates a wordclock for signal processing which corresponds to the wordclock for transmission delayed by a predetermined target delay; a signal processor that processes audio signals in synchronization with the wordclock for signal processing; and a writing device that writes a reference information for reproducing timing of the wordclock for signal processing into respective audio transport frames which the master node transmits, each of the nodes other than the master node includes; a wordclock generator that generates a wordclock for signal processing with its phase almost same as that of the wordclock for signal processing generated in the master node, based on the reference information written in the audio transport frames received by the node and reception timing of the audio transport frames; and a signal processor that processes audio signals in synchronization with the wordclock for signal processing generated by the word clock generator of the node, and fluctuation of the phase of the wordclock for signal processing generated in each of the nodes other than the master node is suppressed even when operation mode of the master node shifts from the twin mode to the single mode, because of timing control on wordclock generation based on the reference information and the reception timing by the wordclock generator of the node.

Alternatively, it is also preferable that an error check code is included in the audio transport frame which the master node generates, and each of the nodes other than the master node detects an error in the received audio transport frame based on the error check code included in the audio transport frame, and if the node detects an error in the received audio transport frame, the node prevents the audio signals read from the received audio transport frame from being outputted from the node.

Another audio signal processor of the invention is an audio signal processor which can be included in the above described network systems as a node being capable of operating as a master node.

Further, still another network system according to the invention is a network system constructed by connecting in series a plurality of nodes respectively having two sets of receivers and transmitters each performing communication in a single direction in such a manner that one set of the receiver and transmitter in one node are connected with one set of the transmitter and receiver in a next node by communication cables, respectively, and further connecting one end node of the series with another end node of the series, thereby connecting the plurality of nodes in loop form, wherein each of the nodes connected in loop form performs a straight transmission wherein the node transmits a frame received by the receiver in one set from the transmitter in another set, thereby two ring transmission routes each having opposite directions are formed among the nodes connected in loop form, one of the nodes operates as a master node, audio transport frame generated by the master node circulates along the formed two ring transmission routes respectively at a constant period, the audio transport frame including a plurality of storage regions for audio signals, and each of the nodes writes and/or reads audio signals to/from the audio transport frame circulating along at least one transmission route to thereby transport the audio signals between the nodes connected in loop form, the master node including: a first clock generator that generates a wordclock for transmission at constant period which indicates transmission timing of the audio transport frame; a timing device that times a transmission time from when the master node transmits the audio transport frame to when the audio transport frame returns to the master node through the transmission route; regarding at least one of the two ring transmission routes; a writing device that writes information on the transmission time timed by the timing device into the audio transport frame which the master node transmits; a second clock generator that generates a wordclock for signal processing which corresponds to the wordclock for transmission delayed by a predetermined target delay; and a signal processor that processes audio signals in synchronization with the wordclock for signal processing, each of the nodes other than the master node including; a timer that detects reception time of the audio transport frame regarding each of the two ring transmission routes; a reader that reads the information on the transmission time from the received audio transport frame; a wordclock generator that generates a wordclock for signal processing based on the predetermined target delay, two reception times detected by the timer, and the transmission time read by the reader; a signal processor that processes audio signals in synchronization with the wordclock for signal processing generated by the word clock generator of the node, and wherein phase of the wordclock for signal processing generated in each of the nodes constituting the network system is almost consistent with phase obtained by delaying the wordclock for transmission generated by the first clock generator of the master node by the predetermined target delay.

In such a network system, it is preferable that in each of the nodes other than the master node, the word clock generator generates the wordclock for signal processing according to a timing obtained by delaying the reception time Tr2 by a delay amount Dx given by $$Dx=Dt-(Dfw+Tr2-Tr1)/2$$

where Dt is the predetermined target delay, Tr1 is earlier one of the two reception times detected by the timer, Tr2 is later one of the two reception times, and Dfw is the transmission time read by the reader.

Alternatively, it is also preferable that in each of the nodes other than the master node, the word clock generator generates the wordclock for signal processing according to a timing obtained by delaying the reception time Tr1 by a delay amount Dx given by $$Dx=Dt-(Dfw-Tr2+Tr1)/2$$

where Dt is the predetermined target delay, Tr1 is earlier one of the two reception times detected by the timer, Tr2 is later one of the two reception times, and Dfw is the transmission time read by the reader.

Still another audio signal processor of the invention is an audio signal processor which can be included in the above network system as a node constituting the network system.

The above and other objects, features and advantages of the invention will be apparent from the following detailed description which is to be read in conjunction with the accompanying drawings.

BRIEF DESCRIPTION OF THE DRAWINGS

FIG. 4A and FIG. 4B are illustrations showing data configurations of ITL frames;

FIG. 11 is a table showing an example of the topology table;

FIG. 16 is an illustration showing a concrete example of a procedure of forming the audio network system;

FIG. 17 is an illustration showing continuation of the procedure in FIG. 16;

FIG. 20 is an illustration showing yet another example thereof;

FIG. 34 is illustrations showing examples of the arrival timing of the head of the TL frame at each of the nodes constituting the audio network system;

DETAILED DESCRIPTION OF THE PREFERRED EMBODIMENTS

Hereinafter, preferred embodiments to embody the invention will be concretely described based on the drawings.

1. Outline of Audio Network System of Embodiment of the Invention 1.1 Entire Configuration FIG. 1A to FIG. 1C show the outline of an audio network system that is an embodiment of a network system of the invention.

Figure 1A:
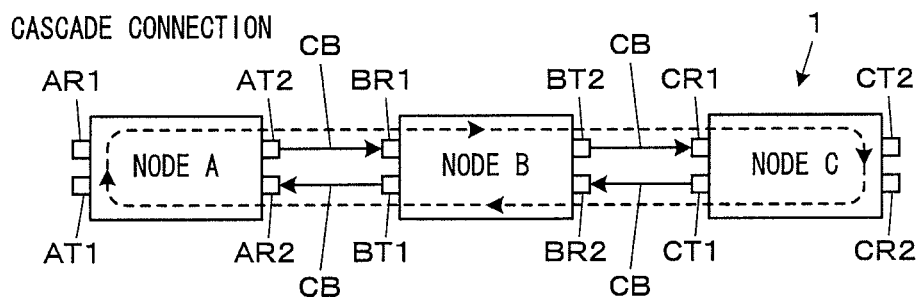
FIG. 1A to FIG. 1C are diagrams showing the outline of an audio network system that is an embodiment of a network system of the invention.
Figure 1B:
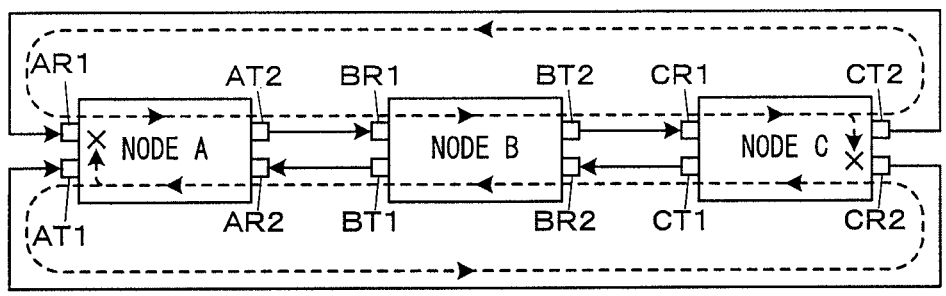
Figure 1C:
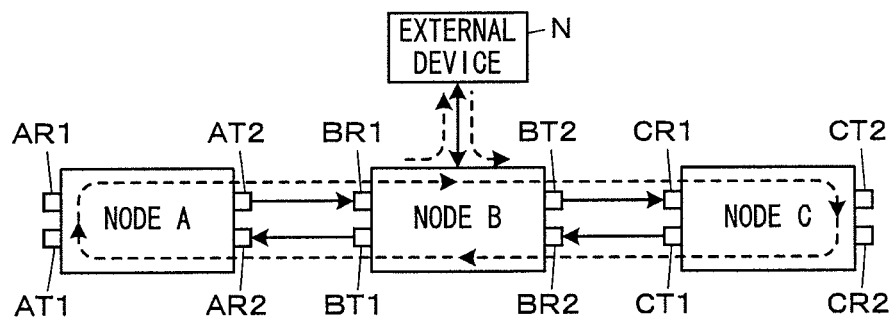

As shown in FIG. 1A and FIG. 1B, the audio network system 1 is constructed by connecting nodes A to C by communication cables CB in sequence, each of the nodes A to C including two sets of reception interfaces (I/Fs) being receivers and transmission I/Fs being transmitters each of which performs communication in a singe direction. Although an example composed of three nodes is shown, any number of nodes may be employed.

In the node A, a reception I/F AR1 and a transmission I/F AT1 are one set of I/Fs, and a reception I/F AR2 and a transmission I/F AT2 are another set of I/Fs. For the nodes B and C, the same relation also applies to I/Fs with a first character of symbol "B" or "C" in place of "A."

The connection between the nodes is established by connecting one set of reception I/F and transmission I/F to one set of transmission I/F and reception I/F of another node via the communication cables CB, respectively. For example, between the node A and the node B, the reception I/F AR2 is connected with the transmission I/F BT1, and the transmission I/F AT2 is connected with the reception I/F BR1. Further, between the node B and the node C, another set of I/Fs in the node B are connected with one set of I/Fs in the node C.

Note that the nodes shown in FIG. 1A to FIG. 1C are audio signal processors having various kinds of functions such as analog input, analog output, digital input, digital output, mixing, effect addition, recording/reproduction, remote control, or combinations thereof. It is of course adoptable that each node has a different function.

The state in which the nodes are connected as one line having ends as shown in FIG. 1A shall be called "cascade." In this case, the cables CB connecting between the nodes can be used to form one ring data transmission route as shown by a broken line, so that each node can perform transmission/reception of data to/from any node on the route by transmitting a frame over the route in a manner to circulate it in a constant period and reading/writing necessary information from/into the frame. The operation state where the one ring data transmission route is constructed in the system shall be called a "single mode."

In the audio network system 1, one node becomes a master node, which generates a frame for transporting audio signals, periodically circulates the frame over the transmission route, and manages the network. The frame generated by the master node shall be called a "TL (Transporting Lorry) frame" distinguished from other frames.

Connecting I/Fs which are not used in the nodes at both ends by using communication cables CB in addition to the cascade shown at FIG. 1A, two ring data transmission routes can be formed as shown in FIG. 1B. Each of the nodes can perform transmission/reception of data to/from any node on the routes by transporting a frame over the routes and reading/writing necessary information from/into the frame. The connection status among the nodes shall be called a "loop connection." The operation state where the two ring data transmission routes are constructed in the system shall be called a "twin mode."

In the audio network system 1, however, the single mode is the basic operation mode, and whether the operation in the twin mode is permitted or not is set in the master node in advance and transferred from the master node to the nodes constituting the system. If the setting that the operation in the twin mode is not permitted has been made in the master node, the operation in the single mode is continued even if the loop connection is made as described later. Accordingly, the connection status of the nodes and the operation state of the system do not always correspond to each other.

Further, although two cables are shown in FIG. 1A to FIG. 1C, one cable which is made by bundling the two cables together can also be used to establish connection between one set of I/Fs, as long as the reception I/F and transmission I/F in one set are adjacently or integrally provided.

Further, when each node is provided with a necessary I/F, an external device N can be connected thereto as shown in FIG. 1C so that the node can write data received from the external device N into the TL frame and transmit the TL frame to another node and to transmit the data read out from the TL frame to the external device N.

As such an external device N, for example, an external console is conceivable. It is also conceivable that the console transmits a command in accordance with an operation accepted from a user, to the node B, thereby causing operations such that the node B writes the command into the TL frame and transmits it to another node, or the node B reads out a response, level data or the like which has been written into the TL frame and transmitted by the another node, and transmits it to the console, so as to use it for display of the state of a control or level display in the console.

1.2 Configuration of TL Frame

Figure 2:
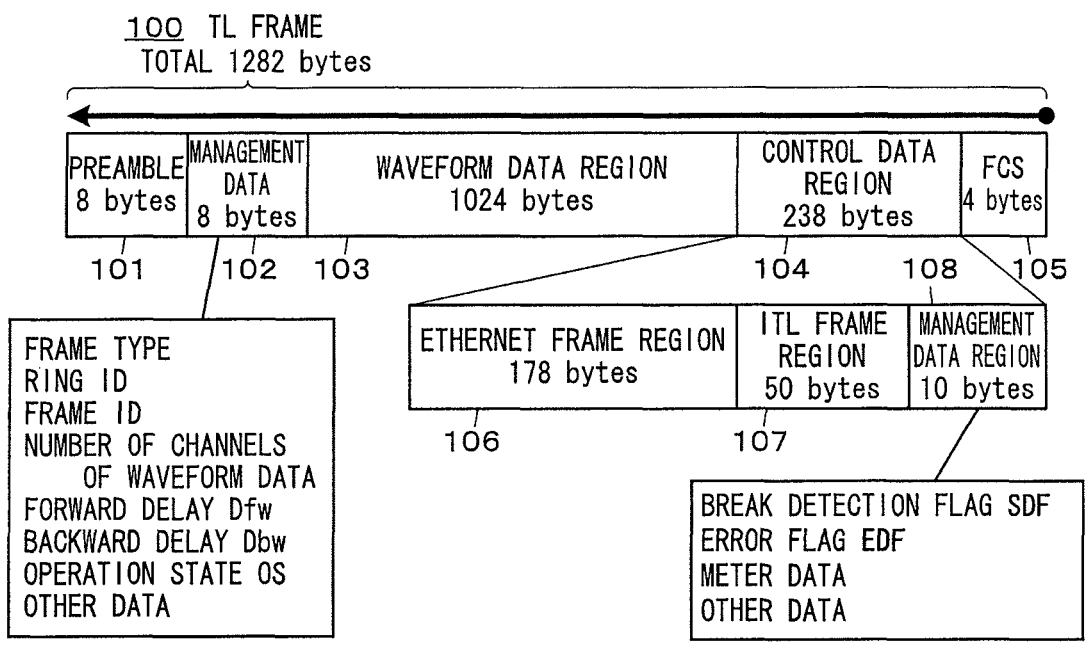
FIG. 2 is an illustration showing a configuration example of a TL frame transported through transmission routes shown in FIG. 1A to FIG. 1C.
Figure 3A:
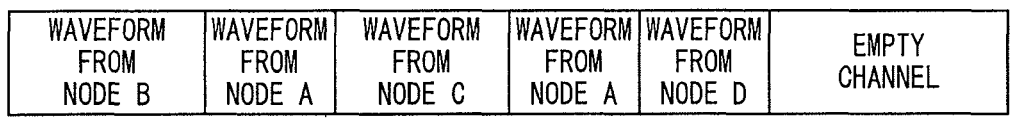
FIG. 3A to FIG. 3C are illustrations respectively showing more detailed configurations of a waveform data region, an Ethernet frame region, and an ITL frame region in the TL frame shown in FIG. 2.
Figure 3B:
Figure 3C:

Next, a configuration example of the TL frame that is transported through the above-described transmission routes is shown in FIG. 2. FIG. 3A to FIG. 3C respectively show more detailed configurations of a waveform data region, an Ethernet frame region, and an ITL (Initial Transporting Lorry) frame region in the TL frame. Note that the widths of the regions shown in these drawings do not necessarily correspond to data sizes.

As shown in FIG. 2, the TL frame 100 has a size of 1282 bytes, and is composed of regions such as a preamble 101, management data 102, waveform data (audio data) region 103, control data region 104, and FCS (Frame Check Sequence) 105 in sequence from the head. The size of each region is fixed irrespective of the data amount to be written in the region. Further, the sizes of the regions other than the FCS 105 shown here are just examples and may be changed as required.

The preamble 101 is data of 8 bytes in total, in which preamble defined by IEEE (Institute of Electrical and Electronic Engineers) 802.3 and SFD (Start Frame Delimiter) are written.

Note that it is not so worthwhile to write the address in the audio network system 1 because the frame transmitted from a transmission I/F arrives only at the reception I/F which is connected by one communication cable CB. Hence, it is not necessary to write a destination address in the TL frame 100, and therefore the region to write the destination address is not provided here.

Further, the management data 102 is data of 8 bytes, in which a frame type for discriminating the kind of the frame, a ring ID indicating the transmission route in the system through which the frame circulates, a frame ID that is a frame serial number, the number of channels of the waveform data in the waveform data region 103, a forward delay Dfw and a backward delay Dbw which are used for later-described timing adjustment of wordclock, an operation state OS of the system and so on are written as the data to be used in management of data written in the TL frame by each of the nodes in the audio network system 1. Note that the ring ID written here may be regarded as an ID specifying the transmission route in the system as well as specifying the system itself.

As the frame type, data indicating that the frame is the TL frame is written. When the twin mode is not permitted, there is only one transmission route in the system, and the ring ID therefore has a fixed value. As the frame ID, it is preferable to give a TL frame a number indicating that the TL frame is a frame in what number of period. In addition, for the loop connection, the same frame ID is given to the TL frames in the same period which circulate through the two transmission routes so that they are recognized as the frames in the same period.

As the waveform data region 103, 1024 bytes are secured, and waveform data of 32 bits for 1 sample can be written for 256 channels as data of audio signals. In other words, in this system, the audio signals corresponding to the 256 channels can be transmitted by circulating one TL frame 100 as an audio transport frame. Note that it is not necessary to concern about what is written in regions of channels not in use for transmission (empty channels) in the 256 channels. In this embodiment, even when the number of bits of the waveform data to be transmitted is not 32 but, for example, 16 or 24, the 32-bit region is prepared for each channel to write the waveform data therein. However, the size of the regions for each channel may be changed depending on the number of bits of the waveform data. In this case, the 16-bit waveform data of 512 channels can be transmitted, and the 24-bit waveform data of 340 channels can be transmitted.

As shown in FIG. 3A, channels in the waveform data region 103 are allocated in advance to the nodes constituting the audio network system 1, and each of the nodes writes output waveform data at positions of the channels that have been allocated to the node. The allocation of the channels is performed by a controller (for example, a control CPU in any of the nodes, or the external device shown in FIG. 1C) which controls the whole system, and the allocation can be changed when necessary while the system is operating. It is not always necessary to allocate channels at contiguous positions to the nodes, and it is also adoptable to keep empty channels which are not allocated to any nodes.

On the other hand, as the control data region 104, 238 bytes are prepared, in which an Ethernet frame region 106, an ITL frame region 107, and a management data region 108 are provided.

In the Ethernet frame region 106 among the regions, a frame in the IEEE (Institute of Electrical and Electronic Engineers) 802.3 format (an Ethernet frame) that is obtained by framing the IP packet for inter-node communication based on the IP (Internet Protocol) is written.

If the Ethernet frame to be written exceeds the prepared size (178 bytes, here), the Ethernet frame is divided into a necessary number of blocks on the transmission side processor, and each of the blocks is written into one TL frame. Then the above described necessary number of TL frames are transported to the destination, and the destination processor reads out respective blocks from the respective TL frames 100 and combines the blocks together to restore the Ethernet frame before division, whereby the Ethernet frame can be transported between the nodes in a similar manner to the regular transport based on the Ethernet (registered trademark).

The maximum size of the IEEE 802.3 frame is 1526 bytes. On the other hand, about 170 bytes can be transmitted for each one TL frame even if division control data of several bytes is added for controlling division and restoration. Accordingly, transmission of one Ethernet frame is completed by nine TL frames at maximum.

Details of data to be written into the Ethernet frame region 106 are shown in FIG. 3B.

Among those data, number of blocks is data indicating how many blocks a frame to be transmitted has been divided.

Block ID is data indicating the position (number) of the block written in the Ethernet frame region 106 among the divided blocks.

Transmission source ID is data indicating the node which has written data into the Ethernet frame region 106. The transmission source ID can be written using a MAC address of the processor. Note that each processor being each of the nodes in the audio network system 1 includes the transmission I/Fs and the reception I/Fs two each, which do not have discrete MAC addresses respectively but have one MAC address as one processor.

Data size is data indicating the size of frame data which has been written in the block.

Frame data is data of the Ethernet frame to be transmitted. Though some empty region remains at the tail of the frame data region in the final block, there is no problem because only the region in which meaningful data has been written can be read out on the reception side according to the information of the data size.

In the ITL frame region 107, data of an ITL frame to be used for transport of a command and a response to the command between adjacent nodes is written. This ITL frame is used for data transfer in an initial period of forming the system and also for data transfer after the system is formed as will be described later.

If the ITL frame to be written exceeds the prepared size (50 bytes, here), the ITL frame is divided into a necessary number of blocks on the transmission side processor, and each of the blocks is written into one TL frame, and the destination processor combines the blocks together to restore the ITL frame before division, as in the case of the Ethernet frame region 106.

Details of data to be written into the ITL frame region 107 are shown in FIG. 3C.

Number of blocks, block ID, data size, frame data, and an empty region in this drawing has the same use as those in the case of the above-described Ethernet frame region 106.

However, the ITL frame is essentially used for data transportation to an adjacent node. Even when the ITL frame is transferred some node beyond the adjacent node, transportation is performed in such a manner that a node existing between the origin node and the destination node once receives, refers to the frame and then transmits a frame having the same contents, as a conduit, to the next node as will be described later. Accordingly, the node which has written data into the ITL frame region 107 is always the node adjacent to the node which receives the TL frame (the node directly connected to the reception I/F into which the TL frame has been inputted). Therefore, it is unnecessary to write the transmission source node ID into the ITL frame region 107 (however, as data indicating the origin node and the destination node, MAC addresses of the two nodes are written into the ITL frame itself as will be described later).

The management data region 108 is a region into which data that is used for management of data contained in the TL frame by each of the nodes in the audio network system 1 is written. The data to be written into the management data region 108 include, for example, a break detection flag SDF indicating that the TL frame 100 has been broken during transport, an error flag EDF indicating that an error has occurred during transport of the TL frame 100, level data that is used for level display, and so on.

Note that the reason why the dedicated regions for writing the ITL frame and the management data are provided (10 bytes each, here) in the control data region 104 is to steadily transmit those kinds of data.

The FCS 105 is a field for detecting an error of the frame, defined by IEEE 802.3.

Next, the data configurations of the ITL frame are shown in FIG. 4A and FIG. 4B.

There are two types of formats for the ITL frame, and among them, the normal format shown in FIG. 4A is a format for the ITL frames written into the above-described ITL frame region 107 of the TL frame 100. The format shown in FIG. 4B is a format for the ITL frame for a special use.

An ITL frame 110 in the normal format shown in FIG. 4A is composed of regions such as a preamble 111, a frame type 112, a data size 113, an origin ID 114, a destination ID 115, a transmission source port 116, a command type 117, a parameter 118, dummy data 118a, and an FCS 119.

The formats for the preamble 111 and the FCS 119 among them are the same as those of the TL frame 100 shown in FIG. 2.

The frame type 112 is data having the same use as the frame type written in the TL frame 100 as the management data 102. However, data indicating that this frame is the ITL frame is written as the frame type 112.

Assuming that the frame type is written into the bytes at the head of the management data 102 in the TL frame 100, the preamble 111, the frame type 112, and the FCS 119 in the ITL frame 110 are in common formats with the corresponding regions in the TL frame 100.

The data size 113 is data indicating size of data written in the frame except the dummy data 118a.

The origin ID 114 is MAC address of a processor which originated the ITL frame 110.

The destination ID 115 is MAC addresses of a destination processor of the ITL frame 110.

The transmission source port 116 is data indicating the transmission I/F among the plurality of transmission I/Fs included in each node from which the node has transmitted the ITL frame 110.

The command type 117 is a command ID indicating which command (or response) the ITL frame 110 transports. Some examples of the command will be described later.

The parameter 118 is data of parameters for the command. The format thereof differs depending on the command type.

The dummy data 118a is data having no specific meaning, for making the frame length constant.

A special ITL frame 120 shown in FIG. 4B is composed only of a preamble 111, a frame type 112, and an FCS 119. The formats for those data are the same as those of the ITL frame 110. The frame type 112 in the ITL frame 120 is data indicating the use of the frame.

The ITL frame 120 in such a format is used in the audio network system 1, for some special uses such as measurement of a distance between nodes and notification of disconnection as will be described later. Hence, "110" will be used as the reference number of the ITL frame hereinafter. However, also the ITL frame 120 can be handled similarly to the ITL frame 110 unless otherwise stated.

1.3 Method of Transmitting TL Frame

Figure 5:
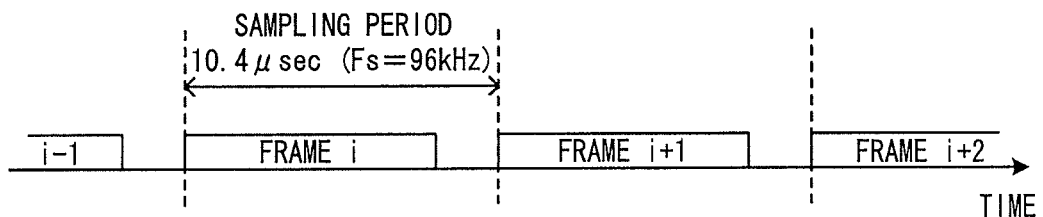
FIG. 5 is a chart showing a transport timing of the TL frame shown in FIG. 2.

Next, a transport timing of the TL frame 100 shown in FIG. 2 is shown in FIG. 5.

As shown in this drawing, in the audio network system 1, one TL frame 100 is circulated among the nodes every 10.4 μsec (microseconds) that is one period of a sampling period of 96 kHz, and each node writes the audio signals into a desired channel of the TL frame or reads the audio signals from a desired channel. Accordingly, one sample of the waveform data can be transported between the nodes for each of the 256 channels in each sampling period.

When data transfer in the Ethernet (registered trademark) system of 1 Gbps (gigabit per second) is employed, the time length of the TL frame 100 is 1 nanosecond×8 bits×1282 bytes=10.26 μsec, so that the transmission of the TL frame 100 from the master node is completed in one sampling period.

Note that the TL frame having 1282 bytes is adaptable for a sampling period up to 1 sec/10.26 μsec=97.47 kHz, and a frame size up to 10.4 μsec/8 bits/1 nanosecond=1300 bytes can be adaptable for sampling frequency of 96 kHz, in terms of calculation with neglecting intervals between the frames. However, since an empty interval of a predetermined time period or more is necessary between the frames and the transmission timing of the frame can advance or delay, the size (time length) of the TL frame is determined upon consideration of these situations.

Figure 6:
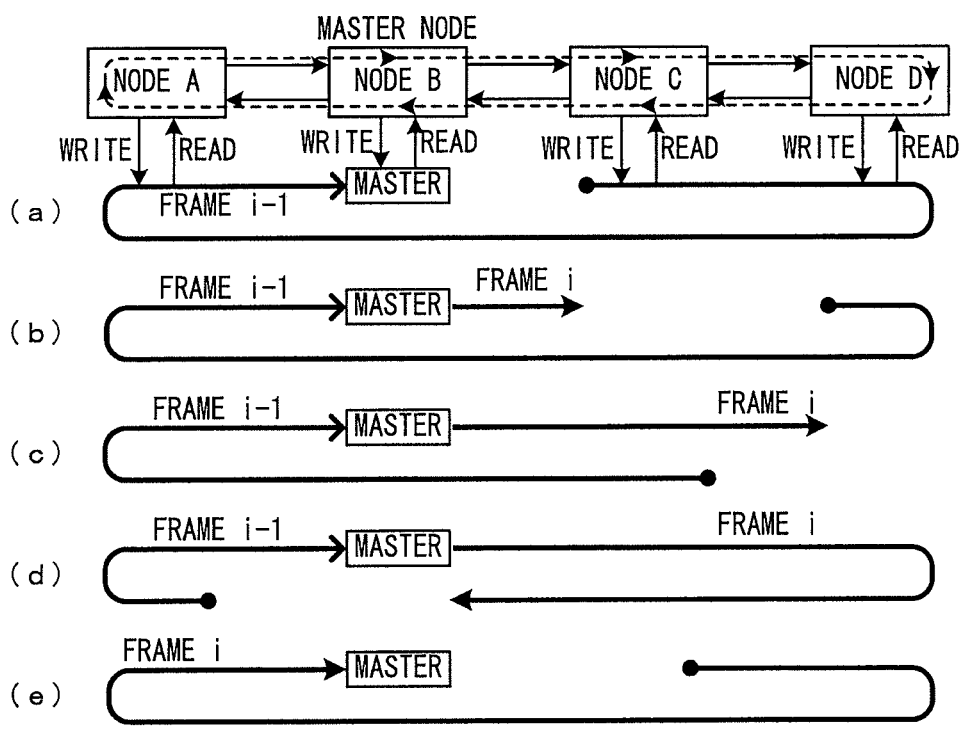
FIG. 6 is an illustration showing the transport states of the TL frame shown in FIG. 2 during transport of the audio signals in the single mode on the audio network system.

Next, states of the TL frame shown in FIG. 2 during transport of the audio signals (in the audio transport mode) on the audio network system 1 are shown in FIG. 6. Examples in the single mode are shown in FIG. 6.

An audio network system in which four nodes, the node A to the node D, are cascaded is discussed here. When the TL frame 100 shown in FIG. 2 is circulated through the nodes in the system, any one of the nodes is determined as a master node, and only that master node generates the TL frame in a new sampling period (a TL frame with a different serial number) and transmits the TL frame generated in each sampling period to the next node. The nodes other than the master node are slave nodes which perform transfer process of receiving the TL frame from their respective preceding nodes and transmitting it to the respective next nodes.

When the master node B first transmits the TL frame, rightward in the drawing, toward the node C in accordance with the timing of a wordclock for transmission, the TL frame is transported to the nodes B, C, D, C, B, A, and B in order as shown by the broken line and thus returned to the node B. As seen from the master node, the side on which the master node first transmits the circulating TL frame is called a "forward side", and the side on which the master node secondly transmits it is called a "backward side". While the TL frame circulates through the transmission route, each node reads, from the TL frame, the waveform data and the control data which the node should receive from another node, and writes, into the TL frame, the waveform data and the control data which the node should transmit to the other node, during the time period that the TL frame is flashing through the node, namely from reception to transmission of each portion of the TL frame in the node.

When the TL frame returns after circulating through the transmission route, the master node overwrites the management data 102 of the TL frame to generate the TL frame in the later sampling period, and provides it to transmission in an appropriate sampling period. In this event, the master node also reads/writes data from/to the TL frame as with the other nodes. The generation of the TL frame will be described later in detail.

By repeating the above, one TL frame can be circulated for one sampling period, among the nodes as shown in (a) to (e) in time sequence. In these drawings, a black arrow shows the head of the TL frame, a black circle shows the end of the TL frame, and a bold line connected to the black arrow and/or the black circle shows the TL frame itself. The arrow of a line connected to the bold line is indicating the return of the TL frame to the master node after circulating through the transmission route.

Note that each slave node receiving the TL frame, before the node completes receiving all the TL frame (from the head to the tail), starts to read/write data from/to the TL frame from the head and transmit the TL frame from the head to the next node at a timing when the node has received necessary bytes of the TL frame from the head. Thereafter, the slave node reads/writes and transmits the TL frame to the end at substantially the same speed as the node receives the TL frame. On the other hand, the master node receives the entire TL frame and then generates a new TL frame based on the contents of the received frame as will be described later.

In the single mode, the TL frame flashes through each of the nodes other than nodes at both ends in the network system twice in one circulation, but the node reads/writes data other than the data of the ITL frame region 107 from/to the TL frame on only one occasion of them. On which occasion the node reads/writes audio data is selectable. In one case, the node reads/writes audio data at the first time when the frame flashes through the node. In another case, the node reads/writes audio data at the time when the frame flashes through the node rightward in the drawing. When the node does not read/write audio data from/to the TL frame, the node overwrites only the transmission source address and later-described presence confirmation information in the TL frame and transmits the frame to the next node.

Regarding ITL frame, it is preferable that the ITL frame can be transmitted to adjacent nodes in both directions. Hence here, each node transmits the TL frame after writing data of the ITL frame to be transmitted to the right side adjacent node (or a node beyond the adjacent node) into the ITL frame region 107 when the TL frame flashes through rightward in the drawing, whereas the node transmits the TL frame after writing data of the ITL frame to be transmitted to the left side adjacent node (or a node beyond the adjacent node) is written into the ITL frame region 107 when the TL frame flashes through leftward in the drawing.

Since each node needs to perform buffering at the time of receiving the TL frame, in order to overwrite the data of the TL frame or to absorb the difference in frequency and timing between the network clock on the receiving side (corresponding to the operation clock of the transmission source node) and the network clock on the transmitting side (corresponding to the operation clock of that node), there is a time lag between the timing when the node starts to receive a TL frame and the timing when the node starts to transmit the received frame.

The transport delay of the audio signals transported over the network is in the unit of sampling period and is minimal in a condition that the TL frame transmitted by the master node at a timing of a wordclock for transmission in S-th period returns to the master node, after circulating through the transmission route, at a timing earlier than a wordclock for transmission in (S+2)-th period by a predetermined time α (corresponding to a time necessary to generate a new TL frame in (S+2)-th period based on the received frame in S-th period).

As will be described later, in this case, for example, the (S+2)-th TL frame which will be transmitted 2 sampling periods later is generated based on the S-th TL frame.

However, it is not essential to generate the TL frame which will be transmitted 2 sampling periods later, but it is also possible to generate the (S+k)-th TL frame which will be transmitted k sampling periods later based on the S-th TL frame, wherein the k is positive integer being not less than 2. In this case, the k shall be called a "periodic update value k."

Generally, by configuring such that the master node can complete reception of the TL frame whose transmission has been started by the master node at a certain timing of a wordclock for transmission, at a timing before the k sampling periods later wordclock for transmission by a predetermined time α according to the value of k, the transmission of the audio signals is possible. Accordingly, even when the number of nodes in the network system is increased and the circulation time from the timing when the master node transmits a TL frame to the transmission route to the timing when the same frame returns to the master node after passing through the transmission route is thus increased, the network system can operate by increasing the value of k. Thus, the value of k defines a time limit of the circulation time of the TL frame in the network system.

The periodic update value k can be arbitrarily set by the master node and the value is transferred to all of the nodes in the system by broadcasting a parameter setting frame indicating the setting of the periodic update value k or the like.

However, since the timings of using (outputting to some blocks) the audio signals received by the nodes are synchronized each other in this system, when the k is increased to extend the time limit of the circulation time (the time limit is variable in the unit of the wordclock), the transport delay of the audio signals is also extended correspondingly on the wordclock basis.

In this system, by performing data transport in the above-described method, a fixed transport bandwidth according to the size of the TL frame in the network can be secured at all times, independent of the number of nodes in the network system as long as the circulation time is in the limit. The bandwidth is not affected by the magnitude of the data transport amount between specific nodes.

In the twin mode, as is clear from FIG. 1A to FIG. 1C, two transmission routes will be formed. In one transmission route, a TL frame generated and transmitted rightward by the master node B is transported from the node B to the nodes C, D, A, and B in order, and in the other transmission route, a TL frame generated and transmitted leftward by the master node B is transported from the node B to the nodes A, D, C, and B in order. While the TL frame circulates through the transmission route, each node reads, from the TL frame, the waveform data and the control data which the node should receive from another node, and writes, into the TL frame, the waveform data and the control data which the node should transmit to the other node, during the time period that the TL frame is flashing through the node, namely from reception to transmission of each portion of the TL frame in the node.

In the twin mode, since the TL frame flashes through each of the nodes in the network system once in one circulation through the transmission route, the node reads/writes data from/to the TL frame during the one flash.

The audio network system 1 can selectively perform, as a whole, duplex communication in which the same data is written into the TL frames circulating through the two transmission routes, and double communication in which different data are written into the TL frames circulating through the two transmission routes.

In the case of the duplex communication of them, because the same data is written into the TL frames on the two transmission routes, the data amount transportable per sampling period, that is, the bandwidth of communication is the same as the bandwidth in the case of the cascade connection. However, even if a break of wire occurs at one location, the system immediately can shift to the transport by cascade connection to keep the data transport in the same bandwidth. It is also possible to compare the substance in the TL frames on the two transmission routes to thereby confirm whether or not the data is correctly transported.

On the other hand, in the case of the double communication, because the two pieces of data per sampling period can be transported, the bandwidth of communication can be made twice the bandwidth of the cascade connection.

Which one of the duplex communication and double communication is performed may be set in the master node in advance.

1.4 Hardware Configuration and Basic Operation of Processors Constituting System Next, the hardware for transporting the TL frame as has been described above and its operation will be described.

Figure 7:
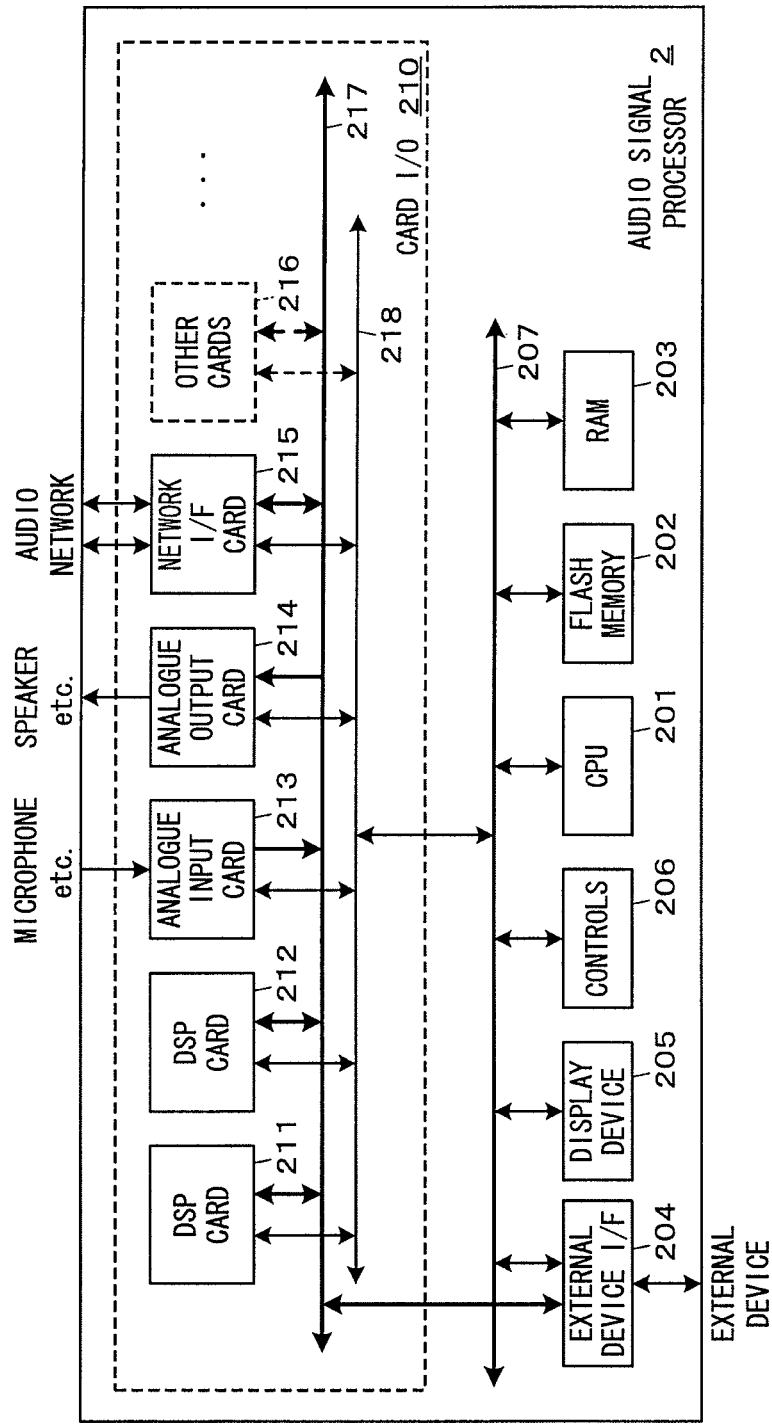
FIG. 7 is a diagram showing the hardware configuration of an audio signal processor which is to be each of the nodes constituting the audio network system shown in FIG. 1A to FIG. 1C.

The hardware configuration of an audio signal processor that is each of the nodes constituting the above-described audio network system 1 is shown in FIG. 7.

As shown in FIG. 7, the audio signal processor 2 includes a CPU 201, a flash memory 202, a RAM 203, an external device I/F (interface) 204, a display device 205, and controls 206, which are connected via a system bus 207. The audio signal processor 2 further includes a card I/O (input/output section) 210 connecting the external device I/F 204 and the system bus 207.

The CPU 201, which is a controller that comprehensively controls the audio signal processor 2, can execute a required control program stored in the flash memory 202, thereby controlling display on the display device 205, setting the value of the parameter according to the manipulation of the control 206, controlling the operation of each module, transmitting a command to another audio signal processor via the card I/O 210, and performing process according to the command received from the other audio signal processor via the card I/O 210.

The flash memory 202 is a overwritable non-volatile memory that stores data which should be left even after the power is turned off, such as the control program executed by the CPU 201.

The RAM 203 is a memory that is used to store data which should be temporarily stored and used as a work memory of the CPU 201.

The external device I/F 204 is an interface for connecting various kinds of external devices to perform inputting/outputting, for example, an external display, a mouse, a keyboard for inputting characters, a control panel, a PC (personal computer), and the like.

The external device I/F 204 is also connected to an audio bus 217 of the card I/O 210 and can transmit the waveform data flowing through the audio bus 217 to the external device and input the waveform data received from the external device into the audio bus 217.

The display device 205 is a display device for displaying various kinds of information according to control by the CPU 201, and can be composed, for example, of a liquid crystal display (LCD), a light emitting diode (LED), or the like.

The controls 206 are used for accepting the manipulation to the audio signal processor 2 and can be composed of various keys, buttons, dials, sliders, and the like.

The card I/O 210 is an interface including the audio bus 217 and a control bus 218, and making it possible to input/output the audio signals and the control signal to/from the audio signal processor 2 and perform process on them by attaching various kinds of card modules to these buses. The card modules attached thereto transmit/receive the waveform data to/from each other via the audio bus 217 and transmit/receive the control signal to/from the CPU 201 via the control bus 218 to be controlled by the CPU 201.

The audio bus 217 is an audio signal transporting local bus which transports the waveform data of a plurality of channels from an arbitrary card to an arbitrary card sample by sample in a time division manner at a sampling period based on the sampling period. Any one of the plurality of connected cards becomes a master, and the reference timing for the time division transport of the audio bus 217 is controlled based on the wordclock generated and supplied by that card. The other cards become slaves and generate wordclocks for signal processing of the cards based on the reference timing.

More specifically, the wordclock for signal processing generated in each card is a common clock in synchronization with the wordclock for signal processing of the card which has become the master node, and a plurality of cards in a node process the waveform data at a common sampling frequency. Each card further transmits and receives the waveform data processed based on its own wordclock for signal processing and the waveform data which should be processed, to/from the other card via the audio bus 217 at a time division timing based on the above-described reference timing.

The wordclock for signal processing here is a clock that is in the same period as but different in phase from the above-described wordclock for transmission for controlling the timing of frame transmission among nodes, except for unintentional errors. The method of generating those clocks will be described later in detail.

FIG. 7 shows an example in which DSP (digital signal processor) cards 211 and 212, an analog input card 213, an analog output card 214, and a network I/F card 215 are attached to the card I/O 210.

Each of the various cards attached to the card I/O 210 executes process on the waveform data according to the function of that card at a timing based on the wordclock for signal processing (sampling period of the waveform data).

The DSP cards 211 and 212 of them are signal processors which perform various kinds of process including mixing, equalizing, and effect addition on the waveform data acquired from the audio bus 217 at a timing based on the wordclock for signal processing. They output the processed data to the audio bus 217. They can further accept inputs of the waveform data of a plurality of channels and process the waveform data and then output the waveform data of a plurality of channels.

The analog input card 213 includes an A/D (analog/digital) conversion circuit and has a function of converting the analog audio signals inputted from the audio input device such as a microphone to digital waveform data and supplying it to the audio bus 217. The analog input card 213 can process the signals of a plurality of channels in parallel.

The analog output card 214 includes a D/A (digital/analog) conversion circuit and has a function of converting the digital waveform data acquired from the audio bus 217 to analog audio signals and outputting them to the audio output device such as a speaker or the like.

The network card I/F 215 includes two sets of transmission I/Fs and reception I/Fs and has a function of performing transport of the TL frame 100 and the ITL frame 110 which have been described using FIG. 1A to FIG. 6 and a function of reading/writing the waveform data, the control data, and the like from/to the TL frame 100. Details thereof will be described later. It is also possible to attach a plurality of network I/F cards to the card I/O 210, and each network I/F card can be connected to a different audio network. In this case, the audio signal processor 2 performs the operation as a bridge to connect the plurality of audio networks.

In addition to the aforementioned, it is conceivable that various kinds of card modules such as a digital input/output, a sound source, a recorder, an effector, and so on can be attached as other cards 216.

Figure 8:
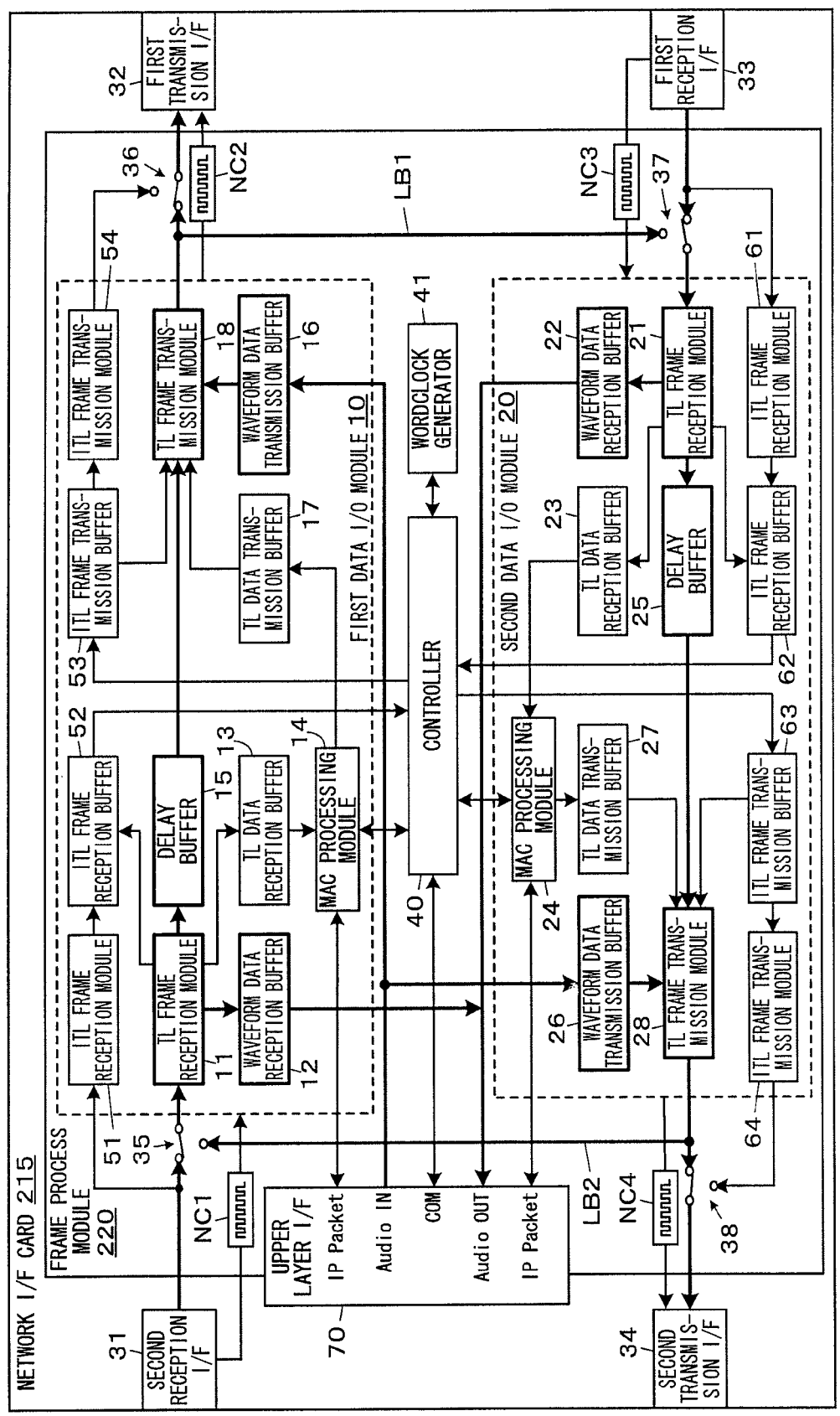
FIG. 8 is a diagram showing the configuration of the network I/F card shown in FIG. 7 in more detail.

Next, the configuration of the network I/F card 215 is shown in more detail in FIG. 8.

As shown in FIG. 8, the network I/F card 215 includes first and second reception I/Fs 33 and 31 and first and second transmission I/Fs 32 and 34 used for transmitting or receiving the frames, and also includes a frame process module 220 which performs process relating to data transmission/reception using frames, and an upper layer I/F 70 that is an interface to/from portions of the audio signal processor 2 other than the I/F card 215.

Among them, the first and second reception I/Fs 33 and 31, and the first and second transmission I/Fs 32 and 34 are communication devices corresponding to the two sets of reception I/Fs and transmission I/Fs shown in FIG. 1A to FIG. 1C, each including a predetermined connector (a female side) for connecting a communication cable thereto.

This communication device corresponds to the physical layer of the OSI reference model, and the transmission I/F transmits the serial signals of the supplied frame after converting the signals into electric signals or optical signals suitable for the transmission medium (the communication cable) and the reception I/F outputs the electric signals or the optical signals from the transmission medium (the communication cable) after inversely converting the signals into the serial signals of the frame.

For connection of the communication cable, the first transmission I/F 32 and the first reception I/F 33 shall be one set, and the second transmission I/F 34 and the second reception I/F 31 shall be one set. These I/Fs can be I/Fs which perform data communication by any communication system as long as they have enough ability for transport of the TL frame in the above-described one sampling period, and a physical layer performing data transfer by the Ethernet system of 1 Gbps is employed here.

Currently, the 1G Ethernets include various kinds of physical layers, such as 1000BASE-T using a CAT5e cable with an RJ45 connector (an unshielded twisted pair cable) as the communication cable CB, and 1000 BASE-LX, SX using an optical fiber or an STP cable (a shielded twisted pair cable) and the like, any of which can be used in this embodiment. Further, 10G BASE-LR, ER, LX4 being faster Ethernet systems may be used, or a physical layer before being adjusted for Ethernet may be used. For example, they are FiberChannel, SDH (Synchronous Digital Hierarchy)/SONET (Synchronous Optical NETwork) and so on.

The reception I/F extracts the network clock being a carrier from an electric signal or an optical signal propagating through the communication cable CB, and demodulates and outputs a data stream of the digital data in a byte unit (or word unit) from the electric signal or the optical signal based on the extracted clock. The transmission I/F receives the network clock and the digital data stream in a byte unit (or word unit) which should be transmitted, and modulates it to an electric signal or an optical signal for transport using the network clock as a carrier and outputs it to the communication cable CB.

The upper layer I/F 70 is an interface for the upper layers that are the network layer and upper of the OSI reference model, and concretely is an interface for inputting/outputting data to/from the audio bus 217 and the control bus 218 shown in FIG. 7.

The upper layer I/F 70 includes five data input/output ports. Two IP_Packet ports of them are used for inputting/outputting, via the control bus 218, an IP packet included in the Ethernet frame read out from the Ethernet frame region 106 of the TL frame 100, and an IP packet which is packed into an Ethernet frame, written into the Ethernet frame region 106 of a generated Ethernet frame and transmitted to another node.

A COM port is a port for transmitting/receiving, via the control bus 218, a command and data between a controller 40 on the side of the network I/F card 215 and the CPU 201 on the side of the audio signal processor 2 being the main body.

An Audio_In port and an Audio_Out port are ports for inputting/outputting waveform data via the audio bus 217.

On the other hand, the frame process module 220 corresponding to the data link layer of the OSI reference model roughly has first and second data input/output modules 10 and 20, selectors 35 to 38, the controller 40, and a wordclock generator 41.

The controller 40 has a CPU, a ROM, a RAM and the like and performs general control relating to the operation of the network I/F card 215 and control relating to a command and a response transmitted using the ITL frames as will be described later. The controller 40 further has a function of acquiring, from the CPU 201 on the main body side that is communicable via the control bus 218, setting information necessary for the operation of the network I/F card 215 such as the MAC address of the audio signal processor 2, the operation state (master/slave, single mode only/twin mode available, and the like) and so on.

The controller 40 also manages a later-described topology table that shows the connection order of nodes.

The wordclock generator 41 is a clock generating device that generates the wordclock for transmission being the reference of timings for the transfer of the waveform data in the audio bus 217 and the wordclock for signal processing being the reference of timings for the signal data processing in the various kinds of card modules connected to the audio bus 217.

The wordclock generator 41 in the master node generates the wordclock for transmission at its own timing of the network I/F card 215 or a timing in synchronization with the wordclock supplied via the audio bus 217 from the other card, and uses the clock as the reference of the transmission timing of the TL frame 100, whereas the wordclock generator 41 in the slave node determines the transmission timing of the TL frame 100 with reference to the reception timing of the TL frame.

As will be described later, the wordclock generator 41 in the master node generates the wordclock for signal processing by delaying the wordclock for transmission by a predetermined target delay time, and the wordclock generator 41 in the slave node generates the wordclock for signal processing based on the reception timing of the TL frame, the target delay time notified from the master node, the transmission delay written in the TL frame and so on.

Each of the first and second data input/output modules 10 and 20 operates based on the operation clock generated by a not-shown operation clock generating module, and functions as a reader that reads desired data from the TL frame 100 received by a corresponding reception I/F, and a writer that writes desired data into the received TL frame 100. Each of the first and second data input/output modules 10 and 20 further has a function of directly transmitting/receiving the ITL frame 110 (without writing into the TL frame 100) to/from a node for which a transmission route through which the TL frame 100 circulates has not been established yet. The functions of these first and second data input/output modules 10 and 20 are identical, and therefore the first data input/output module 10 will be described as representative.

The first data input/output module 10 includes a TL frame reception module 11, a waveform data reception buffer 12, a TL data reception buffer 13, a MAC processing module 14, a delay buffer 15, a waveform data transmission buffer 16, a TL data transmission buffer 17, a TL frame transmission module 18, an ITL frame reception module 51, an ITL data reception buffer 52, an ITL data transmission buffer 53, and an ITL frame transmission module 54. The transmission and reception modules and buffers among them are operated on a FIFO (first-in and first-out) basis in which firstly written data is firstly read out.

Among the above described modules, the TL frame reception module 11 has a function of reading data from a received TL frame 100 and storing the received TL frame 100 into the delay buffer 15, and the ITL frame reception module 51 has a function of reading data from a received ITL frame 110.

The TL frame reception module 11 and the ITL frame reception module 51 receive a network clock NC1 extracted as a carrier by the second reception I/F 31 and accept the data from the second reception I/F 31 in synchronization with the network clock NC1. However, the TL frame reception module 11 accepts the data from the second reception I/F only when the selector 35 selects the second reception I/F side.

It is clear which frame the data received from the second reception I/F 31 relates to, by referring to the frame type in each frame which has been described using FIG. 2 and FIG. 4A and FIG. 4B. Therefore, each of the TL frame reception module 11 and the ITL frame reception module 51 only needs to read frames which the TL frame reception module 11 or the ITL frame reception module 51 should process, and discard other frames. The ITL frame reception module 51 will receive data of all frames, but discard unnecessary frames other than the ITL frames 110 and 120 without processing the frames.

The function of the first data input/output module 10 relating to the transmission/reception of the ITL frame 110 will be described first.

When receiving the ITL frame 110, the ITL frame reception module 51 writes the data of the ITL frame 110 into the ITL data reception buffer 52, and then it is confirmed that there is no error in the frame, and the frame is outputted to the controller 40. The controller 40 performs process (including process of transferring commands which are not addressed to the processor itself) according to the command written in the frame.

The ITL data transmission buffer 53 is a buffer for storing data of the ITL frame 110 which should be transmitted to a node connected to the first transmission I/F 32, and writing of the data into the ITL data transmission buffer 53 is performed by the controller 40.

When the selector 36 selects the ITL frame transmission module 54 side, the ITL frame transmission module 54 reads the ITL frame 110 stored in the ITL data transmission buffer 53 at an appropriate timing, and supplies the read ITL frame 110 to the first transmission I/F 32 and causes the first transmission I/F 32 to transmit the ITL frame 110 to a node connected thereto. When the selector 36 selects the TL frame transmission module 18 side, the ITL frame transmission module 54 performs no specific operation because the transmission of the ITL frame 110 stored in the ITL data transmission buffer 53 is performed by the TL frame transmission module 18.

The transmission/reception of the ITL frame 110 by the ITL frame reception module 51 and the ITL frame transmission module 54 is performed on the frame basis without dividing the frame into blocks.

By using the functions of the above-described modules, the network I/F card 215 can perform communication to adjacent nodes using the ITL frame 110 through the transmission route rightward in FIG. 8. For the communication through the transmission route leftward in FIG. 8, the second data input/output module 20 is used.

The functions of the first data input/output module 10 relating to the transmission/reception of the TL frame 100 will be described next.

The TL frame reception module 11 has functions of, when receiving the data of the TL frame 100, writing waveform data of transport channels which should be read among the received data, into the waveform data reception buffer 12, writing the data in the ITL frame region 107 into the ITL data reception buffer 52, and writing the data in the Ethernet frame region 106 and the management data which should be read, into the TL data reception buffer 13.

If a data error or the like is detected, writing of the data into the buffers is not performed or the data which has been once written is altered sometimes, and such a case will be described later.

The TL frame reception module 11 further has a function of writing all the data of the received TL frame 100 also into the delay buffer 15.

The waveform data of each transport channel which has been written into the waveform reception buffer 12 is outputted to the AUDIO_Out port of the upper layer I/F 70 sample by sample in synchronization with the wordclock for signal processing, and transported to the other cards via the audio bus 217.

The data which has been written into the ITL data reception buffer 52 is outputted to the controller 40 when data corresponding to one ITL frame is prepared, and the controller 40 performs process (including process of transferring commands which are not addressed to the processor itself) according to the command written in the frame.

The data of the Ethernet frame among the data which has been written into the TL data reception buffer 13 is outputted to the MAC processing module 14 when data corresponding to one Ethernet frame is prepared. When the MAC processing module 14 confirms that the Ethernet frame is addressed to the processor in which the MAC processing module 14 is included, the MAC processing module 14 takes out the IP packet from the Ethernet frame and outputs the IP packet to the IP_Packet port of the upper layer I/F 70, and the IP packet is passed to the CPU 201 on the main body side via the control bus 218. The data other than the Ethernet frame, for example, metadata and the like are passed to the controller 40 via the MAC processing module 14 and then passed from the controller 40 to the CPU 201 on the main body side via the COM port of the upper layer I/F 70 when necessary.

For the waveform data, the controller 40 grasps at least the transport channel numbers of the waveform data which should be read out according to the instruction by the upper layer, and therefore the controller 40 can calculate the byte positions of the waveform data in the TL frame 100 based on the channel number. Accordingly, the controller 40 only needs to indicate the positions to the TL frame reception module 11 and instruct the TL frame reception module 11 to write only the data at those calculated positions into the waveform data reception buffer 12.

Because the ITL frame region 107, the Ethernet frame region 106, and the management data are written in fixed positions in the TL frame, the TL frame reception module 11 only needs to read data from those fixed positions once, appropriately select data to be outputted to the controller 40 or the MAC processing module 14, and write the selected data into the ITL data reception buffer 52 or the TL data reception buffer 13. Alternatively, the TL frame reception module 11 may simply write all the data in the aforementioned fixed regions into the reception buffers so that the controller 40 classifies the data.

On the other hand, the waveform data transmission buffer 16 is a buffer which stores waveform data to be written into the TL frame 100 and outputted, and the upper layer I/F 70 outputs waveform data supplied from the audio bus 217 to be outputted, from the Audio_In port in each sampling period in synchronization with the wordclock for signal processing, and writes the waveform data into the waveform data transmission buffer 16. It is of course possible to write the waveform data corresponding to a plurality of transport channels, and it is only necessary to firstly write, into the waveform data transmission buffer 16, the data to be written into a byte close to the head of the TL frame. When the second data input/output module 20 is also used to read/write waveform data, the upper layer I/F 70 writes the waveform data which should be outputted, also to the waveform data transmission buffer 26, and the upper layer I/F 70 can naturally write different waveform data into the waveform data transmission buffer 16 and the waveform data transmission buffer 26.

The TL data transmission buffer 17 is a buffer which stores the data of the Ethernet frame and the management data which should be written in the TL frame and outputted, and the MAC processing module 14 writes, into the TL data transmission buffer 17, an Ethernet frame generated based on the IP packet outputted from the IP_Packet port of the upper layer I/F 70 to be transmitted and the control data supplied from the controller 40 to be outputted.

As has been described in the description on the transmission/reception of the ITL frame 110, the controller 40 writes, into the ITL data transmission buffer 53, the data of the ITL frame 110 which should be outputted to the node which is connected to the first transmission I/F 32.

In the case where the processor itself is a slave node, when a predetermined amount (a first predetermined amount) of data of the TL frame 100 is accumulated (stored) in the delay buffer 15 by the TL frame reception module 11, the TL frame transmission module 18 reads the accumulated data of the TL frame 100 from the head of the frame in accordance with progression of the accumulation, and accumulates the data into the buffer of the TL frame transmission module 18. In accordance with progression of the accumulation, the TL frame transmission module 18 writes the data from the waveform data transmission buffer 16, the TL data transmission buffer 17 and the ITL data transmission buffer 53 into appropriate addresses to thereby overwrite the contents of the TL frame 100. It is preferable that the overwrite is sequentially performed from the head of the frame so that the overwritten data is prepared before later-described transmission timings.

For the waveform data to be transported to other nodes, the controller 40 calculates the byte positions of the waveform data in the TL frame 100, based on the transport channel into which the waveform data should be written, and indicates it to the TL frame transmission module 18, and the TL frame transmission module 18 writes the waveform data supplied from the waveform data transmission buffer 16 into the indicated byte positions in the TL frame 100. Also for the Ethernet frame, the ITL frame and so on, the byte positions in the TL frame 100 which the data should be written into is automatically determined for each kind of data according to the frame construction shown in FIG. 2.

Alternatively, detecting a lapse of a predetermined time from start of retrieving the TL frame 100 may be utilized as a trigger to start reading and overwriting by the TL frame transmission module 18 in place of detecting the accumulation of the predetermined amount into the delay buffer 15.

In the case where the own processor (the audio signal processor 2 to which the network I/F card 215 executing processes under description is attached) is a slave node, when a second predetermined amount of data of the TL frame 100 is accumulated in the TL frame transmission module 18, the TL frame transmission module 18 starts outputting the overwritten TL frame so that if the selector 36 selects the output line from the TL frame transmission module 18, the TL frame 100 which has been overwritten by the TL frame transmission module 18 is outputted via the first transmission I/F 32 to the adjacent node. In this event, the operation clock of the first data input/output module 10 is supplied as it is as the network clock NC2 to the first transmission I/F 32, and the first transmission I/F modulates in sequence the data of the TL frame using the network clock NC2 as a carrier and outputs it to the communication cable CB.

Note that detecting a lapse of a predetermined time from start of retrieving the TL frame 100 may be utilized as a trigger to start transmission of the TL frame 100 in place of detecting the accumulation of the second predetermined amount.

As has been described using FIG. 2 and FIG. 3A to FIG. 3C, when the Ethernet frame or the ITL frame 110 are written into the TL frame 100 and transmitted, the data in each of the frames is divided into a plurality of blocks (including one block). The TL frame transmission module 18 performs the division and the generation of the block ID for every block and so on, and prepares data relating to blocks to be used for overwriting before the timing of overwriting the data into the TL frame 100.

Although the process for overwriting the contents of the TL frame 100 stored in the delay buffer 15 by the TL frame transmission module 18, and the process for outputting the overwritten TL frame 100 from the TL frame transmission module 18 are performed at the same time in this embodiment, the overwriting process may be first performed and then overwritten portions of the TL frame 100 may be outputted in sequence.

Although the process for overwriting the contents of the TL frame stored in the buffer of the TL frame transmission module 18 and the process for outputting the TL frame from the TL frame transmission module 18 are individually performed in this embodiment, the overwriting process and the outputting process may be performed at a time. In the variation, a reading out process of the TL frame 100 by the TL frame transmission module 18 is started using the accumulation of the predetermined amount of the received TL frame 100 in the delay buffer 15 as a trigger, and the TL frame 100 read out is supplied to the second transmission I/F 32 while some portions of the TL frame 100 are being replaced with the data from the waveform data transmission buffer 16, the TL data transmission buffer 17 and the ITL data transmission buffer 53.

The replacing process of data can be performed such that the TL frame transmission module 18 selects an appropriate one of the data read out from the delay buffer 15, the data stored in the waveform data transmission buffer 16, the data stored in the TL data transmission buffer 17, and the data stored in the ITL data transmission buffer 53 and outputs the selected data at the time outputting the data of each byte (or word) in the TL frame 100. In this case, the data which has not been selected among the data in the TL frame read out from the delay buffer 15 is discarded. Also by this process, the TL frame transmission module 18 can actually output the TL frame in which an appropriate region of the TL frame 100 received by the TL frame reception module 11 has been overwritten with data to be outputted.

In the case of the single mode as described above, each of the nodes including the master node reads/writes data other than the data in the ITL frame region 107 only once while the TL frame circulates once through the transmission route. Accordingly reading/writing of the data other than the data in the ITL frame region 107 is performed in only one of the first and second data input/output modules 10 and 20. When the data input/output module performs neither the reading process nor writing process on the data other than the data in the ITL frame region 107, the data other than the data in the ITL frame region 107 just flashes therethrough.

Even in the case of the twin mode, if it is the twin mode in the duplex communication, each of the nodes including the master node can similarly read/write data from/to the TL frame at one of the data input/output modules and permit the TL frame to flash through the other data input/output module. In other words, even when only the TL frame circulating through one of the transmission routes is actually used for transmitting the waveform data as described above, the system can immediately shift to the cascade connection when a break of wire occurs.

When the master node receives the TL frame in some period and forms a TL frame in a new period based on the received TL frame and transmits the TL frame in the new period, the master node updates the TL frame 100 after completion of the reception of the whole TL frame 100 as will be described later, so the timing of writing data into the TL frame 100 and the timing of starting transmission of the TL frame 100 are different from those of the slave node. However, the position for writing data in the TL frame 100 can be determined as in the case of the slave node. The master node also overwrites the management data 102 in the TL frame 100, and the overwrite can also be performed such that data to be written into a new TL frame is written into the TL data transmission buffer 17 and the data is written over that in the TL frame accumulated in the frame buffer.

Note that the contents of the frame transmitted to the backward side may be the same as the contents of the frame transmitted to the forward side in the operation in the twin mode in the duplex communication, in which case the delay buffers 15 and 25, and the TL frame transmission modules 18 and 28 can be configured by common hardware.

The foregoing is the functions of the first data input/output module 10 relating to transmission/reception of the TL frame 100.

Besides, as can be seen from FIG. 1A and the like, the transmission destination of the TL frame 100 from a processor that has received the frame may be a processor other than the transmission source of the TL frame 100 (the case of the node B in FIG. 1A) or may be the same processor as the transmission source (the case of the nodes A and C in the same figure). In the former case, the TL frame 100 is transmitted from a transmission I/F in the other pair than the pair the reception I/F which has received the TL frame 100 belongs to, whereas in the latter case, it is transmitted from a transmission I/F paired with the reception I/F which has received the TL frame 100.

The selectors 35 to 38 are provided to switch the transmission destination as described above.

The selectors 35 and 37 are selectors which select, as the data to be inputted into the TL frame reception modules 11 and 12, from among the data received by the reception I/Fs 31 and 33, and the data outputted from the TL frame transmission modules 28 and 18, respectively.

On the other hand, the selectors 36 and 38 are selectors which select, as the data to be transmitted from the transmission I/Fs 32 and 34, from among the TL frames outputted from the TL frame transmission modules 18 and 28, and the ITL frames outputted from the ITL frame transmission modules 54 and 64, respectively.

The selector 36 and the selector 37 operate in cooperation such that when the selector 36 passes the output of the TL frame transmission module 18 to the first transmission I/F 32, the selector 37 passes the data received at the first reception I/F 33 to the TL frame reception module 21 to make it possible to receive the TL frame from the processor connected to the first I/F side.

When the selector 37 is switched to a loopback line LB1 side to pass the output from the TL frame transmission module 18 to the TL frame reception module 21, the TL frame 100 received by the second reception I/F 31 is passed from the first data input/output module 10, then through the loopback line LB1 and the second data input/output module 20, and outputted from the second transmission I/F 34 (when the selector 38 selects the TL frame transmission module 28 side). Accordingly, the received TL frame 100 will be transmitted back to its transmission source.

The selector 36 switches to the ITL frame transmission module 54 side in cooperation with the switching of the selector 37 to the loopback line LB1 side, so as to transmit the ITL frame 110 instead the TL frame 100 to the processor on the first I/F side. On the other hand, when the first reception I/F 33 receives the ITL frame 110, the ITL frame 110 can be processed in the ITL frame reception module 61.

Therefore, even when the TL frame 100 is looped back, the route through which communication using the ITL frame is performed is secured to/from the processor which is connected to the side where the transmission of the TL frame 100 is not performed.

The communication through the route is used for transmission/reception of notification and command when the process relating to construction of the audio network system in the initial process and the process relating to change of the system configuration are performed, for example, transmission/reception of later-described active sensing signal, connection query command, and responses to the commands.

Although the selectors 36 and 37 have been described here, the selectors 38 and 35 operate in cooperation and thereby have a similar function. They can switch whether or not to perform loopback for the TL frame 100 received from the first reception I/F 33.

In summary, in the audio signal processor 2, the hardware of the network I/F card 215 shown in FIG. 8 performs the above-described process, depending on the connection status of each node in the audio network system in which the own processor is included, and on whether the own processor is the master node or the slave node, whereby the function relating to transport of the TL frame and data as described using FIG. 1A to FIG. 6 can be realized.

2. Formation and Change of Configuration of Audio Network System 2.1 Communication Mode of Each Processor Next, process relating to construction and change of configuration of the audio network system, executed by the CPU of the controller 40 in the audio signal processor 2 shown in FIG. 7 will be described.

In the audio signal processor 2 shown in FIG. 7 at the time of startup, both the selectors 35 and 37 select the loopback line sides in the network I/F card 215. In this state, the network I/F card 215 does not form the audio network system in which the TL frame circulates among a plurality of nodes, but communicates with an external processors using the ITL frame (this state is referred to as an "initial communication (ITL) mode").

When the CPU detects that the transmission/reception I/Fs are connected to another processor which has a similar network I/F card 215 and can constitute the audio network system 1, the CPU switches the selector on the side where the another processor is connected, to the reception I/F side to form a ring transmission route through which the TL frame 100 circulates, between the own processor and the connected processor. At this point in time, processors constituting the ring transmission route will start serving as a series of system.

In this state, however, reading/writing of waveform data from/to the TL frame 100 is not performed, but data other than the waveform data, such as the Ethernet frame, the ITL frame, the management data and the like can be written into the TL frame 100 and transmitted/received among the processors (this state is referred to as a "temporary communication (TTL)" mode). In the TTL mode, when a newly found processor is connected to the processors located at ends of the transmission route at the sides where the processors have free transmission/reception I/Fs, the newly connected processor can be incorporated into the transmission route.

Thereafter, when one of the processors is designated as the master node, the ring transmission route is formed again among the processors connected at the point in time, whereby the audio network system 1 is formed through which all the data including the waveform data is written into the TL frame and is circulated among the processors (nodes) (this state is referred to as an "audio transport (RTL) mode"). Also in the RTL mode, when a newly found processor is connected to the processors located at ends of the transmission route at the sides where the processors have free transmission/reception I/Fs, the newly connected processor can be incorporated into the transmission route.

The processor including the network I/F card 215 can construct the audio network system 1 and change the configuration thereof according to the connection status of the processors, by appropriately shifting the operation mode among the ITL mode, the TTL mode, and the RTL mode. Hereinafter, process for constructing the system and changing the configuration of the system will be described.

2.2 Operation at Forming System

Next, process relating to construction and change of configuration of the audio network system, executed by the CPU of the controller 40 in the audio signal processor 2 shown in FIG. 7 will be described.

Figure 9:
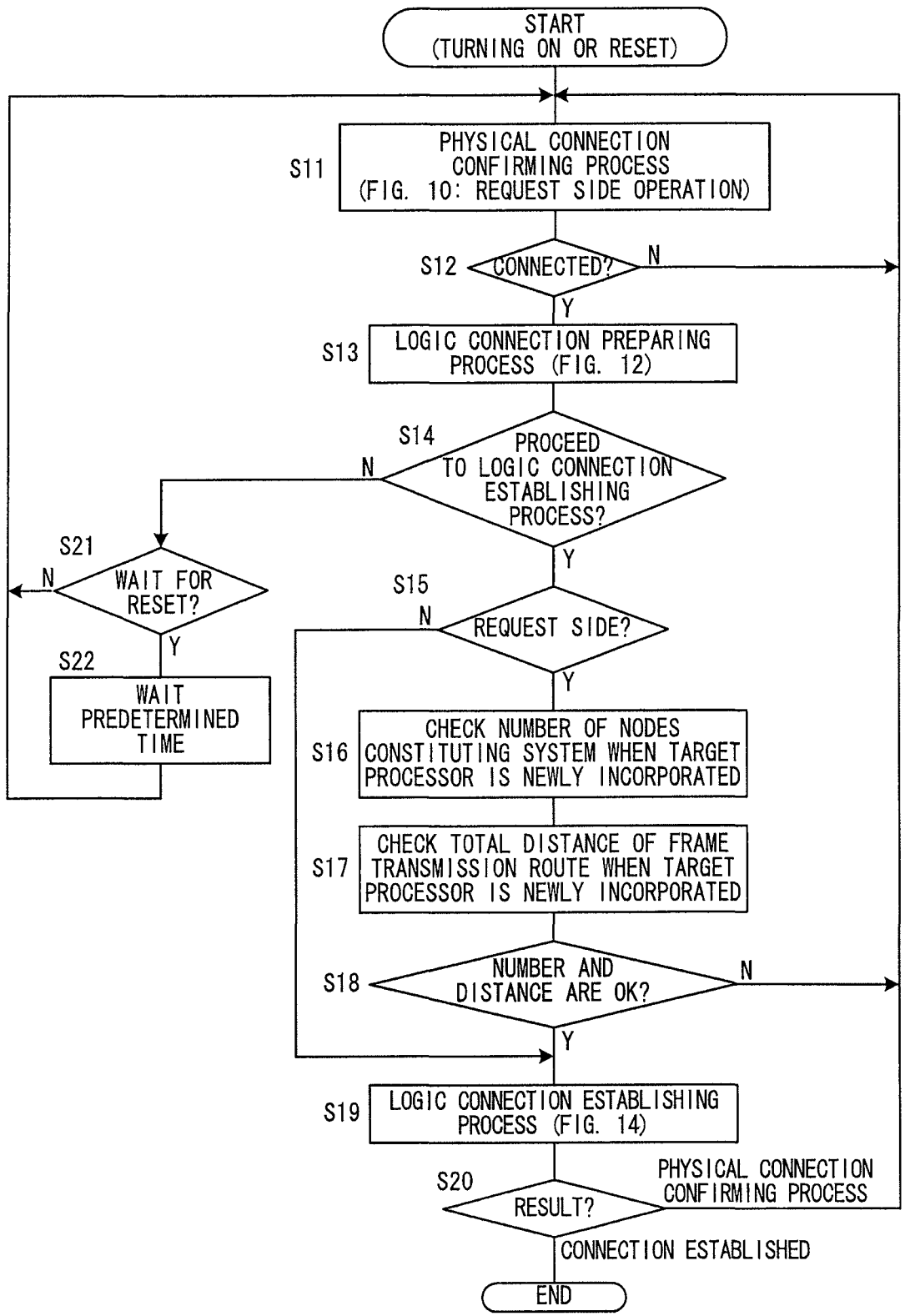
FIG. 9 is a flowchart of process relating to construction of the system, executed by the CPU of the controller of the network I/F card at the time of turning on of the audio signal processor or reset of the network I/F card.

FIG. 9 is a flowchart of process relating to construction of the system, executed by the CPU of the controller 40 at the time of turning on of the audio signal processor 2 or reset of the network I/F card 215. This process is independently performed for each set of transmission/reception I/Fs. For example, in the case of the network I/F card 215 shown in FIG. 8, the CPU of the controller 40 performs process corresponding to the first transmission/reception I/Fs 32 and 33 and the process corresponding to the second transmission/reception I/Fs 34 and 31. In the following description, the transmission I/F and the reception I/F shall be simply used to indicate I/Fs corresponding to those in the process in execution, unless otherwise stated.

In addition to the process corresponding to the I/Fs, the CPU of the controller 40 performs process of acquiring information relating to setting of the MAC address and the operation mode of the own processor from the CPU 201 on the main body side at the time of turning on the power of the audio signal processor 2.

When the CPU of the controller 40 acquires at least the MAC address of the own processor at the time of turning on the power of the audio signal processor 2 or reset of the network I/F card 215, the CPU starts the process shown in the flowchart of FIG. 9. In this process, the CPU firstly executes a request side operation of physical connection confirming process shown in FIG. 10 to confirm whether or not a processor having an ability of forming the audio network system 1 is physically connected to the transmission/reception I/Fs (S11).

Figure 10:
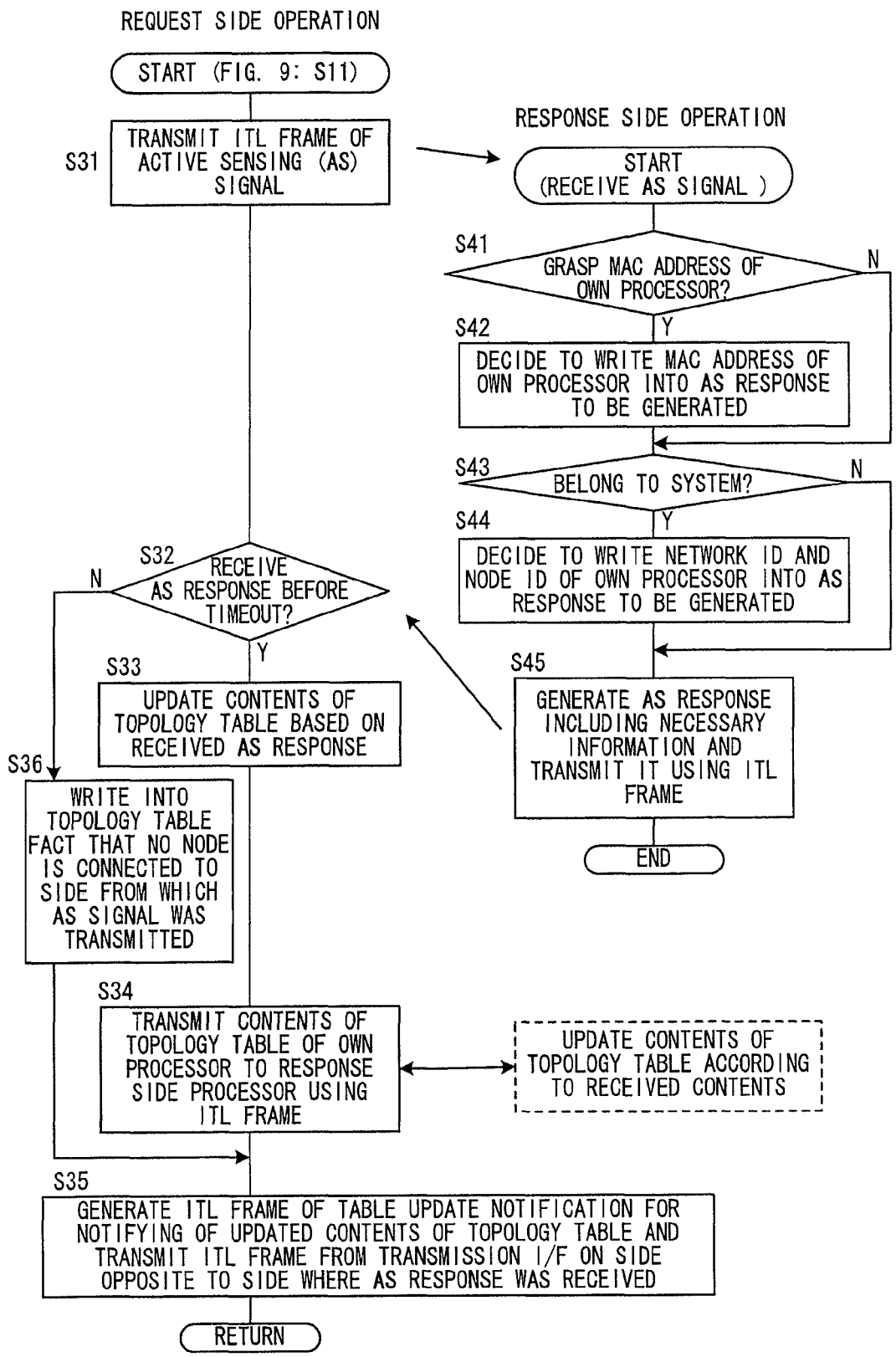
FIG. 10 is a flowchart of physical connection confirming process shown in FIG. 9.

A flowchart of the physical connection confirming process is shown in FIG. 10.

As shown in this drawing, in the request side operation of the physical connection confirming process executed at Step S11 in FIG. 9, the CPU of the controller 40 firstly outputs the ITL frame of an active sensing (AS) signal from the transmission I/F (S31). If any processor is connected to the transmission I/F, this AS signal is received by the connected processor.

If the processor which has received the AS signal also equipped with the network I/F card 215, the CPU of the controller 40 starts the process shown in the flowchart of a response side operation in FIG. 10.

In this process, the CPU of the controller 40 in the processor on the response side generates an AS response that is a response to the received AS signal, and returns the AS response, as an ITL frame of response, to the transmission source processor of the AS signal (S45). The information to be written in the response is determined at Steps S41 to S44. If the CPU of the controller 40 has grasped the MAC address of the own processor, the CPU writes the MAC address into the response (S41 and S42), and when the own processor has already entered the system in the TTL mode or the RTL mode, the CPU writes also the network ID of the system and the node ID of the own processor into the response (S43 and S44).

The network ID is "0" in the case of the TTL mode, and is a value specific to the system in the case of the RTL mode. If the processor has not entered any system yet, the CPU preferably writes a code indicating an "indefinite value" into the AS response as the network ID. The node ID is an ID for discriminating a specific node in the system, and the value of the node ID is a value specific to each node in the system.

On the other hand, the processor which has transmitted the AS signal waits while monitoring reception of the AS response. When the CPU of the controller 40 receives the AS response before timeout after a lapse of a predetermined time (S32), the CPU finds that a processor having an ability of forming the audio network system 1 is connected to the transmission/reception I/Fs. Hence, the CPU updates the contents of the topology table based on the contents of the received AS response (S33). The topology table is a table which records the order of the connection of processors which are connected to the own processor directly or indirectly via other processors.

FIG. 11 shows an example of the topology table.

As shown in this drawing, in what orders what kinds of processors are connected to the backward side and the forward side of the own processor are registered in the topology table using their network IDs, node IDs, and MAC addresses. The MAC address of them is specific to a processor, whereas the network ID and the node ID are variable according to the state of entry to the system. A model ID of the processor and a later-described frame transport delay time between processors (or a distance between processors) may also be registered in the topology table.

This topology table is written such that information of a processor which is directly connected to the own processor is indicated in boxes at the uppermost row in the table, and information of a processor which is connected behind the processor written at the uppermost row is indicated in the table in boxes at a row next to the uppermost row and so on, for both the backward side and the forward side.

Which of two sets of transmission/reception I/Fs the forward side processor is connected to may be arbitrarily determined by the ID of the transmission/reception I/Fs or the like at the time of startup. Even if individual processors recognize different sides as the forward side, there is no problem because relative positional relations between the processors can be grasped by each of the processors. However, once the processor shifts to the TTL mode or the RTL mode, the side to which the master node firstly transmits the TL frame circulating through the route shall be regarded as the forward side as has been described in FIG. 4A and FIG. 4B.

Alternatively, it is also adoptable to fix the directions such that the first transmission/reception I/Fs side is the forward side and the second transmission/reception I/Fs side is the backward side, and to define the case in which the forward sides or the backward sides of processors are connected to each other as an error. Such definition decreases the degree of freedom of connection by the user, but makes it easy to control the system.

Returning to explanation of FIG. 10, after Step S33, the CPU of the controller 40 appropriately transmits/receives the ITL frame to/from the response side processor to transmit the contents of the topology table to the response side processor (S34). More specifically, the CPU transmits data of a processor connected to the side opposite to the response side processor, including the information of the connection order, and causes the response side processor to register the information in its topology table.

The CPU then generates an ITL frame of table update notification for notifying of the updated contents of the topology table at Step S33 (that the processor on the response side was registered), and transmits the ITL frame from the transmission I/F on a side opposite to the side where the AS response was received (S35), then ends the process in FIG. 10 and proceeds to the process at Step S12 in FIG. 9.

Though illustration is omitted, the processor which receives the table update notification registers the notified data of the response side processor, into a node table of the own processor. If a processor is connected to the processor which has received the table update notification on the side opposite to the side where the table update notification has been received, the processor which has received the table update notification transmits, also to the processor on the opposite side, the ITL frame of the table update notification for notifying of the updated contents of the topology table. In this manner, the data of the response side processor is registered in node tables in all of the processors positioned on the side of the request side processor which has performed the process in FIG. 10, opposite to the response side processor.

However, the request side operation itself may be ended when the transmission at Step S35 is completed.

In the case of timeout at Step S32, the CPU finds that no processor is connected to the transmission I/F or that even if a processor is connected to the transmission I/F, the processor has no ability of forming the audio network system 1. Hence, the CPU writes into the topology table the fact that no node is connected to the side from which the AS signal has been transmitted (S36). The CPU then proceeds to Step S35 and generates an ITL frame of table update notification for notifying of the updated contents of the topology table at Step S36, transmits the ITL frame from the transmission I/F on the side opposite to the side where the AS response has been received, then ends the process in FIG. 10, and proceeds to the process at Step S12 in FIG. 9.

Note that, the updated contents of the topology table are sequentially transferred to all of the processors connected to the side opposite to the side from which the AS signal has been transmitted also in this case as in the case of YES at Step S32.

Further, if it is obvious that no processor is connected to the transmission/reception I/Fs, because the reception I/F cannot detect the network clock or the like at Step S31, the CPU may make a judgment of NO at Step S32 without transmitting the AS signal.

After completion of the process in FIG. 10, the CPU of the controller 40 judges, at Step S12 in FIG. 9, whether or not the connection of a processor having an ability of forming the audio network system 1 to the transmission/reception I/Fs has been confirmed (Y/N at Step S32) in the physical connection confirming process.

When the connection has not been confirmed yet, the CPU returns to Step S11 and performs again the physical connection confirming process (the CPU may perform the physical connection confirming process after waiting a predetermined time). On the other hand, when the connection has been already confirmed, the CPU proceeds to logic connection preparing process shown in FIG. 12, and judges what type of system in the TTL mode or the RTL mode the processor can form with respect to the target processor whose connection with the own processor has been confirmed (S13).

Roughly summarized, the logic connection preparing process is process of referring to the network IDs of the own processor and the target processor and determining incorporation of the processor in a lower priority mode into the system which the processor in a higher priority mode belongs to, where the priorities are set in the order of RTL>TTL>ITL. The logic connection means formation of a common transmission route through which the TL frame circulates among processors, or addition of a newly found processor to the existing transmission route.

Figure 12:
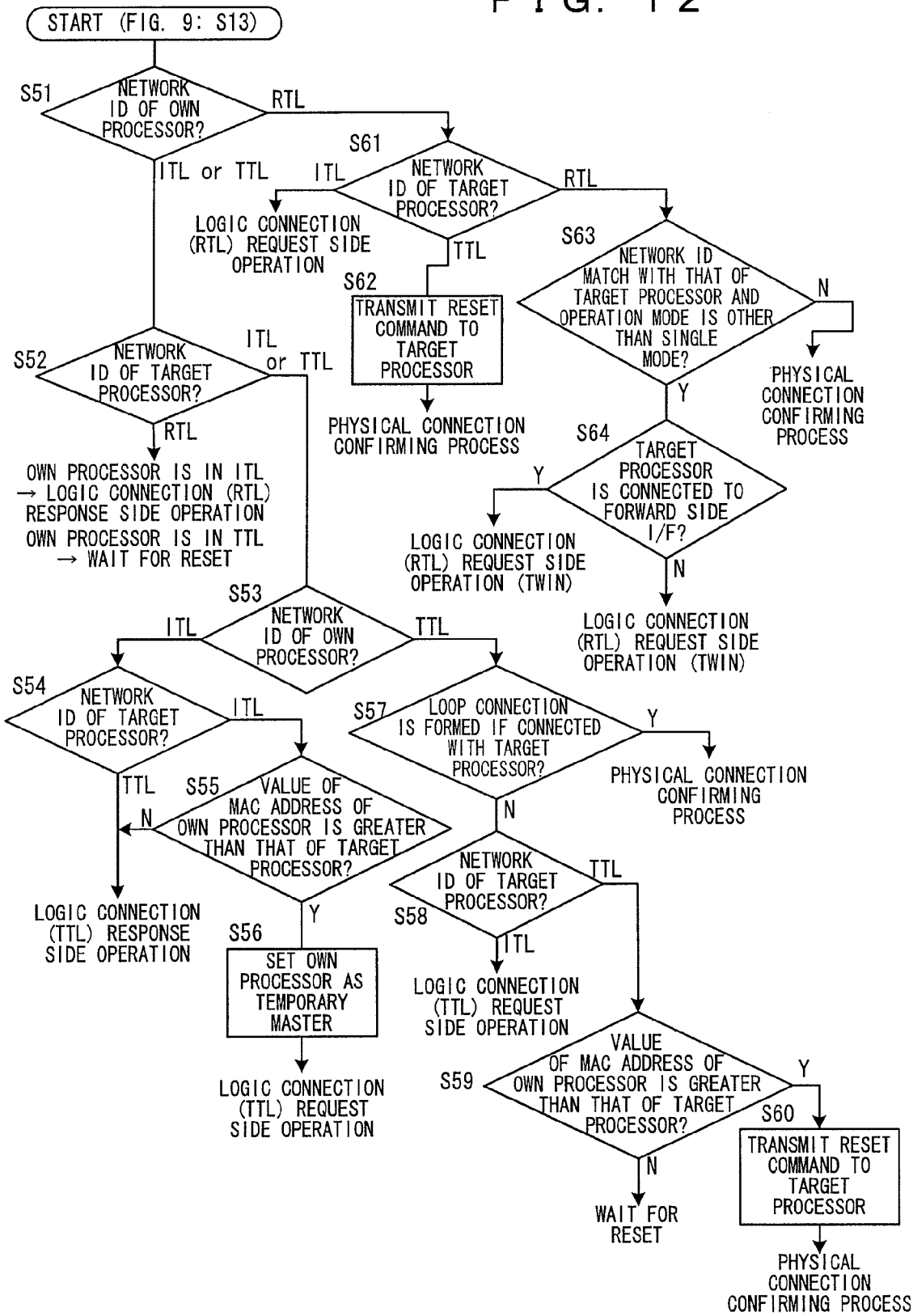
FIG. 12 is a flowchart of logic connection preparing process shown in FIG. 9.

A flowchart of the logic connection preparing process is shown in FIG. 12.

As shown in this chart, the CPU of the controller 40 firstly judges in which mode among the RTL, TTL, and ITL modes the own processor is, by referring to the network ID of the own processor in the logic connection preparing process (S51).

When the own processor is in the ITL mode or the TTL mode, the CPU then confirms the network ID of the target processor to judge in which mode among the RTL, TTL, and ITL modes the target processor is (S52). When the target processor is in the RTL mode, the CPU recognizes that the own processor is in a lower priority mode than the target processor, and thus decides to be incorporated into the system in the RTL mode which the target processor belongs to.

If the own processor is in the ITL mode, the own processor can be incorporated into the system without problem, the CPU decides to perform the response side operation so as to shift the own processor to the RTL mode in the logic connection establishing process at Step S19 in FIG. 9.

When the own processor is in the TTL mode, the CPU decides to shift to a state of waiting for a reset command from the target processor in order to accept a reset operation once to get out of the system in the TTL mode and then be incorporated into the system which the target processor belongs to. The reason why the acceptance of the reset operation once is requested is that if nodes at the ends of two systems in each of which a ring transmission route has been formed are connected to each other as they are, a new transmission route in which the two rings are merged is formed and two TL frames will exist on the newly formed transmission route, with the result that frame transport cannot be normally performed.

When the operation which should be performed by the own processor is determined as described above, the CPU ends the process in FIG. 12 and proceeds to the process at Step S14 in FIG. 9.

When the target processor is in the ITL mode or the TTL mode at Step S52, the CPU of the controller 40 proceeds to Step S53.

When the own processor is in the ITL mode (S53) and the target processor is in the TTL mode (S54), the CPU recognizes that the own processor is in a lower priority mode than the target processor, and thus decides to be incorporated into the system in the TTL mode which the target processor belongs to. Hence, the CPU decides to perform the response side operation so as to shift the own processor to the TTL mode in the logic connection establishing process at Step S19 in FIG. 9, then ends the process in FIG. 12 and proceeds to the process at Step S14 in FIG. 9.

When both the own processor and the target processor are in the ITL mode, the CPU decides to form a system in the TTL mode with the target processor, and at this time, the CPU needs to decide which of the own processor and the target processor becomes a temporary master node in the system. Any algorithm can be used for the decision of the temporary master node, and here the decision is made depending on the value of the MAC address. Hence, in this case, the CPU judges whether or not the value of the MAC address of the own processor is greater than that of the target processor (S55). When the value of the MAC address of the own processor is greater than that of the target processor, the CPU sets the own processor as the temporary master (S56). Further, to initiatively shift the own processor and the target processor to the TTL mode, the CPU decides to perform the request side operation to shift the processors to the TTL mode in the logic connection establishing process at Step S19 in FIG. 9, then ends the process in FIG. 12 and proceeds to the process at Step S14 in FIG. 9.

When the value of the MAC address of the own processor is smaller than that of the target processor, the target processor becomes the temporary master. Accordingly, for the own processor to be incorporated in the system by the target processor, the CPU decides to perform the response side operation to shift the own processor to the TTL mode, then ends the process in FIG. 12 and proceeds to the process at Step S14 in FIG. 9.

Conceivable algorithms as the algorithm for deciding the temporary master includes an algorithm in which a processor which has transmitted the AS signal in the physical connection confirming process is set as the temporary master, an algorithm in which a processor operating for a longer time from the turning on of the power or from the reset is set as the temporary master, and an algorithm using combinations of those conditions, in addition to the algorithm in which the temporary master is set depending on the magnitude of the MAC address.

When the own processor is in the TTL mode at Step S53, the CPU judges whether or not a loop connection is formed if the own processor is connected with the target processor (S57). Specifically, the CPU judges whether or not the target processor is a node located at the opposite end of the system which the own processor belongs to. This judgment may be performed by acquiring, from the topology table, the MAC address of the node at the opposite end of the system.

Taking into consideration the fact that the TTL mode is a temporary communication mode until the processor shifts to the RTL mode, only the operation in the single mode that is the basic configuration of the network is permitted in the TTL mode in this embodiment. Therefore, when YES is judged at Step S57, the CPU does not establish the logic connection with the target processor. Hence, the CPU decides to return to the physical connection confirming process, then ends the process in FIG. 12 and proceeds to the process at Step S14 in FIG. 9. In this case, even if the CPU does not establish the logic connection with the target processor, there may be no processor which cannot enter the system in the TTL mode because the target processor has already entered at least the system in the TTL mode.

In this case, if there is no change in the connection status between the processors, the process so far will be repeated at all times, because YES is judged at Step S57 even in the logic connection preparing process after the physical connection confirming process for the next time. However, the CPU preferably periodically performs the physical connection confirming process and the logic connection preparing process so that when the connection status between the processors is changed, the CPU can quickly shift each processor to an appropriate communication mode.

On the other hand, when NO is judged at Step S57 and if the target processor is in the ITL mode (S58), the CPU recognizes that the own processor is in a higher priority mode than the target processor, and thus decides to incorporate the target processor into the system in the TTL mode which the own processor belongs to. Hence, the CPU decides to perform the request side operation so as to shift the target processor to the TTL mode in the logic connection establishing process at Step S19 in FIG. 9, then ends the process in FIG. 12 and proceeds to the process at Step S14 in FIG. 9.

When the target processor is in the TTL mode (S58), the CPU recognizes that the own processor and the target processor belong to different systems in the TTL mode. In this case, the CPU performs the operation for once removing one of the processors from the system which the one processor belongs to, and incorporating the one processor into the system which the other processor belongs to (in this case, the system from which the one processor is removed will be deconstructed as will be described later).

In this case, though whichever one of the processors may be removed from the system, the CPU decides the one processor to be removed depending on the value of the MAC addresses of the processors connected to each other (S59), similarly to the case of Step S55. Hence, when the value of the MAC address of the own processor is greater than that of the target processor, the CPU transmits the ITL frame of a reset command to the target processor so as to remove the target processor from the system (S60). Since the target processor shifts back to the ITL mode by the reset as will be described later, the CPU decides to perform again the process starting from the physical connection confirming process, then ends the process in FIG. 12 and proceeds to the process at Step S14 in FIG. 9.

In this case, if there is no change in the connection status between the processors, the CPU will proceed to the lower side at Step S58 in the logic connection preparing process after the physical connection confirming process for the next time.

On the other hand, when the value of the MAC address of the own processor is smaller than that of the target processor at Step S60, the CPU decides to wait for a reset command from the target processor so as to let the target processor to deconstruct the system which the own processor belongs to, then ends the process in FIG. 12 and proceeds to the process at Step S14 in FIG. 9.

Note that at Step S60, an algorithm is also employable in which a system including a smaller number of nodes constituting the system is deconstructed, in addition to the algorithm exemplified in the description of Step S55.

When the own processor is in the RTL mode at Step S51 and if the target processor is in the ITL mode (S61), the CPU recognizes that the own processor is in a higher priority mode than the target processor, and thus decides to incorporate the target processor into the system in the RTL mode which the own processor belongs to. Hence, the CPU decides to perform the request side operation so as to shift the target processor to the RTL mode in the logic connection establishing process at Step S19 in FIG. 9, then ends the process in FIG. 12 and proceeds to the process at Step S14 in FIG. 9.

Also when the target processor is in the TTL mode at Step S61, the CPU recognizes that the own processor is in a higher priority mode than the target processor, and thus decides to incorporate the target processor into the system in the RTL mode which the own processor belongs to. In this case, however, the CPU needs to once remove the target processor from the system which the target processor belongs to before the incorporating the target processor, and thus transmits an ITL frame of the reset command to the target processor (S62). The target processor shifts back to the ITL mode by the reset as will be described later, the CPU decides to perform again the process starting from the physical connection confirming process, then ends the process in FIG. 12 and proceeds to the process at Step S14 in FIG. 9. In this case, if there is no change in the connection status between the processors, the CPU will proceed to the left side at Step S61 in the logic connection preparing process after the physical connection confirming process for the next time.

When the target processor is in the RTL mode at Step S61, basically the CPU does not establish the logic connection with the target processor. In this embodiment, the RTL mode is considered as the mode in which the audio network system 1 is actually used for the audio signal processing, and therefore it is not preferable to deconstruct the system in the RTL mode without express intension from the user. For this reason, the CPU does not unite the systems both in the RTL mode to each other (there is no problem with addition of a processor to the system).

However, when the own processor is connected to a processor at the opposite end of the system which the own processor belongs to, the connection type is changed from the cascade connection to the loop connection, and it is conceivable that the operation state is shifted from the single mode to the twin mode. In the RTL mode, whether or not the shift is permitted is decided by the mode setting of the system made in the master node as has been described in the description for FIG. 1A to FIG. 1C. Namely, all of the nodes in the transmission route for the TL frame have been previously notified of the mode setting in the master node from the master node.

Hence, when the network ID of the own processor matches with the network ID of the target processor and if the "twin mode available" (other than the "single mode only") has been set (S63), the CPU decides to shift the whole system which the own device belongs to, to the twin mode. A problem in this case is to decide which of the own processor and the target processor takes the initiative in the logic connection process, and a processor located at the backward side shall take the initiative here. Hence, according to the result of judgment at Step S64, the CPU decides to perform the request side operation or the response side operation so as to shift the system to the RTL mode in the twin mode in the logic connection establishing process at Step S19 in FIG. 9, then ends the process in FIG. 12 and proceeds to the process at Step S14 in FIG. 9.

The judgment of NO at Step S63 is made in the case (a) in which the network ID of the own processor is different from the network ID of the target processor, that is, when the different systems in the RTL mode are connected to each other, or in the case (b) in which the operation in the twin mode is not permitted. In either case, the CPU does not perform the logic connection with the target processor, and thus decides to return to the physical connection confirming process, then ends the process in FIG. 12 and proceeds to the process at Step S14 in FIG. 9.

In this case, if there is no change in the connection status between the processors, the process so far will be repeated at all times, because NO is judged at Step S63 even in the logic connection preparing process after the physical connection confirming process for the next time. However, it is preferable that the CPU periodically performs the process, as in the case of YES at Step S57.

Return again to the explanation of FIG. 9.

After completion of the logic connection preparing process shown in FIG. 12, one of the logic connection process, the reset waiting state, and the physical connection process is decided to be executed next, and the CPU will proceed to Step S14 in FIG. 9.

When the decided process is the physical connection process, NO is judged at Steps S14 and S21, and the CPU returns to Step S11 and repeats the process.

On the other hand, when the decided process is the reset waiting state, the CPU proceeds from Step S21 to Step S22 and waits a predetermined time for a reset request from the target processor. Also on the target processor side, the process shown in FIG. 9 has been started at the time of turning on the power or the time of reset. When the relation between the own processor and the target processor is such that the logic connection preparing process results in "the reset waiting state", the target processor will transmit the ITL frame of the reset command at Step S60 or S62 in the logic connection preparing process executed in the target processor.

Figure 13:
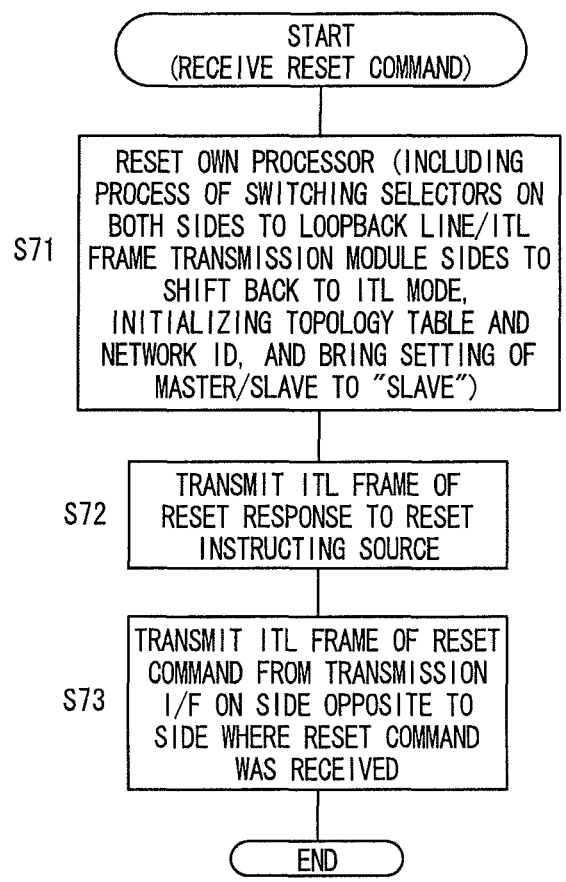
FIG. 13 is a flowchart of process executed when the reset command is received.

A flowchart of process executed by the CPU of the controller 40 when the processor receives the reset command is shown in FIG. 13. This process is executed by an interruption, independently of other process.

When the CPU of the controller 40 receives the reset command, the CPU of the controller 40 firstly performs reset of the own processor (S71). This reset includes process of switching the selectors 35 to 38 on both I/F sides to the loopback line/ITL frame transmission module sides to shift the own processor back to the ITL mode, process of initializing the topology table and the network ID, and process of bringing the setting of the master/slave to the "slave". Accordingly, the processor which has reset itself will function as a slave node until another setting change is performed thereafter. Note that it is unnecessary to erase the setting of the MAC address, the twin mode permission, and the double communication/duplex communication at the time of reset.

Thereafter, the CPU transmits an ITL frame of a reset response indicating the completion of reset, to the reset instructing source processor (S72), and transmits the ITL frame of the reset command to an adjacent node from the transmission I/F on a side opposite to the side where the CPU received the reset command (S73), and then ends the reset process.

At the time of the reset at Step S71, the CPU of the controller 40 stops the process in FIG. 9 which has been performed until then. Then, the CPU starts again the process shown in FIG. 9 in response to the reset. However, when the processor receives a reset command from another processor, the CPU may subsequently receive a connection query command or the like. Therefore, the CPU may wait a predetermined time until it starts the process shown in FIG. 9.

In contrast, the processor which has sent the reset command to the target processor may start next physical connection confirming process using reception of the reset response from the target processor as a trigger. This is because the target processor has shifted back to the ITL mode at this time, and it is expected that the target processor can be incorporated into the system.

As is obvious from Step S73 in FIG. 13, when the processor at an end of a certain system is reset, all of the processors configuring the system are sequentially reset and shifted back to the ITL mode, where the processors can be incorporated into another system. As described above, all of the processors which belong to a system which will be absorbed to another system by a reset will be once shifted back to the ITL mode, in the case where systems operating in the TTL mode are united with each other and the case where a system operating in the RTL mode absorbs a system operating in the TTL mode.

Though illustration is omitted, the processor which has received the reset response deletes, from the node table of the own processor, the information of the processor which performed reset and processors behind it. The processor which has received the reset response transfers the deletion also to processor connected thereto on the side opposite to the side where the reset response has been received, to cause the processor on the opposite side to delete the information of the processor which performed reset and the processors behind it, and also cause processors behind the processor on the opposite side to perform deletion in sequence.

Return to Explanation of FIG. 9.

In the logic connection preparing process at Step S13, when the CPU decides to execute the logic connection establishing process, the process proceeds from Step S14 to Step S15. When the CPU executes the logic connection establishing process as the request side, the CPU judges whether or not there is a trouble in transporting the TL frame even if the target processor is incorporated into the system which the own processor belongs to (S16 to S18). This judgment is performed based on the number of nodes and on a total distance of the frame transmission route.

The number of nodes can be easily grasped by referring to the topology table, and it is assumed that there is no problem when the number of nodes including the incorporated target processor falls within a predetermined number. However, in the case of shifting to the twin mode, it should be cared that the number of nodes does not increase due to the connection, because the connection is performed among the nodes which have already belonged to the system.

To obtain the total distance of the frame transmission route, the CPU firstly measures the distance between the own processor and the target processor. The measurement can be performed by measuring a time period between the timing when an ITL frame for measurement of distance (an ITL frame in the format shown in FIG. 4B) is transmitted to the target processor and the timing when an ITL frame of response (an ITL frame also in the format shown in FIG. 4B) is received, the target processor transmitting the response immediately after receiving the ITL frame for measurement of distance. The time period required between the timing when the ITL frame for measurement of distance is received by the target processor and the timing when the ITL frame of response is transmitted from the target processor is considered to be constant for each of kinds and versions of the network I/F network card 215. Therefore, a time period obtained by subtracting the constant time period from the measured time period will be a time period proportional to the distance between the processors. It is preferable to perform the measurement several times and to employ a maximum value from among values which are recognized as stable values. In order to avoid an error, it is preferable that transmission/reception of other ITL frames such as the ITL frame of the AS signal and so one is not performed during the measurement.

The distance measurement is performed without exception when each processor is incorporated into the system, and the distance between adjacent processors is recorded in the topology table or the like, whereby the total distance of a frame transmission route when a newly added processor is incorporated can be obtained by summing up the distances between the processors in the system. In the case where the total distance falls within the predetermined value, the case is judged as no problem.

When there is no problem both in the number of nodes and the total distance, the CPU proceeds from Step S18 to Step S19 and executes the logic connection establishing process. On the other hand, when there is a problem, the CPU cannot incorporate the target processor into the system, thus returns from Step S18 to Step S11 and repeats the process. In this event, the CPU may transmit a notification of incorporation impossibility to the target processor.

One of reasons why the standards are prepared at Steps S16 and S17 is that if the number of nodes is larger than the predetermined number and the total distance of the transmission route is longer than the predetermined value, the time period required for the TL frame to circulate through the transmission route once increases, and therefore the TL frame transmitted from the master node cannot be returned to the master node by the timing at which the TL frame is used for generation of a TL frame in the later period.

Upon consideration of these situations, if (Permissible Time for Frame Transport Delay Determined According to Periodic Update Value k)−
(Transport Delay Time Per Node)×(Number of Nodes)>(Transport Delay Time Depending on Total Distance of Transmission Route)

is established, it may be judged that there is no problem at Step S18.

The permissible time for frame transport delay determined according to the periodic update value k is time period that is shorter than the k sampling period by a predetermined time α that is a time period necessary for preparation of a new TL frame in the master node. Accordingly, the permissible time can be increased by increasing the periodic update value k.

Hence, when the number of nodes and the total distance of the transmission route do not meet the above conditions, the conditions can be met even by increasing the periodic update value k.

Figure 14:
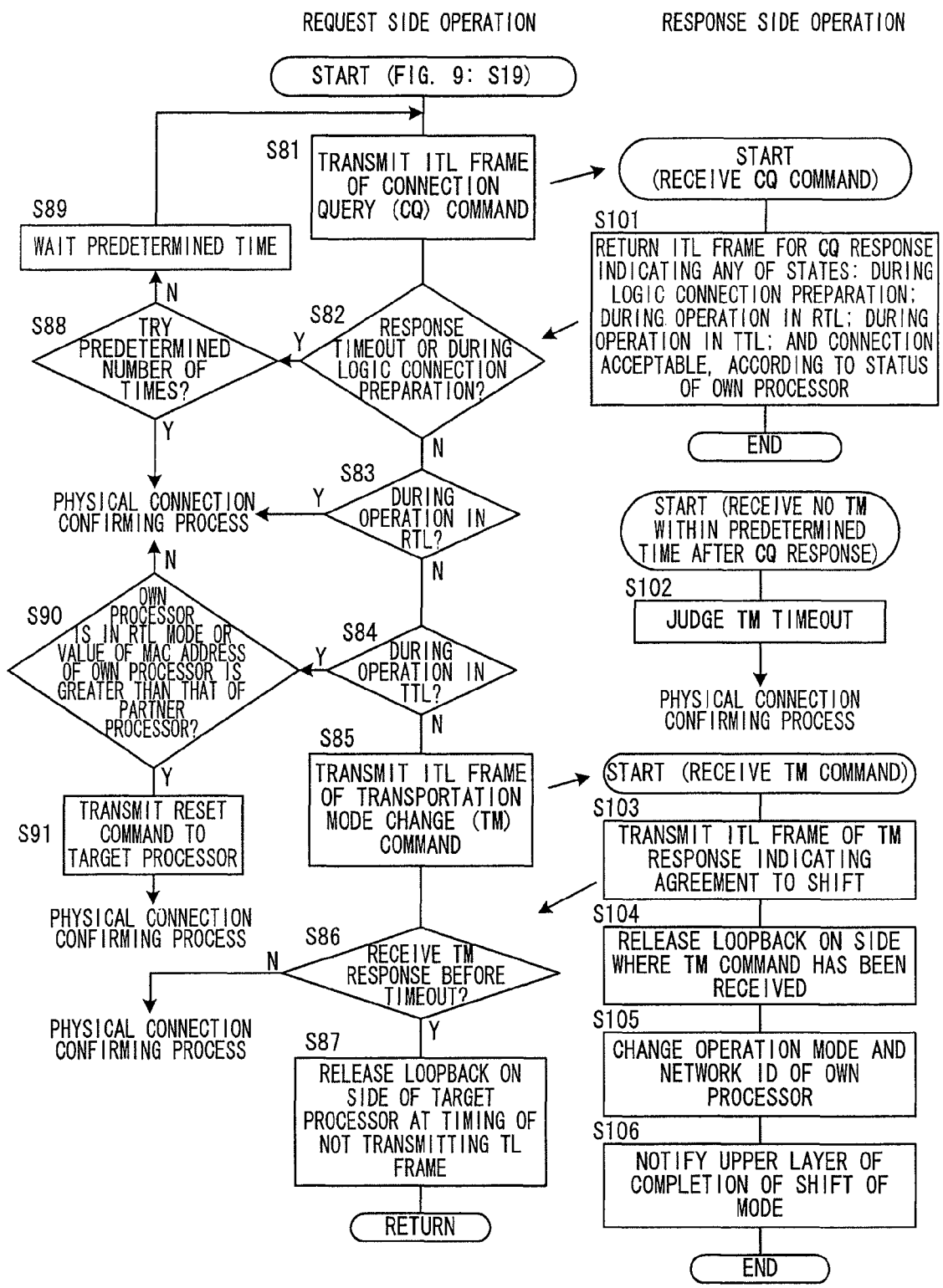
FIG. 14 is a flowchart of logic connection establishing process shown in FIG. 9.

Next, a flowchart of the logic connection establishing process executed at Step S19 in FIG. 9 is shown in FIG. 14.

This process is process executed by the processor which performs the request side operation, to finally confirm that the processor performing the response side operation can be incorporated into the system which the own processor belongs to and to execute the incorporation. The response side operation is essentially passive process that is process performed according to the command received from the processor which performs the request side operation. When the own processor performs "the response side operation" with respect to the target processor in the logic connection preparing process, the target processor will decide to perform "the request side operation" in the logic connection preparing process executed by the target processor.

In this logic connection establishing process, the processor on the request side firstly outputs an ITL frame of a connection query (CQ) command to finally confirm that the target processor (the processor on the response side) can be incorporated into the system, from the transmission I/F (S81). Note that it is preferable to write information indicating into which mode (RTL/TTL and single/twin) of system the target processor is to be incorporated, into the CQ command in advance and cause the target processor to prepare communication in the mode written in the CQ command.

When the target processor receives the CQ command, the CPU of the controller 40 returns, to the transmission source processor of the CQ command, an ITL frame of a CQ response indicating any of following status: during logic connection preparation; during operation in RTL; during operation in TTL; and connection acceptable, according to the status of the own processor (S101).

Since it has been confirmed in the logic connection preparing process that the target processor can be incorporated into the system, the response from the target processor will be essentially "the connection acceptable." However, if another processor is connected to the side of the target processor opposite to the own processor, it is conceivable that the target processor has been incorporated into a system of the processor on the opposite side by a request from the opposite side processor or preparation of incorporation has advanced during the time when the own processor is performing the process at Steps S14 to S18.

In such a case, the above-described responses other than the "connection acceptable" will be returned. The state "during logic connection preparation" indicates the state in which the target processor receives a CQ command from another processor and then waits for reception of a transportation mode change (TM) command. The state "during operation in RTL" and the state "during operation in TTL" indicate the states in which the target processor has been already incorporated into the system in the RTL mode or the TTL mode.

On the other hand, the processor which has transmitted the CQ command waits while monitoring the reception of the CQ response. Upon timeout after a lapse of a predetermined time or reception of the CQ response indicating the state during logic connection preparation (S82), the processor retries the transmission of the CQ command up to a predetermined number of times (S88 and S89). If the situation is still unchanged after the retry, the CPU gives up the incorporation of the target processor into the system this time and decides to return to the physical connection confirming process, and ends the process in FIG. 14. Note that in the case of timeout of response, the CPU does not need to wait a predetermined time at Step S89.

When receiving the CQ response indicating the status of "during operation in RTL" (S83), the CPU cannot incorporate the target processor into the system, thus decides to return also to the physical connection confirming process, and ends the process in FIG. 14.

When the processor receives the CQ response indicating the status of "during operation in TTL" (S84), and if the own processor enters the system in the RTL mode or if the value of the MAC address of the own processor is greater than that of the target processor (if the systems in the TTL mode are connected to each other and the target processor may be removed from the system which the target processor belongs to) (S90), the CPU transmits the ITL frame of the reset command to the target processor (S91). In order to perform the process from the beginning to incorporate the target processor into the system, the CPU decides to return to the physical connection confirming process, and then ends the process in FIG. 14. When NO is judged at Step S90 is, the CPU cannot incorporate the target processor into the system, thus decides to just return to the physical connection confirming process, and ends the process in FIG. 14.

On the other hand, when the processor receives the CQ response indicating "the connection acceptable", NO is judged at all of Steps S82 to S84. The CPU transmits a transportation mode change (TM) command finally requesting change of the operation state to the target processor, from the transmission I/F (S85). Note that information of into which mode (RTL/TTL and single/twin) the target processor is to be shifted and information of the system network ID of the system into which the target processor is to be incorporated are written in the TM command.

When the target processor receives the TM command, the CPU of the controller 40 first transmits an ITL frame of a TM response indicating agreement to the shift, to the transmission source processor of the TM command (S103). Immediately thereafter, the CPU releases the loopback of the TL frame on the side where the TM command has been received (S104). This release can be performed only by switching two selectors on the side where the loopback is released to the reception I/F side and the TL frame transmission module side, respectively.

Since a processor newly incorporated into the system has not performed transmission/reception of the TL frame yet, the release of the loopback can be performed at any timing without problem. Further, the release of the loopback is performed in a similar manner in any case of shifting the processor to any mode. However, after the release of the loopback, the ITL frame cannot be directly transmitted any longer on the side where the release has been performed (however, the ITL frame can be still transmitted if it is written into a TL frame), and therefore the transmission of the TM response is performed before the release of the loopback.

After Step S104, the CPU changes the operation state and the network ID of the own processor according to the designation by the TM command (S105) and notifies the upper layer (the CPU on the main body side) of the completion of the shift of mode (S106), and then ends the process. At the time of Step S105, the CPU makes setting, such as which one (or both) of the first and second data input/output modules 10 and 20 is(are) used to read/write the waveform data from/into the TL frame and the Ethernet frame, whether or not reading/writing of the waveform data from/into the TL frame is performed, and so on according to the operation state and the configuration of the system.

On the other hand, after transmitting the TM command, when the request side processor receives the TM response from the target processor before timeout (S86), the CPU switches the selectors at a timing when the own processor is not transmitting/receiving any TL frame to release the loopback on the side of the target processor (S87). In a processor which belongs to the system, if the loopback is released during transmission/reception of the TL frame, the TL frame is dividedly transmitted, from its middle part, to another transmission destination, resulting in a break of the TL frame. Hence, it is important to release the loopback in the interval between frames as shown in FIG. 5. When the request side processor performs logic connection with another processor for the first time, the TL frame has not circulated yet at the stage of Step S87. Hence, after Step S87, the request side processor only needs to start generation and transmission of a TL frame as a master node (as a temporary master node in the TTL mode).

The CPU ends here the logic connection process in FIG. 14.

In the case of timeout at Step S86, the CPU gives up the incorporation of the target processor into the system this time and decides to return to the physical connection confirming process, and ends the process in FIG. 14.

When the response side processor does not receive the TM command within a predetermined time after transmission of the CQ response, the CPU also judges that it is timeout (S102), and gives up the incorporation this time and decides to return to the physical connection confirming process, and ends the logic connection establishing process. This also applies to the case where the CPU does not receive the CQ command within a predetermined time after the start of the response side operation.

Returning again to explanation of FIG. 9, after the completion of the logic connection establishing process shown in FIG. 14, the CPU proceeds to Step S20. When the connection is established in the logic connection establishing process (the process at Step S87 of the request side operation or the process at Step S104 of the response side operation is executed), the CPU just ends the process. On the other hand, when the CPU decides to try the physical connection again, the CPU returns to Step S11 and repeats the process.

The CPUs of the controllers 40 execute the process described using FIG. 9 to FIG. 14 in a plurality of audio processors 2, whereby processors can automatically constitute a network system in which the TL frame can circulate in the TTL mode, in the order of the processor which is newly turned on and cables are connected thereto.

Though the waveform data is not transported in this state, the Ethernet frame and the ITL frame can be written into the TL frame and freely transmitted/received between processors that have become nodes constituting the system. Accordingly, such an operation can be performed without any problem that, in accordance with manipulation on a console of a certain processor, the manipulation contents is transmitted to another processor and values of parameters in the other processor is edited according to the manipulation contents. Further, by transmitting/receiving the IP packet using the Ethernet frame, negotiation according to a complex algorithm can be easily performed.

The process shown in FIG. 9 is performed independently for each set of transmission/reception I/Fs as described above. After the system is formed of a plurality of processors, processors at both ends of the system independently perform the process shown in FIG. 9 for the transmission/reception I/Fs on the side where the loopback is performed.

Accordingly, it may happen that though the conditions at Steps S16 to S18 can be met when a newly found processor is incorporated into the system only on one side, the conditions cannot be met when newly found processors are incorporated into the system at the same time on both ends of the system.

In such a case, it is preferable to forcibly remove the processor which has been incorporated into the system on whichever side determined in advance, the forward side or the backward side, from the system at the judgment of the master node, so as to keep the system in a state in which the TL frame can circulate.

The process described so far includes the process of incorporating a newly found processor into the system in the RTL mode but does not include process of firstly setting the processor in the RTL mode. The setting process will be described next.

In this embodiment, an operation mode change (OM) command is prepared as the command for designating and changing the master node, and a processor which receives the command sets itself as the master node and firstly shifts to the RTL mode.

It is not inhibited that any of processors automatically decides the master node and issues the OM command to the decided node, but the OM command is preferably issued according to the instruction by the user. In this case, a function of accepting the selection of the master node from the user is provided at least in one of processors which will constitute the audio network system 1. The function may be a function of referring to the topology table, and presenting a list of communicable processors to the user to let the user to select one from among the processors in the list as the master node. In this event, it is preferable to accept also setting of the operation mode (twin mode permission, double communication/duplex communication during the twin mode, and so on).

Note that communication among all of the processors which have been physically connected is possible using the ITL frame irrespective of the operation mode of each processor. The ITL frame may be written into the TL frame and transported among the processors which operate in the TTL mode (even in the RTL mode), and the ITL frame may be just transmitted from the ITL frame transmission module in a portion where the transmission route for the TL frame is broken.

When the user selects a processor as the master node, a processor accepting the selection sends an ITL frame of the OM command in which the setting of the operation mode of the system is written as a parameter, with the transportation destination of the processor which has been selected as the master node. This OM command is transmitted to the side where the transportation destination processor exists with reference to the topology table. The operation mode of the system to be written here is a first mode not permitting the twin mode, a second mode permitting the twin mode in the duplex communication, or a third mode permitting the twin mode in the double communication.

Figure 15:
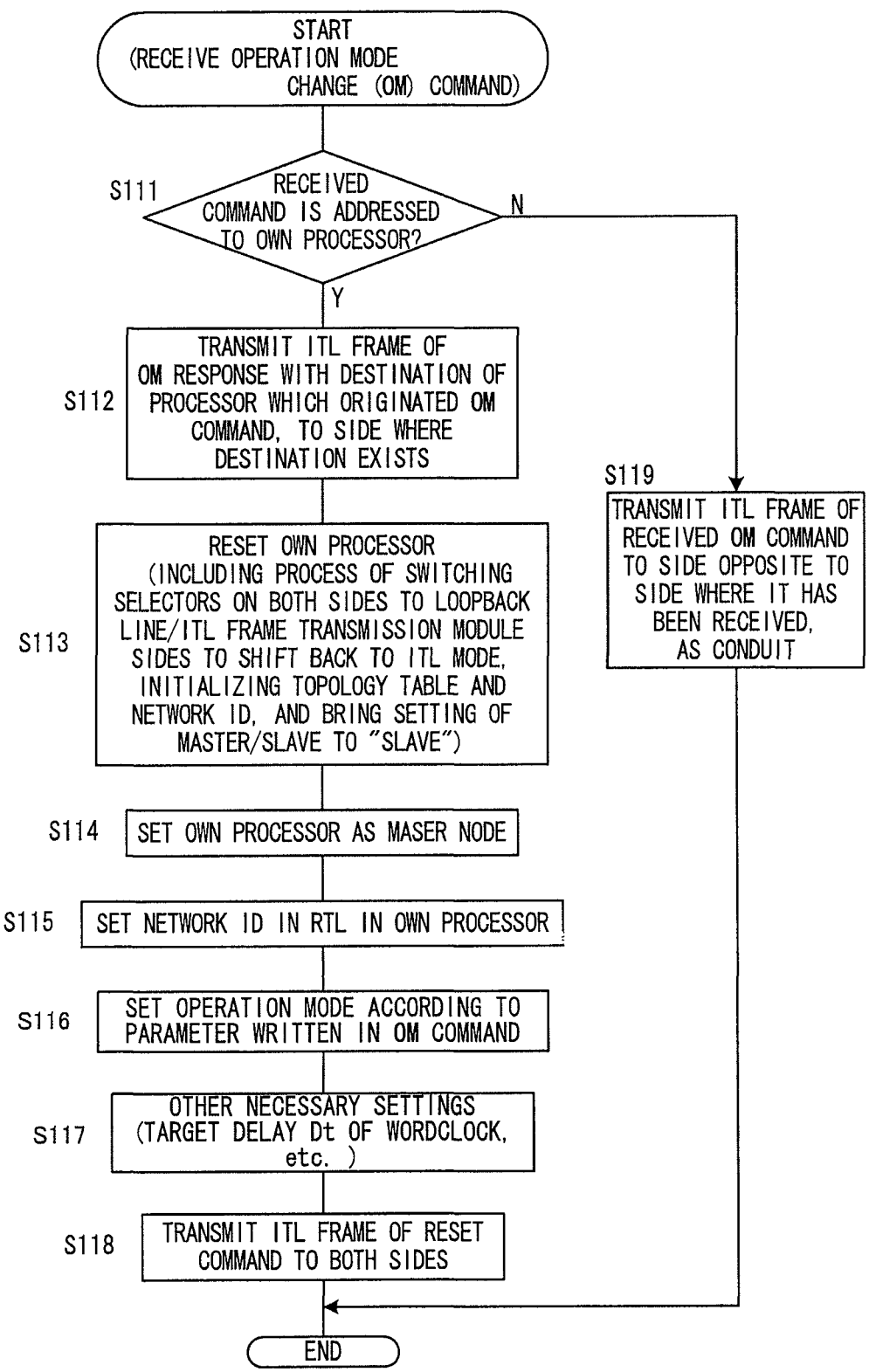
FIG. 15 is a flowchart of process executed when the operation mode change (OM) command is received.

A flowchart of process executed by the CPU of the controller 40 when the processor receives the OM command is shown in FIG. 15.

As shown in the chart, the CPU of the controller 40 of the processor which has received the OM command firstly judges whether the received command is addressed to the own processor (S111). When the OM command is not addressed to the own processor, the CPU transmits the ITL frame of the received OM command to the side opposite to the side where the OM command has been received, as a conduit (S119), and then ends the process. Each of the processor existing between the processor which has sent the OM command and the destination processor mediates the transport of the ITL frame in sequence until the OM command reaches the destination processor. This also applies to the case of other commands.

On the other hand, when the OM command is addressed to the own processor at Step S111, the CPU sends an ITL frame of an OM response, with the destination of the processor which originated the OM command. This OM response is transmitted to the side where the destination processor exists (S112). Thereafter, as in the case of Step S71 in FIG. 13, the CPU resets the own processor and, if the own processor presently belongs to any system, once removes the own processor from the system (S113). Thereafter, the CPU sets the own processor as the maser node to start operation in a master node (S114), and sets a specific network ID in the RTL mode in the own processor (S115).

Thereafter, the CPU sets the operation mode according to the parameter written in the OM command (S116), further makes other necessary settings (S117), then transmits ITL frames of reset commands to both sides of the own processor (S118), and ends the process.

The contents set at Step S117 are, for example, a target delay Dt and so on used for generation of the wordclock for waveform processing, and will be described in detail in "4. Timing Adjustment of Wordclock".

Thereafter, communicable processors are sequentially reset starting from the adjacent processors on both sides of the own processor, and thereby all the communicable processors other than the processor which is designated as the master node start operation as slave nodes, because all processors in the audio network system other than the master node are slave nodes. The processor which has been set as the master node starts the process shown in FIG. 9 to sequentially incorporate processors connected to both sides thereof into the system as a processor which belongs to the system in the RTL mode as far as the conditions are met. The process shown in FIG. 9 is preferably started using the reception of the reset response from an adjacent node of the master node as a trigger. This is because the adjacent node has already shifted back to the ITL mode at this point in time and expected to be ready for incorporation into the system.

By the above-described process, the audio network system 1 in the RTL mode in which audio transport can be performed can be formed, with the master node being set according to the instruction of the user.

Note that even after the system has been formed once, newly found processors which are connected to the system can be incorporated into the system as needed. When the user wants to change the master node or the operation mode, the user can instruct a processor to issue an OM command at any time.

Even if the audio network system 1 is operating in the RTL mode, when any of the nodes receives the OM command addressed to the node, the node which has received the OM command becomes a new master node and resets the whole system by the process shown in FIG. 15 to form again the audio network system 1.

Though the selection of the master node and the setting of the operation mode of the system are performed by one OM command in this embodiment, a command to select the master node and a command to set the operation mode of the system may be different commands.

Further, it is preferable to give the reset commands transmitted at Step S118 and the reset command transmitted at Step S73 in FIG. 13 by the processor which has received the reset command transmitted at Step S118, IDs for specifying the series of reset commands respectively so that each processor does not execute the reset by the process in FIG. 13 according to the reset command when the node receives the reset command having the same ID as that of the reset command which has been received before.

In the loop connection, there is no end of connection and therefore it is conceivable that if each node simply executes the process in FIG. 13 according to the reset command issued from the master node to transfer the reset command to the processor behind the processor which has received the reset command, the transfer of the reset command lasts forever. Therefore, it is effective to provide an element, like the above-described ID, to stop the transfer of the reset command at an appropriate processor.

In this case, if the same ID is given to the reset commands which the master node transmits from its both sides, the transfer of the reset commands is stopped at a node located substantially opposite to the master node in the loop at which the reset commands transmitted from opposite directions meet each other.

2.3 Concrete Examples of Forming System

Next, concrete examples of procedures of forming the audio network system by the process described so far, using FIG. 16 to FIG. 20.

FIG. 16 and FIG. 17, in which five processors, a processor A to a processor E, are connected via communication cables in advance, shows an example of constituting the system when the power is turned on from the processor A to the processor E in this order.

As shown at (a) in FIG. 16, when the processors A and B are turned on, these processors A and B individually start the process shown in FIG. 9 to exchange an AS signal and an AS response by the physical connection confirming process shown in FIG. 10 to recognize the existence of the target processor and exchange information with each other, and register, into the respective topology tables, information of each other (changed portions are shown by hatchings, this also applies to the following stages). Because both of the processors A and B are in the ITL mode in the logic connection preparing process shown in FIG. 12, one of the processors A and B is set as the temporary master node at Steps S55 and S56, and the processors A and B can constitute a system in the TTL mode by the logic connection establishing process in FIG. 14.

Then, when the processor C is turned on as shown at (b) in FIG. 16, the processor B recognizes the existence of the processor C by the physical connection confirming process and exchanges information with the processor C, and the processors B and C register, into the respective topology tables, information of each other.

Thereafter, as shown at (c) in FIG. 16, the processor B notifies the processor C of the information about the processor A which has been already connected to the side of the processor B opposite to the processor C, and notifies the processor A of the information about the processor C which has been newly connected to the side of the processor B opposite to the processor A. As a result, in all of the processors A to C, the information of all of the processors which have been turned on is stored.

Since the processor B is in the TTL mode and the processor C is in the ITL mode, the processor B incorporates the processor C into the system which the processor B belongs to, by the logic connection establishing process in FIG. 14.

Then, also when the processor D is turned on as shown at (d) in FIG. 16, the processor C recognizes the existence of the processor D by the physical connection confirming process and exchanges information with the processor D, and the processors C and D register, into the respective topology tables, information of each other, as in the case of (b) in FIG. 16.

Thereafter, as shown at (e) in FIG. 17, the processor C notifies the processor D of the information about the processors B and A which have been already connected to the side of the processor C opposite to the processor D, and notifies the processor B of the information about the processor D which has been newly connected to the side of the processor C opposite to the processor B. Further, as shown at (f) in FIG. 17, the processor B notifies the processor A connected to the side of the processor B opposite to the processor C, of the information about the processor D which has been notified from the processor C. As a result of the above, in all of the processors A to D, the information of all of the processors which have been turned on is stored.

Since the processor C is in the TTL mode and the processor D is in the ITL mode, the processor C incorporates the processor D into the system by the logic connection establishing process in FIG. 14.

In the similar manner, also when the processor E is turned on as shown at (g) in FIG. 17, the processor D which is a node at the end of the system makes a contact with the processor E which has been newly detected, and incorporates the processor E into the system. Regarding the topology tables, information which has not been grasped by the processors in the system is sequentially transferred to the processors as shown at (h) in FIG. 17, whereby the information of all of the processors which have been turned on is stored into the topology tables in all of the processors A to E.

By the above-described procedure, the network system in which the TL frame circulates in the TTL mode can be automatically formed of the processors A to E which have been turned on in this sequence. In the above example, the same operation is performed even if the turn on is replaced with the connection of cables as a matter of course.

Figure 18:
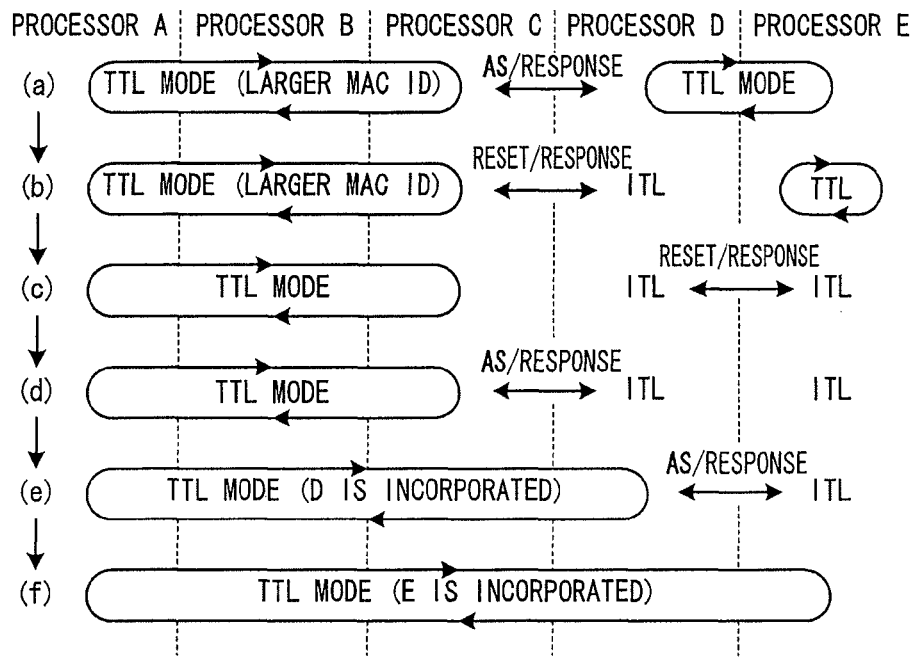
FIG. 18 is an illustration showing another example of the procedure of forming the audio network system.

Next, an operation example where systems operating in the TTL mode are connected to each other is shown in FIG. 18.

This drawing shows an example in which the processor A to the processor C have already formed a system in the TTL mode and the processor D and the processor E have already formed another system in the TTL mode, and the processor C and the processor D are newly connected to each other via communication cables.

In this case, the processor C and the processor D periodically perform the physical connection confirming process at Step S11 in FIG. 9 and therefore confirm the existence of the target processor each other by the physical connection confirming process (see (a) in FIG. 18).

When the flow proceeds to the logic connection preparing process at Step S13, because the processors in the TTL mode are connected to each other, the processor C having a greater value of the MAC address transmits a reset command to the processor D at Step S60 in FIG. 12. As a result, the processor D leaves the previous system and shifts back to the ITL mode (see (b)).

The processor D transmits a reset command also to the processor E on the side of the processor D opposite to the processor C, as part of the reset process. As a result, the processor E also shifts back to the ITL mode (see (c)).

On the other hand, the processor C performs again the physical connection confirming process, the logic connection preparing process, and the logic connection establishing process in sequence, after sending the reset command to the processor D, to thereby incorporate the processor D which has shifted to the ITL mode, into the system which the processor C belongs to (see (d) and (e)).

After being incorporated into the system, the processor D performs the physical connection confirming process, the logic connection preparing process, and the logic connection establishing process in sequence as a node located at the end of the system to thereby incorporate the processor E adjacent thereto which is in the ITL mode, into the system which the processor D belongs to at that time (see (e) and (f)).

When the two systems operating in the TTL mode are connected to each other, the two systems are automatically combined and one system is formed by the above-described procedure.

Figure 19:
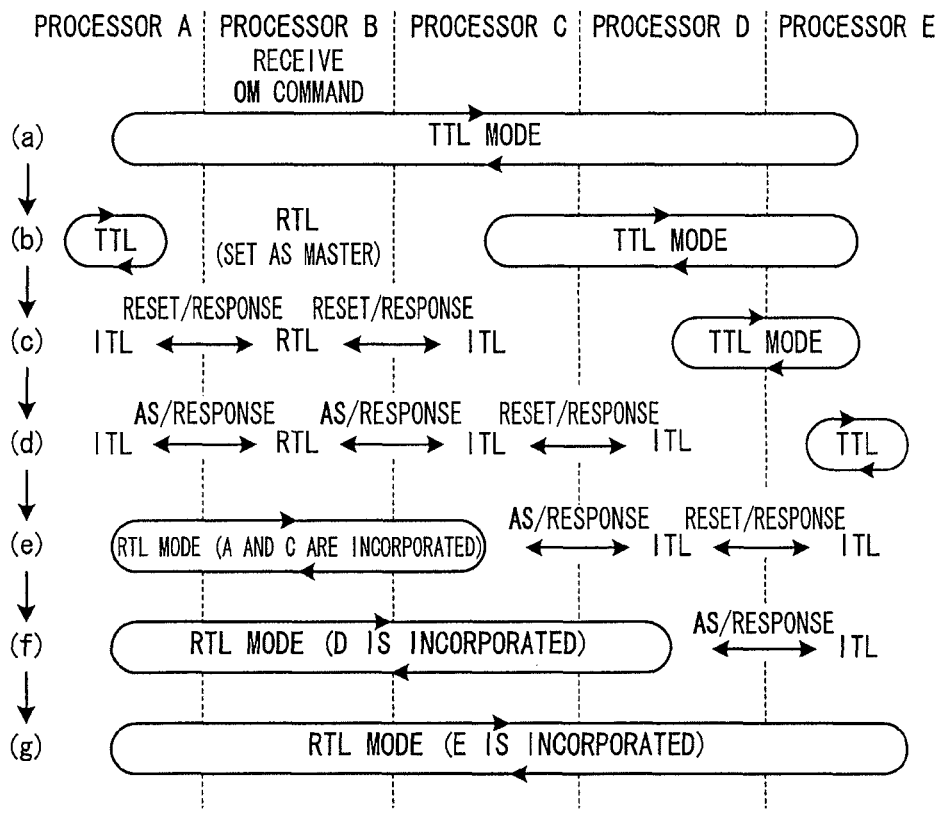
FIG. 19 is an illustration showing still another example thereof.

Next, an operation example where a processor constituting the system operating in the TTL mode receives an operation mode switch (OM) command is shown in FIG. 19.

This drawing shows an example in which the processors A to E form the system in the TTL mode and the processor B among the processors has received the OM command.

In this case, the processor B which has received the OM command resets itself to leave the system which the processor B belongs to, and sets itself as the master and shifts to the RTL mode by the process shown in FIG. 15 (see (a) and (b) in FIG. 19). The processor B further transmits a reset command to the processors on both sides of the processor B to cause the processors to leave from the systems which the processors belong to and shift back to the ITL mode (see (c)).

The reset command is sequentially transmitted to all of the connected processors, namely, from the processor C to the processor D at (d), and from the processor D to the processor E at (e), whereby all of the processors are once shifted back to the ITL mode.

On the other hand, the processor B starts the process shown in FIG. 9 when the processor A and the processor C complete reset and transmit reset responses to the processor B. The processor B performs the physical connection confirming process, the logic connection preparing process, and the logic connection establishing process in sequence to thereby incorporate the processors A and C adjacent thereto which are in the ITL mode, into the system in the RTL mode in which the processor B is the master node at (see (d) and (e)).

Thereafter, the processor C that is the node located at the end of the system at the time of (e) performs the physical connection confirming process, the logic connection preparing process, and the logic connection establishing process in sequence to thereby incorporate the processor D adjacent thereto which is in the ITL mode, into the system which the processor C belongs to at that time (see (f)). The processor D also incorporates the processor E into the system which the processor D belongs to in the same manner (see (g)).

When a processor constituting the system operating in the TTL mode receives the OM command, the processor can reconstruct the system in the TTL mode into the system in the RTL mode by the above-described procedure. Also when a processor constituting the system operating in the RTL mode receives the OM command, each processor similarly operates.

Next, an operation example of shifting from the single mode to the twin mode is shown in FIG. 20.

This drawing shows an example of a system constituted of the processors D, E, A, B, and C connected in this order and operating in the RTL mode, in which the processor C and the processor D at both ends of the system are connected to each other via cables. In this example, it is assumed that the system is permitted to shift to the twin mode.

In this case, the processor C and the processor D periodically perform the physical connection confirming process at Step S11 in FIG. 9, and therefore confirm the existence of each other by the physical connection confirming process when they are connected via the cables (see (a) and (b) in FIG. 20). Further, information of each one of the processors C and D has been registered in the topology table of the other processor, as information of a node at the end on the opposed side of the system. In addition, the information of the processors is also registered as a node on the side where the processors are newly connected (see (b)). The processor C and the processor D can grasp at this time that the physical connection has been changed into the loop shape.

In the case of the cascade connection, each of the processor C and the processor D sends notification of the information of the newly connected processor to the processor which is connected to the side of the processor C or D opposite to the side of the newly added processor. However, if the notification is similarly sent in the case of the loop connection, the notification sent from the processor C and the notification sent from the processor D overlapped with each other, and it is not clear where sending of the notifications should be stopped because there is no end in the loop connection.

Hence, in the case of the loop connection, the processor only on the forward side shall send notification of the information of the newly connected processor to the processor which is connected to the side opposite to the newly connected processor. Further, each processor which receives the notification shall not send the notification any longer, when the processor judges that the notification indicates that the own processor has been newly added.

In the example of the drawing, the processor D sends notification that the processor C has been newly added, to the processor E on the opposite side, and the notification is transmitted from the processor E to the processor A, the processor B, and the processor C in order. The processor C, however, judges that the notification indicates that the own processor has been newly added, and recognizes from the judgment that the notification has circulated through all nodes in the system, and ends the transmission of the notification here.

By the above-described process, each processor can grasp that the forward end processor (for form's sake) and the backward end processor (for form's sake) is the same processor, namely, that the connection has been changed to the loop shape (see (c)).

Note that in the case of the loop connection, not only the forward side processor but also the backward side processor may send notification of the information of the newly connected processor to the processor connected to the side opposite to the newly connected processor. In this case, it is only necessary that when the processor judges that the notification indicates that the processor itself was newly added, the processor does not send the notification any longer, and when notification of still new connection regarding a processor (an existing processor) which has been already written in the topology table is sent to the processor, the processor does not register the existing processor in the topology table unless the position of the existing processor is the end of the cascade connection.

When a plurality of processors are connected in the loop shape as shown at (c) in FIG. 20, one of the plural processors is both the forward end processor and the backward end processor. Which processor is regarded as the processor at the end is arbitrarily set, and the processor at the end may be changed to another processor. For example, in the topology table of the processor A, the processors E, D, and C are arranged in order on the backward side and the processors B and C are arranged in order on the forward side, but the processor at the end can be changed such that the processor D is regarded as the node at the end and the processors E and D are arranged on the backward side and the processors B, C and D are arranged on the forward side. Further, the master node may be changed such that the node at the end becomes the master node or the center node farthest from both ends becomes the master node, according to a predetermined rule.

In the processor C, YES is judged at Step S64 in FIG. 12 in the logic connection preparing process, and each of the processor C and the processor D releases its own loopback on the side adjacent to each other in the logic connection establishing process, whereby the frame transmission route is changed to two ring routes to establish the connection in the twin mode.

When the processors at both ends of the system are connected to each other via cables in the system operating in the RTL mode, the system can form two transmission routes for performing the operation in the twin mode by the above-described process. The system separately performs the process for actually shifting to the operation in the twin mode and starting the circulation of the TL frames through the two transmission routes, and the process will be described later.

2.4 Operation at Occurrence of Disconnection of Transmission Route

Next, the process for dealing with disconnection between nodes executed by the CPU of the controller 40 in the audio signal processor 2 shown in FIG. 7 will be described.

Figure 21:
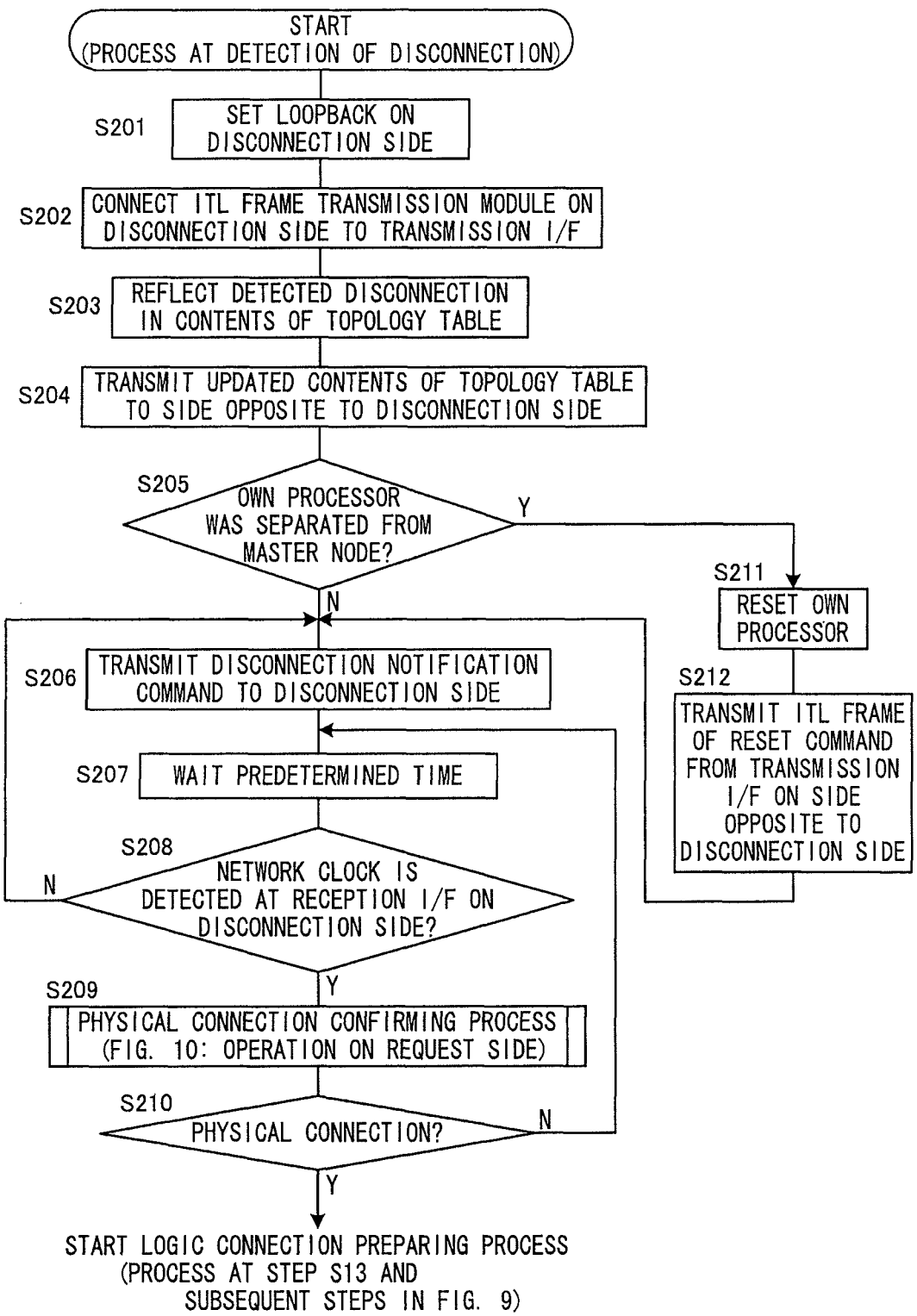
FIG. 21 is a flowchart of process at detection of disconnection executed by the CPU of the controller in the network I/F card shown in FIG. 9.

A flowchart of process at detection of loss of the network clock executed by the CPU of the controller 40 is shown in FIG. 21.

This process is executed when disconnection from another node at one of the reception I/Fs is detected in each of the nodes included in the audio network system 1 operating in the RTL mode or the TTL mode. Note that the disconnection occurs due to severance of cable, abnormality of the connected node or the like, and needs to be detected in a very short time that is one to several sampling periods. The method of detecting the disconnection is different depending on the kind of the transmission medium (the connection cable) or the physical layer (the transmission I/F and the reception I/F).

The reception I/F (the physical layer on the reception side) generally includes a network clock detection module, a link detection module, and an error detection module.

The network clock detection module among them detects the network clock from the electric signal or the optical signal inputted into reception I/F via the transmission medium. The state of the network clock being detected means that the reception I/F is receiving some data.

The link detection module detects the connection (link) to another transmission I/F by a predetermined method (not disclosed) determined by the manufacturer of the physical layer, and outputs a link detection signal. When disconnection occurs, a link detection signal indicating "there is no connection" is outputted from the link detection module but cannot be used as it is for detection of the disconnection of the embodiment because there is a delay of several milliseconds or more from the occurrence of the disconnection to the output of the signal indicating "there is no connection".

The error detection module outputs an error detection signal indicating "there is an error" when abnormality on extraction of the network clock, insufficient level, indefinite level, undefined code or the like occurs in the electric signal or the optical signal inputted into the reception I/F via the transmission medium.

In the case where the connection cable is an optical fiber, when disconnection occurs, the error detection signal indicating "there is an error" is outputted from the error detection module of the reception I/F irrespective of whether or not the reception I/F is receiving data at the point in time. Therefore, it is preferable to judge that "the connection to another node was broken" according to the frequency of the error detection signal indicating "there is an error", namely, when the number of occurrences per unit time is a predetermined value or greater.

Alternatively, when the connection cable is metal, the error detection signal indicating "there is an error" is not outputted even if disconnection occurs when the reception I/F is not receiving data, and it is preferable to detect the disconnection based on whether the reception I/F receives data or not instead. To this end, both of the transmission I/F side processing and the reception I/F side processing are necessary. First, the transmission I/F periodically transmits the TL frame and additionally transmits a signal for confirming connection every time the time period during which the transmission I/F transmits no data becomes a predetermined confirmation time or more. Then, the reception I/F judges whether or not the time period during which the network clock detection module receives no data becomes a sufficiently long (several times or more) time period as compared to the transmission period of the conformation signal, and judges that "the connection to another node was broken" when the time period becomes the sufficiently long time period or more.

The methods of detecting disconnection in the cases where the connection cable is an optical fiber and metal are respectively described here, which are merely examples, and appropriate methods may be employed according to the features of the transmission medium and the physical layer. However, in any of the methods, it is necessary that the disconnection is detected within several transmission periods of the TL frame. Though the link detection signal from the link detection module is not used in the above-described detection methods, it is preferable to judge that "there is no connection" while the link detection signal indicates "there is no link" in the above-described detection methods if the system is designed more safely.

Then, upon detection of the disconnection from the node which is connected to one of the I/Fs by an appropriate detection method, the CPU of the controller 40 starts the process in FIG. 21.

In this process, the CPU firstly switches the selector 35 or 37 on the disconnection side to the loopback line LB1 or LB2 side to thereby set loopback on the disconnection side to prevent the TL frame from being transmitted to the disconnection side (S201), and switches the corresponding selector 38 or 36 to the ITL frame transmission module 64 or 54 side to thereby connect the ITL frame transmission module on the disconnection side to the transmission I/F (S202).

This makes it possible to separate a portion where the connection has been broken from the transmission route for the TL frame and maintain the transmission route for the TL frame only among a portion where the communication can be normally performed so as to continue operation of the audio network system 1. In the audio network system 1, even if a TL frame is transmitted to an adjacent node with the connection to the adjacent node being broken, the TL frame will be merely lost, and therefore the nodes behind the disconnection are removed from the system so that only the remaining nodes form a new transmission route to maintain the circulation of the TL frame.

The CPU of the controller 40 reflects the detected disconnection in the contents of the topology table (S203). More specifically, if the nodes are cascaded, the node connected to the disconnection side and the nodes behind that node have no longer connection to the own node, and therefore it is preferable to delete the data of those nodes from the topology table.

Alternatively, if the nodes are connected in loop, the arrangement of the nodes itself is not changed but the topology is changed into the cascade connection with the own node located at one end, and therefore all necessary to do is to rewrite data of the nodes written separately on the forward side and the backward side onto the one side where the connection is maintained.

For example, when the connection between the processor A and the processor B at (c) in FIG. 20 is broken, the CPU in the processor A rewrites the data of the forward side nodes in the topology table from the nodes B and C to no nodes, and the data of the backward side nodes from the nodes E, D and C to the nodes E, D, C and B. The CPU in the processor B rewrites the data of the forward side nodes from the node C to the nodes C, D, E and A, and the data of the backward side nodes from the nodes A, E, D and C to no nodes. The CPU in the processor C rewrites the data of the forward side nodes from the node D to the nodes D, E and A, and the data of the backward side nodes from the nodes B, A, E and D to the node B. The CPU in the processor D rewrites the data of the forward side nodes from the nodes E, A, B and C to the nodes E and A, and the data of the backward side nodes from the node C to the nodes C and B. The CPU in the processor E rewrites the data of the forward side nodes from the nodes A, B and C to the node A, and the data of the backward side nodes from the nodes D and C to the nodes D, C and B.

After Step S203, the CPU of the controller 40 transmits the updated contents of the topology table (that the connection to a specific node has been broken) to the side opposite to the disconnection side (S204). This transmission can be performed by the ITL frame as in the case of Step S35 in FIG. 10, but the nodes on the side where the master node is located among the nodes on both sides of the disconnection point transmits the ITL frame by writing the frame into a TL frame, because the node should have the transmission route for the TL frame to the side opposite to the disconnection side. The updated contents to be transmitted here are transmitted sequentially to the subsequent nodes and thereby transmitted to all of the nodes remaining in the system, similarly to the transmission of the contents of the topology table described using FIG. 10 and FIG. 17.

Note that in the loop connection, which node is located at the opposite end in the cascade connection after occurrence of disconnection is not clear at the moment of Step S203 (the function of the adjacent node may be stopped and the node behind the adjacent node may be located at the end). The node located at the opposite end in the cascade connection can be grasped at the point in time when notification of the updated contents of the topology table is sent afterwards from the node which has become the node located at the opposite end, and there is no problem if the contents are grasped at the point in time.

The CPU of the controller 40 then judges whether the own processor was separated from the master node due to occurrence of the disconnection by referring to the updated topology table (S205). If separated, the CPU resets the own processor (S211), and transmits the ITL frame of a reset command from the transmission I/F on the side opposite to the disconnection side (S212). These processes are similar to those at Steps S71 and S73 in FIG. 13 and for once returning the node separated from the master node due to the disconnection into the ITL mode. The CPU then proceeds to Step S206 after Step S212.

If the own processor has not been separated at Step S205, reset is not required, and the CPU simply proceeds to Step S206.

The CPU of the controller 40 then transmits a disconnection notification command from the transmission I/F on the disconnection side (S206).

The disconnection notification command is a command for notifying the node connected to the transmission I/F that disconnection has occurred.

In the audio network system 1, the wire between nodes is realized by two cables as shown in FIG. 1. If the transmission routes realized by the two cables are broken at the same time, the network clock is lost in the processors on both sides of the disconnection point. However, if disconnection has occurred only along one of the cables, the network clock is lost in the node on the reception side of the broken transmission route, but the network clock is not lost in the node on the reception side of the transmission route which is not broken, so that the situation that the connection between nodes does not normally function cannot be grasped. Even from the node on the transmission side, whether or not the transmission route from the own processor to the processor connected thereto has been broken and whether or not the node connected to the own node has grasped the disconnection cannot be grasped.

The disconnection notification command is a command to respond to such a situation and is transmitted to surely notify the node connected to the own node of the occurrence of disconnection.

The CPU of the controller 40 then repeats transmission of the disconnection notification command every predetermined time until the network clock is detected at the reception I/F on the disconnection side (S206 to S208).

The process performed by the node connected to the own node at reception of this command will be described later. Though this command does not reach the node connected to the own node when the transmission routes realized by the two cables have been broken at the same time or when the function of the node connected to the own node has stopped, there is no problem in particular.

When the reception I/F on the disconnection side detects the network clock again due to reconnection of the cables, replacement of the broken cables with new ones, restoration of the function of the stopped audio signal processor 2, connection of a new audio signal processor 2 or the like (YES at S208), the CPU executes the process of incorporating the processor connected to the transmission/reception I/F into the audio network system 1 in which the own processor is included, similarly to the process at Step S11 and subsequent steps in FIG. 9 when the CPU newly detects connection of the audio signal processor 2.

More specifically, the CPU executes the physical connection confirming process shown in FIG. 10 (S209), and executes the process at Step S13 and subsequent steps in FIG. 9 such as the logic connection preparing process and so on when the physical connection has been confirmed (S210). On the other hand, if the physical connection could not be confirmed at Step S210, the CPU returns to Step S207 and repeats the processes. Note that the CPU does not need to separately perform the process in FIG. 9 for the transmission/reception I/F on the disconnection side while the CPU performs the loop process from Step S207 to Step S210.

By the above-described process, upon detection of a poor condition of the communication occurred at a portion of the system, each of the nodes constituting the audio network system 1 can separate the portion from the system in a time of one sampling period to several sampling periods (in two or three sampling periods, or five or six sampling periods or shorter) to enable the remaining portion of the system to continuously operate.

Note that the trigger for the process shown in FIG. 21 is not only the detection of loss of the network clock but may be detection of loss of the signal in the TL frame during reception of the TL frame.

Figure 22:
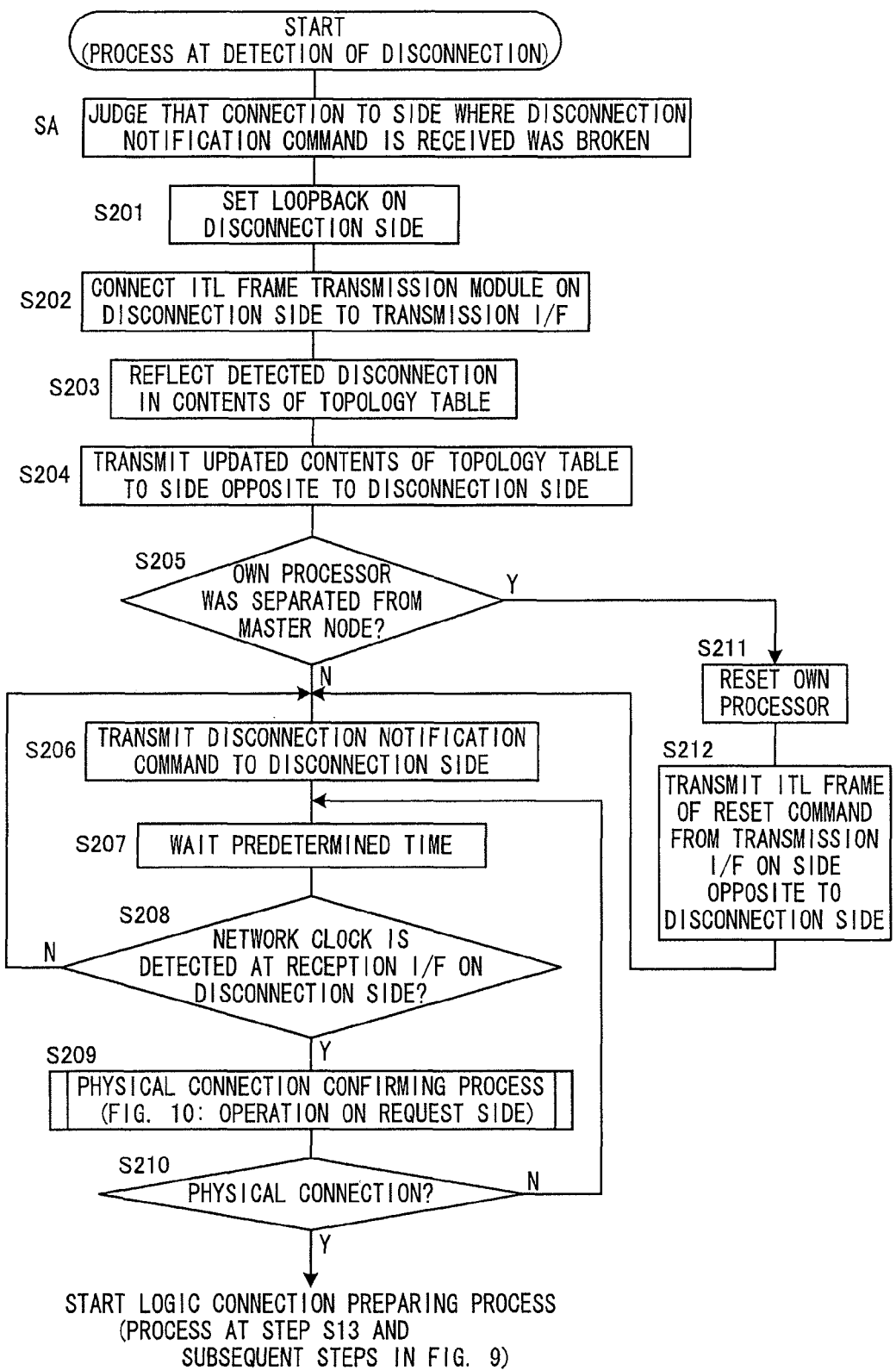
FIG. 22 is a flowchart of process at reception of a disconnection notification command executed by the CPU.

Next a flowchart of process at reception of the disconnection notification command executed by the CPU of the controller 40 is shown in FIG. 22.

This process is executed in each of the nodes included in the audio network system 1 operating in the RTL mode or the TTL mode when the node receives the disconnection notification command transmitted from the adjacent node in the process at Step S206 in FIG. 21.

In this process, the CPU of the controller 40 first judges that the connection to the node on the side where the disconnection notification command is received was broken (SA). Thereafter, the CPU sets loopback on the disconnection side, updates the topology table, and makes other necessary settings as in the case where the loss of the network clock is detected. The process of this portion is completely the same as the process shown in FIG. 21 except that the transmission of the disconnection notification command (S206) is not performed because it is unnecessary.

By the above-described process, each of the nodes constituting the audio network system 1 properly detects the poor condition of the communication even when the loss of the network clock cannot be detected because the node is located on the transmission side of the transmission cable on which the poor condition occurred, and immediately separate that portion from the system to enable the remaining portion of the system to continuously operate.

Note that the processes shown in FIG. 21 and FIG. 22 are executed similarly both in the master node and in the slave node.

When the loopback is set in the processes shown in FIG. 21 and FIG. 22 in the audio network system 1 operating in the twin mode, the two transmission routes which have existed until then are connected to each other and the point where the disconnection has occurred is separated from the transmission route, whereby a new transmission route will be formed. Accordingly, the master node thereafter needs to immediately shift to the operation in the single mode, and the process for the mode shift will be described later.

2.5 Concrete Example of Disconnection of Transmission Route

Next, a concrete example of the operation when the connection between two nodes is broken in the audio network system operating in the RTL mode or the TTL mode will be described using FIG. 23 to FIG. 25.

Figure 23:
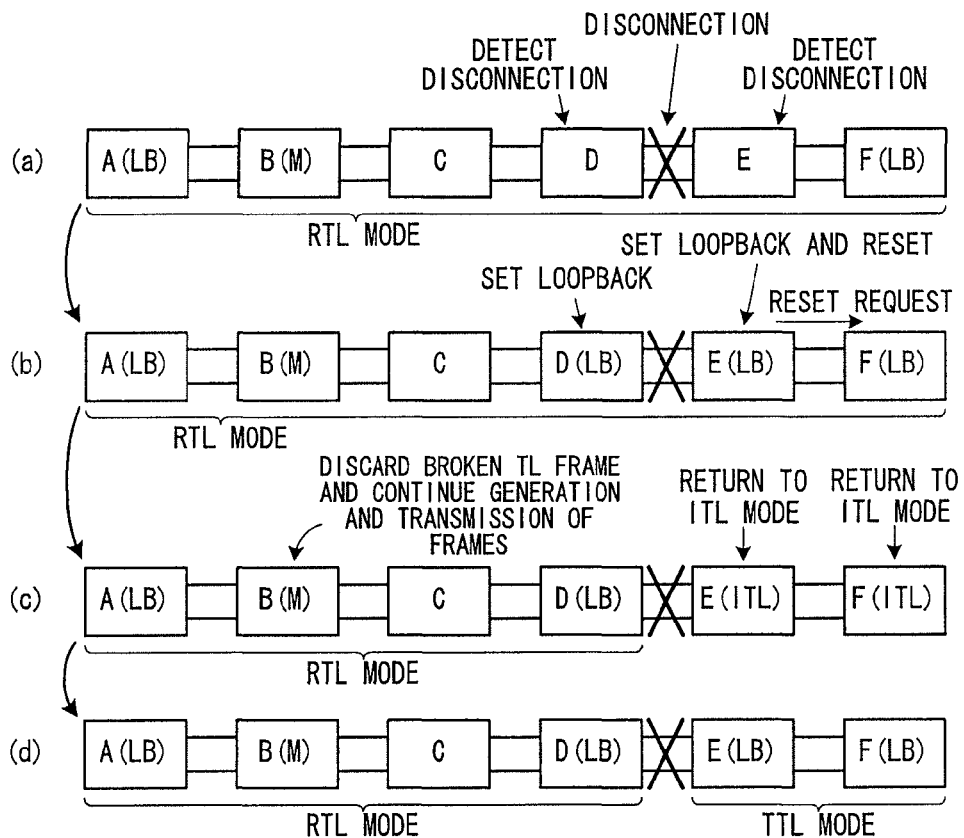
FIG. 23 is an illustration showing a first example of a procedure of changing the system configuration at the time of disconnection.
Figure 24:
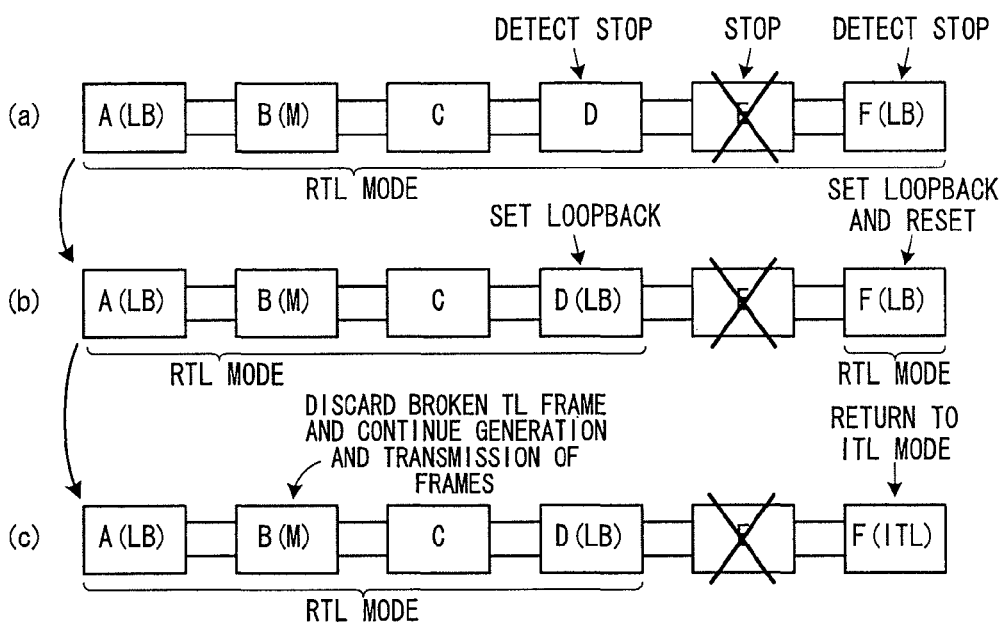
FIG. 24 is an illustration showing a second example thereof.
Figure 25:
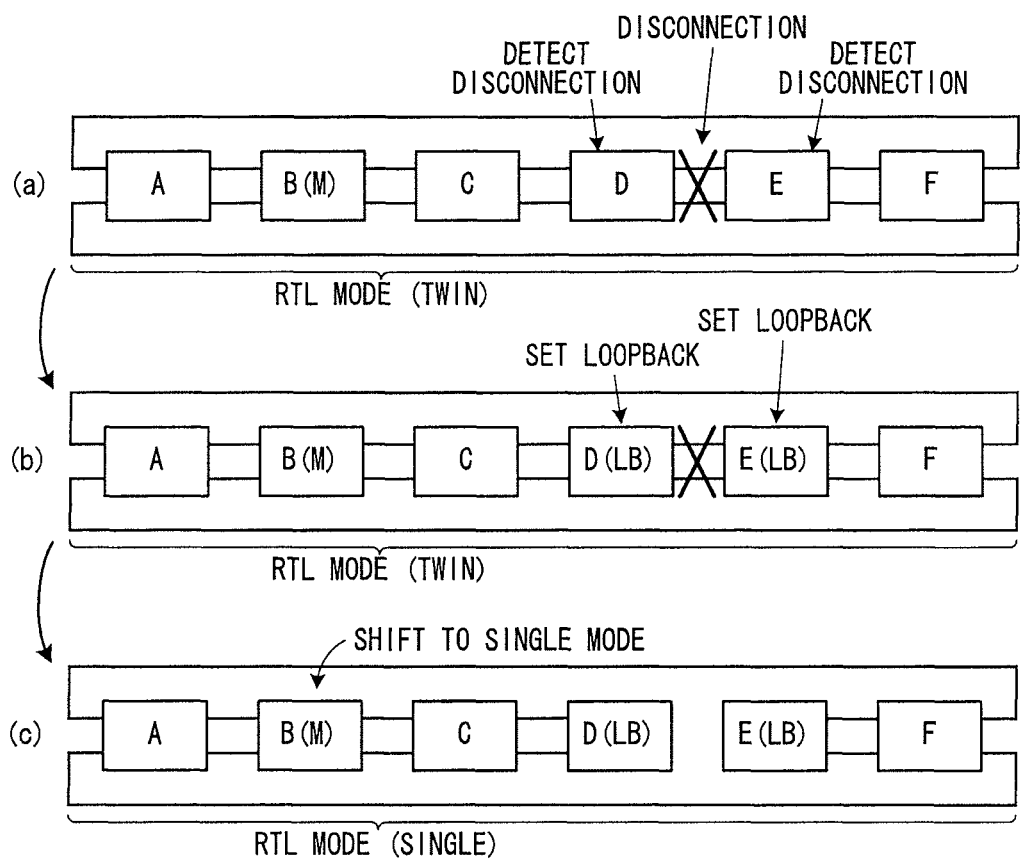
FIG. 25 is an illustration showing a third example thereof.

Though the following FIG. 23 to FIG. 25 show examples in which disconnection occurs in the system in the RTL mode, the operation in the RTL mode applies to the operation in the TTL mode by replacing RTL with TTL for the operations in FIG. 23 and FIG. 24. Because there is no twin mode in the TTL mode, the operation in FIG. 25 does not apply to the TTL mode.

FIG. 23 shows a first example of the procedure of changing the system configuration at the time of occurrence of disconnection.

This drawing shows an example where the wire between a processor D and a processor E is disconnected in an audio network system in the single RTL mode formed of six processors, that is, processors A to F. The disconnection include the case where the communication cable drops off from the processor, and the case where the transmission or reception to/from the audio network becomes impossible because of failure at any one of the processors, as well as the case where the communication cable itself is physically severed. Further, "M" in the drawing indicates a master node, and "LB" indicates a processor in which the loopback is set.

When the wire connecting two nodes is disconnected as shown at (a) in FIG. 23, each of the processors on both sides of the disconnection point immediately switches the selectors on the side where the disconnection has been detected to the loopback line/ITL frame transmission module side by the process in FIG. 21 according to the loss of the network clock and/or the process in FIG. 22 according to the reception of the disconnection notification command transmitted in the process in FIG. 21 to thereby set loopback of the transmission route for the TL frame on the side where the disconnection has been detected.

(b) in FIG. 23 shows a state in which each of processors on both sides of the disconnection point sets loopback on the side where the disconnection has been detected. In the case shown in the drawing, a transmission route through the processors A to D and another transmission route through the processors E and F are formed by setting the loopback.

When the disconnection has occurred, it is also conceivable that each processor sets loopback during passage of the TL frame through the processor. In this case, the TL frame in transmission is broken. However, each of the nodes in the system can detect the breakage of the TL frame also in this case, and the master node can discard the broken frame and generate a new frame, as described later, thus not causing a serious problem. Accordingly, a group including the master node among two groups of processors formed because of the disconnection can continue the operation in the RTL mode, though data written in 0 to two TL frames is lost depending on the disconnection point or timing.

On the other hand, the processor which has been separated from the master node by the disconnection resets itself and transmits a reset request to the processor on the side opposite to the disconnection side.

All of the nodes separated from the master node once shift back to the ITL mode as shown at (c) in FIG. 23 by the process shown in FIG. 13.

Thereafter, the processor E and the processor F can start the process shown in FIG. 9 as necessary for the transmission/reception I/F on the side where the connection is not broken to automatically form the system in the TTL mode as shown at (d) in FIG. 23 in the same procedure as has been described using FIG. 16 and the like. When the disconnection is restored, the processor E and the processor F which were once separated from the master node can be incorporated again into the system operating in the RTL mode by the process at Step 209 and subsequent steps in FIG. 21 or FIG. 22 in the same procedure as has been described using FIG. 18 and the like.

Note that if the disconnection occurs when the head of the TL frame is located at the processor E or the processor F, the TL frame may continue to circulate between the processors E and F forever without any measure taken against that. Hence, to avoid such a situation, it is preferable for the processor to confirm the frame serial number at the reception of the TL frame, and to discard the TL frame without looping back it when receiving the TL frame with the same serial number twice.

FIG. 24 shows a second example of the procedure of changing the system configuration at the time of disconnection.

This figure shows an example where an operation of a processor stops in the system. Besides the change in the wire connection, the transmission route would be reconstructed when a processor stops to operate because the power supply is suddenly shut down or the like. Also in this case, each of the adjacent two processors on both sides of the stopped processor can no longer detect the network clock from the stopped processor, and detects the disconnection of the transmission route based on the defect, as shown at (a) in FIG. 24. The processors D and F adjacent to the stopped processor cannot distinguish the stop of the operation of the processor from the disconnection of the wire, but have no problem because the countermeasure process against those situations is same.

More specifically, as shown at (b) and (c) in FIG. 24, the processor which detected the disconnection of the transmission route sets the loopback on the side where the disconnection was detected, and the master node discards the TL frame broken at the occurrence of disconnection and continues the generation and transmission of a new TL frame as in the case of FIG. 23. This makes it possible for the TL frame to be transported even after the occurrence of disconnection, through the transmission route on the side where the master node exists, so that the transport of the waveform data, the Ethernet frame and so on can be continued within the processors where the transmission route is maintained.

Note that, even if the functions in each processor do not wholly stop, each processor sometimes becomes unable to normally read/write data from/to the TL frame because of hang-up of the controller 40 or the like. If the processor in such a situation continues to transport the TL frame, accuracy of the data in the TL frame is not guaranteed. Therefore, when a processor in the system is brought into such a situation, the adjacent processor preferably grasps the situation as the stop of the function of the processor and executes the configuration change as shown in FIG. 24.

FIG. 25 shows a third example of the procedure of changing the system configuration at the time of disconnection.

This drawing shows an example where the wire between the processor D and the processor E is disconnected in the audio network system formed in the twin RTL mode.

Also in this case, each of the nodes on both sides of the disconnection point set loopback, as shown at (a) and (b) in FIG. 25, on the side where the disconnection has been detected according to the occurrence of disconnection of the wire as in the case of FIG. 23. However, when the system is operating in the twin mode, the two transmission routes existing thus far will be connected to each other and the portion where the disconnection has occurred is removed therefrom to thereby form one new transmission route due to the setting of the loopbacks.

On the other hand, the TL frame transmitted by the master node to the upper transmission route in the drawing (assuming that the ring ID=1) will be looped back at some midpoint due to the change of the transmission route by setting the loopbacks and return to the master node on the lower transmission route in the drawing (assuming that the ring ID=2). Conversely, the TL frame transmitted by the master node to the lower transmission route in the drawing will be looped back at some midpoint and return to the master node on the upper transmission route in the drawing.

Namely, when the loopbacks are set, the master node will receive, at each of the reception I/Fs, the TL frame having the ring ID of the transmission route on the opposite side to that in a normal case. For instance, the master node will receive the TL frame having the ring ID=2 at the reception I/F where the master node is to receive the TL frame having the ring ID=1.

The contents of the above situation will be expressed in another way as follows.

In the case where two transmission routes are formed in the twin mode, the TL frame transmitted from the transmission I/F on the forward side will be received at the reception I/F on the backward side, whereas the TL frame transmitted from the transmission I/F on the backward side will be received at the reception I/F on the forward side (see FIG. 1B). Namely, the TL frame will be received at the reception I/F of the set different from that of the transmission I/F used for the transmission of the TL frame.

However, in the case where the transmission routes are connected into one transmission route due to the setting of the loopbacks, the TL frame transmitted from the transmission I/F on the forward side will be received at the reception I/F on the forward side, and the TL frame transmitted from the transmission I/F on the backward side will be received at the reception I/F on the backward side (see FIG. 1A). Namely, the TL frame will be received at the reception I/F in the same set as that of the transmission I/F used for transmission of the TL frame.

Therefore, when the loopbacks is set, for example, the reception I/F on the forward side which received the TL frame transmitted from the transmission I/F on the forward side till then will receive the TL frame transmitted from the transmission I/F on the backward side from some point in time.

If the head of the TL frame in transmission has passed through a position where a loopback is set at the time of setting the loopback, the TL frame in transmission still proceeds through the transmission route in the twin mode with its latter portion lost and returns to the master node. However, the TL frame subsequently transmitted from the master node will pass through one transmission route made by uniting the two transmission routes to each other and return to the reception I/F on the side opposite to that in the case of twin mode.

Hence, using the above situation as a trigger, the master node judges that disconnection occurred between two nodes and the connection was brought into the cascade shape, and shifts to the operation in the single mode as shown in (c) of FIG. 25. To this end, it is only necessary to stop generation of TL frames by the data input/output module which is not used in the single mode and thereafter let the data input/output module flash received TL frames therethrough (reading/writing of data from/to the ITL frame region may be performed).

By the above operation, even when disconnection has occurred at some point in the system operating in the twin RTL mode, the transport of the waveform data, the Ethernet frame and so on can be continued within a possible range in the single RTL mode. Also when the function of any node stops, the loopbacks can be set on both sides of the node as in the case of FIG. 22, and the system can similarly shift to the operation in the single RTL mode.

3. Handling of TL Frame in Each Node

Next, handling of the TL frame in each of the nodes constituting the audio network system 1 will be described.

The operation and process described here relate to the RTL mode. However, completely the same process as that in the RTL mode is employable also in the TTL mode except that reading/writing of waveform data from/to the TL frame is not performed.

The operation and process described here is, unless otherwise noted, process when data in the TL frame is inputted into the data input/output module which performs reading/writing of the waveform data and the Ethernet frame. If the data in the TL frame is inputted into the data input/output module which does not perform reading/writing of the waveform data and the Ethernet frame, the process relating to the inputting/outputting of these kinds of data is not performed. In this case, even the master node does not generate a new TL frame and therefore performs the process similar to that of the slave node.

In the following explanation, the reference numerals used for the modules in the first data input/output module 10 are used for the reference numerals of the buffers and the transmission/reception modules included in the network I/F card 215 for convenience of explanation. However, when reading/writing data is performed using the second data input/output module 20, the buffers and modules included in the second data input/output module 20 operate as a matter of course.

3.1 Generation of TL frame

The generation of the TL frame 100 in the master node will be described first.

As has been described, only the master node generates a new (with different frame ID) TL frame in the audio network system in this embodiment. The master node generates the new TL frame by processing part of data of the TL frame transmitted by itself and returned thereto after circulating through the transmission route.

The processing of the returned frame to generate the new frame includes updating the header and the management data (including the frame ID) in the returned frame and writing the waveform data, the control data and the like to be transmitted by the master node into the returned frame, whereas the waveform data and the control data written by other nodes in the returned frame are left in the new TL frame as they are.

However, in the case when employing such a generation method, if the master node generates a new TL frame without confirming the error in the returned TL frame, a large noise might be included in the waveform data to be transported. Hence, the master node in this embodiment stores once, into the buffer, the whole TL frame returned thereto after circulating once through the transmission route, and confirms that it normally receives the whole TL frame before generating a new TL frame based on that TL frame.

When the master node could not receive the TL frame, the master node should generate a new TL frame based on another TL frame. Hence, the master node stores the latest one of the TL frames which normally circulated through the loop transmission route as the "another frame" separately from the one for transmission/reception, and if the master node does not normally receive a TL frame, the master node generates a new TL frame based on the stored TL frame, instead of the abnormally received frame.

Figure 26:
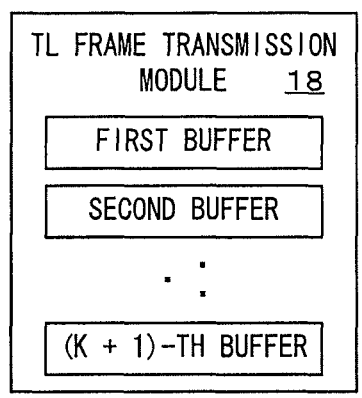
FIG. 26 is a diagram showing the configuration of a buffer in which the TL frame is stored in the master node.

For this end, in the master node, the buffer for processing the TL frame provided in the TL frame transmission module 18 in the data input/output module for generating the TL frame is composed of a plurality of buffers as shown in FIG. 26, and the function of a "transmission buffer (and storing buffer)" or a "reception buffer" is assigned to each buffer. In the TL frame transmission module 18, (k+1) pieces of buffers larger than the periodic update value k by 1 are necessary.

Figure 27:
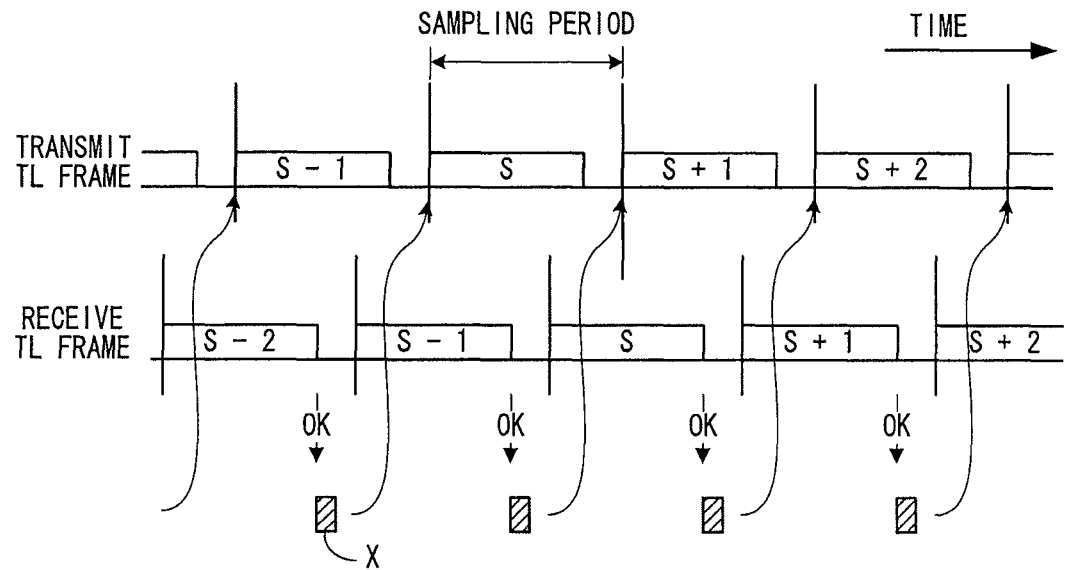
FIG. 27 is a chart showing a timing example of transmitting/receiving and generating the TL frame in the master node.

FIG. 27 shows a timing example of transmitting/receiving and generating the TL frame in the master node. In this drawing, S is an integer number and represents the number indicating the period of the wordclock. This S is used also as a frame ID indicating the TL frame transmitted by the master node in the S-th period.

The maser node transmits one TL frame in each sampling period as has been described using FIG. 5 and FIG. 6. This drawing shows an example where the periodic update value k is "2" in which the head of the transmitted TL frame circulates through the system in about one sampling period. In many cases, as shown in FIG. 27, the transmission of the (S+1)-th TL frame should be started before the reception of the whole S-th TL frame is completed. The whole S-th TL frame is received by the timing earlier by a predetermined time α that is a time period relating to preparation of the new TL frame in the master node, than the start of transmission of the (S+2)-th TL frame. In FIG. 27, the predetermined time α is indicated by a character X.

In this case, the master node transmits the S-th TL frame stored in the transmission buffer while the master node receives and stores the (S−1)-th TL frame into the reception buffer partly in parallel with the transmission. In the TL frame transmission module 18, the reception buffer is preferably a buffer next to the current transmission buffer. The master node reads data from the TL frame during the master node is storing the frame into the reception buffer, or after the master node finishes the storing. Upon completion of reception of the (S−1)-th TL frame, the master node performs check for error of the received TL frame and designates that reception buffer as the next transmission buffer and the buffer next to the designated transmission buffer (the current reception buffer) as the next reception buffer if the received TL frame has no abnormality. The master node processes the (S−1)-th TL frame stored in the next transmission buffer to generate the (S+1)-th TL frame.

Further, since the S-th TL frame will return in a short time, the master node changes the prepared next buffer to the reception buffer to start storing the received S-th TL frame. Subsequently, when the master node completes transmitting the S-th TL frame in the transmission buffer, the master node frees up the transmission buffer.

At the start timing of the next wordclock for transmission, the master node changes the prepared next buffer to the transmission buffer and starts transmission of the (S+1)-th TL frame stored therein. Upon completion of reception of the S-th TL frame, the master node then performs error check of the received S-th TL frame and designates the reception buffer storing the S-th TL frame as the next transmission buffer and the buffer next to the designated transmission buffer (the current reception buffer) as the next reception buffer if the received TL frame has no abnormality. The master node processes the S-th TL frame stored in the next transmission buffer to generate the (S+2)-th TL frame.

By repeating the above procedure, a new TL frame is generated at all times based on the TL frame which is judged as normal as a whole.

The first and second TL frames are preferably generated based on a predetermined model because there is no TL frame as a base.

Instead of processing the TL frame in the frame buffer, the master node may read the TL frame from the buffer at the output time, and output the header and the contents of the read TL frame while replacing them with the data from the waveform data transmission buffer 16, the TL data transmission buffer 17, and the ITL data transmission buffer 53. In this variation, the number of buffers required is also (k+1), though the transmission buffer stores not the TL frame to be transmitted but the TL frame received by the node.

By doubling the operation speed of each buffer and designing the buffer such that it can receive while transmitting, the "transmission buffer" at a certain timing when the TL frame returns to the master node can be used as the "reception buffer", consequently the number of buffers can be reduced to k that is smaller by one than that of the above-described embodiment.

Figure 28:
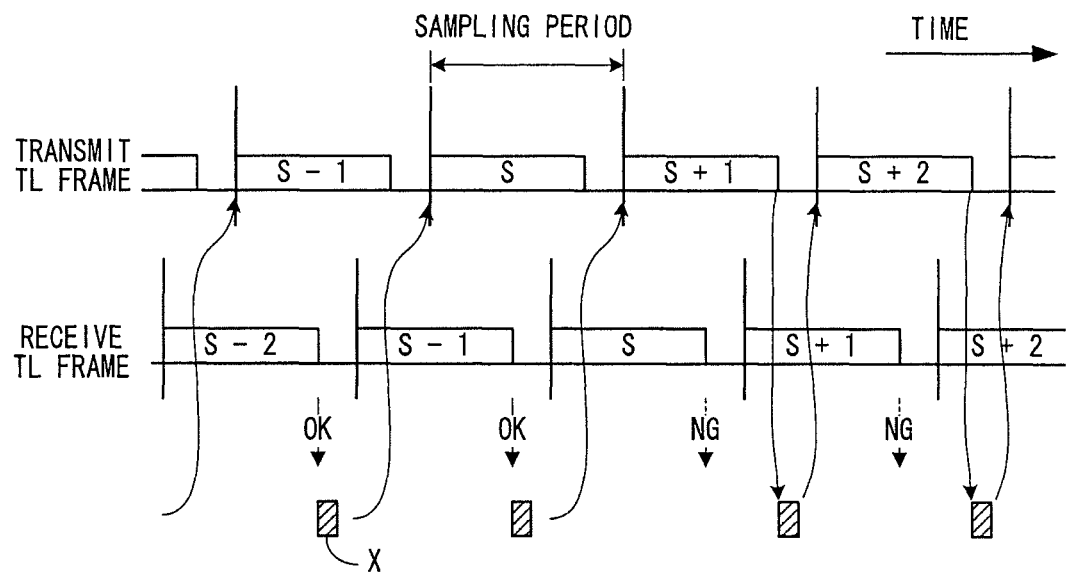
FIG. 28 is a chart showing another example thereof.

FIG. 28 shows a timing of transmitting/receiving and generating the TL frame in the master node when the S-th TL frame and frames subsequent thereto cannot normally circulate through the loop transmission route. The case where the TL frames cannot normally circulate means not only the case where abnormality is detected in the TL frame which the master node just received but also the case where abnormality has been detected in another node and the abnormality is recorded in the TL frame and the case where no TL frame returns to the master node.

In this case, if the master node generates the (S+2)-th TL frame based on the S-th TL frame which has not normally circulated (in which data might be broken), each of the waveform data in the TL frame loses the consecutiveness of the samples in time domain and may cause noise. Hence, the master node which detected that the TL frame has not normally circulated discards the TL frame in the reception buffer, and designates the buffer as the next reception buffer and designates the transmission buffer at that time as the next transmission buffer. At that time, the transmission buffer is still transmitting, so the generation of a new TL frame is performed after completion of the transmission. Namely, after the master node completes transmitting the (S+1)-th TL frame, the master node processes the (S+1)-th TL frame (which includes data of the (S−1)-th TL frame that is a latest TL frame whose normal circulation through the transmission route has been confirmed) stored in the next transmission buffer to generate the (S+2)-th TL frame.

When the master node detects that the next (S+1)-th TL frame has not been received normally either, the master node designates the transmission buffer as the next transmission buffer again when generating the (S+3)-th TL frame, and after the master node completes transmitting the (S+2)-th TL frame, the master node generates the (S+3)-th TL frame based on the (S+2)-th TL frame (which includes data of the (S−1)-th TL frame) stored in the transmission buffer. In the same way, the master node repeatedly uses the same buffer as the transmission buffer to generate a new TL frame until it normally receives the TL frame.

Even in the above-described case, the data which the master node does not overwrite and transmits as it is to the next nod among the data written in the (S−1)-th TL frame remains unchanged even in the (S+2)-th TL frame, in the (S+3)-th TL frame, and in the TL frames subsequent thereto. Accordingly, in the above case, the same result as the case where the data of the (S−1)-th TL frame is separately stored, and a new TL frame is generated every time based on the stored TL frame.

3.2 Handling of TL Frame in Master Node and Switching of Operation State

Next, the process for realizing the operations shown in FIG. 27 and FIG. 28 in the master node will be described. The process for switching between the single mode and the twin mode in the RTL mode will also be described.

Figure 29:
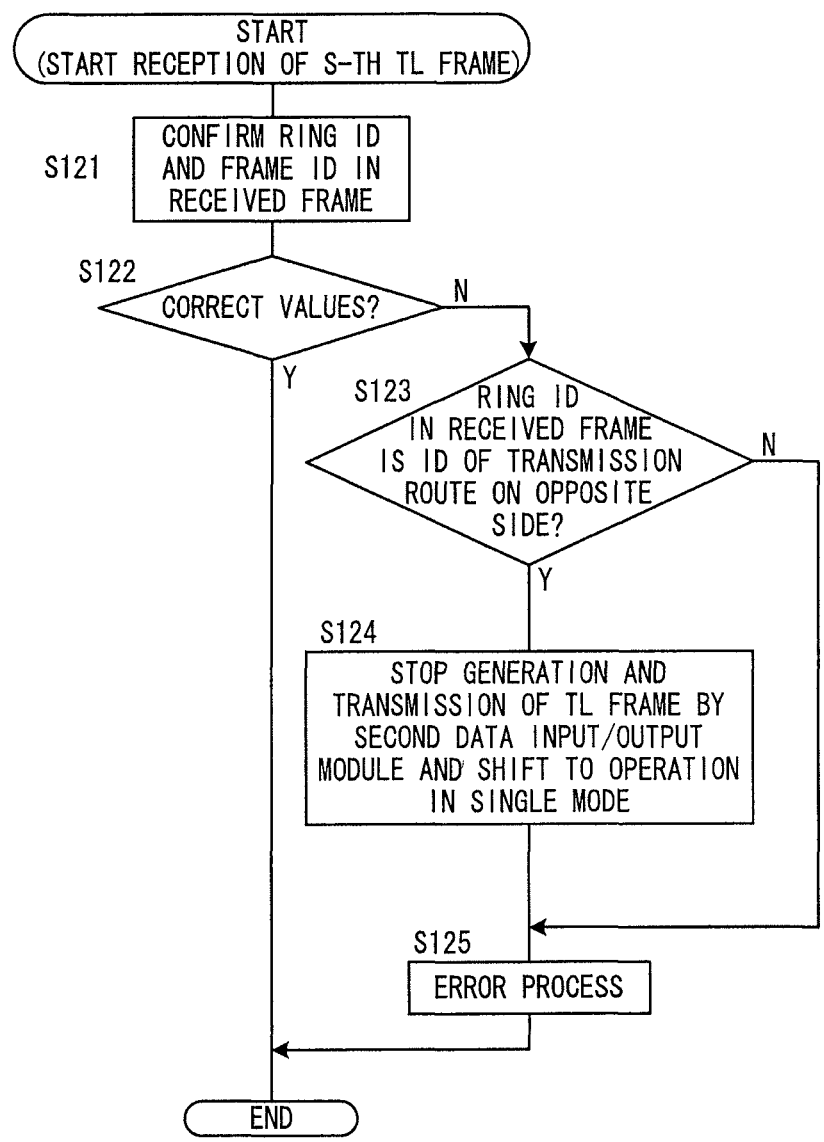
FIG. 29 is a flowchart of process executed when the master node detects start of reception of the S-th TL frame.

FIG. 29 shows a flowchart of process executed when the master node starts reception of the S-th TL frame from its head at the reception I/F being the end of the transmission route for the TL frame.

The CPU of the controller 40 in the master node starts the process shown in FIG. 29 when it detects the start of reception of the S-th TL frame. The CPU first confirms the ring ID and the frame ID written in the received frame as the management data (S121) and judges whether or not the IDs have correct values (S122).

The correct value of the frame ID is the number sequent to the number of the preceding TL frame. The correct value of the ring ID is the ID of the transmission route in which the reception I/F which has received the frame is included among one or two transmission routes formed in the audio network system 1. Note that if the ring ID is an ID specifying the transmission route and the system, it is preferable for the CPU to judge that the ring ID written in the TL frame has the correct value when the ID specifies the system in which the own node is included (not specifying another system) in addition to the above-described conditions.

When the frame ID and the ring ID have the correct values, there is no problem, and therefore the CPU ends the process in FIG. 29 and continues receiving the TL frame and accumulating the TL frame into the buffer. However, when at least one of the values of the frame ID and the ring ID is incorrect, it is conceivable that there is a missing frame or the form of the transmission route has changed.

Hence, the CPU judges whether or not the ring ID of the received TL frame is the ID of the transmission route on the side opposite to the transmission route including the reception I/F which received the TL frame (S123). When YES, the CPU stops the generation and transmission of TL frames by the second data input/output module 20 (the data input/output module which is not used to read/write the waveform data in the single mode), changes the operation state OS of the system into the single mode, and shifts to the operation in the single mode (S124). Note that the master node continues generation and transmission of TL frames by the first data input/output module 10 (the data input/output module which is used to read/write the waveform data in the single mode) as heretobefore.

This process is process corresponding to the switching of operation states described using FIG. 25. The process at Step S124 is the same for both cases where the process in FIG. 29 is started using, as a trigger, the start of reception of the TL frame by the reception I/Fs on whichever transmission route.

Further, when the master node shifts to the operation in the single mode, the slave node automatically senses this shift and starts the operation in the single mode, and process for the operation will be described in "3.4 Handling of TL Frame in Slave Node".

Figure 30:
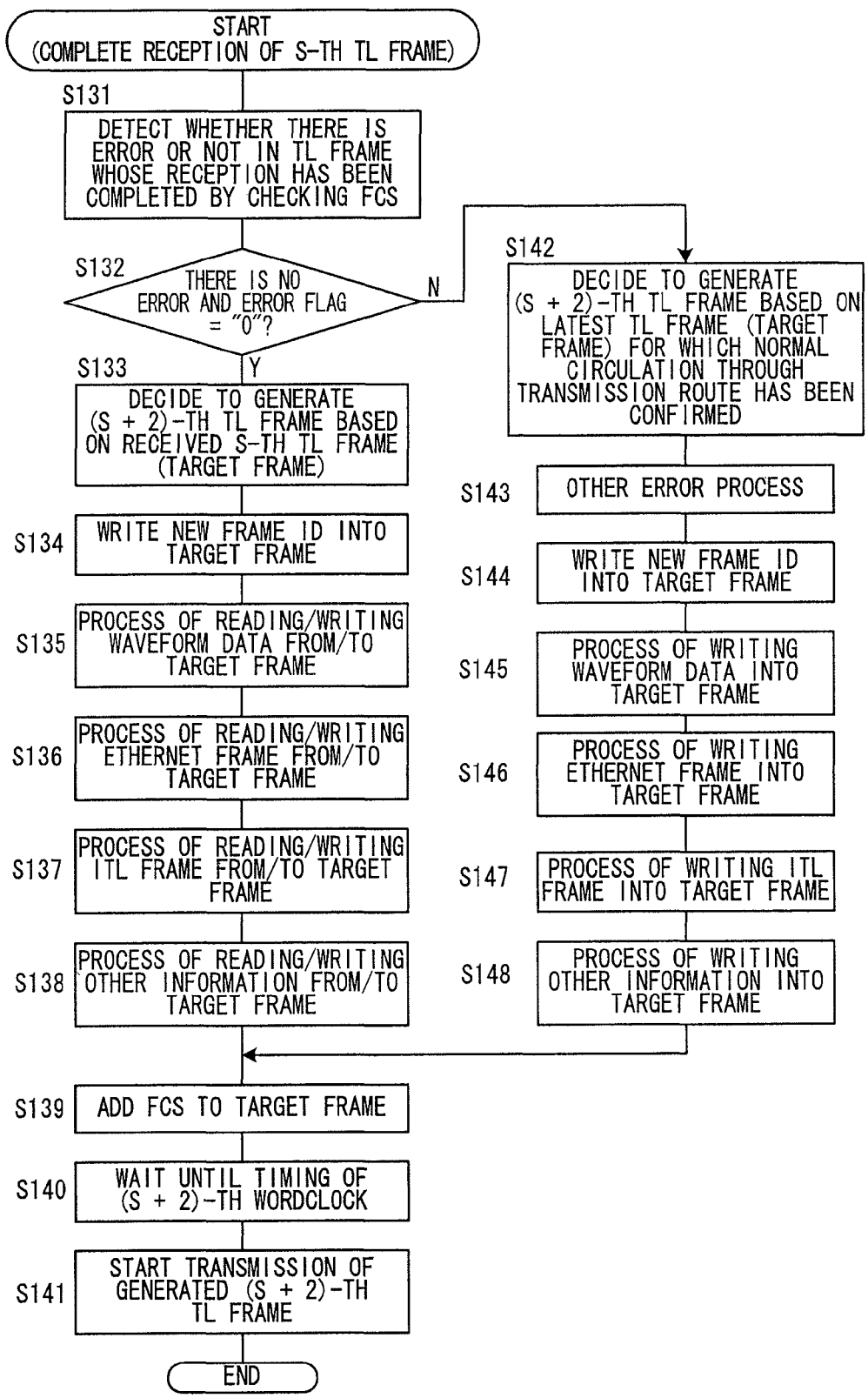
FIG. 30 is a flowchart of process executed when the master node detects completion of reception of the S-th TL frame.

Whether the CPU changed the operation state as described above or not, the CPU performs error process (S125), stores the fact that there is an error in the TL frame, and judges that there is an error at Step S132 in subsequent FIG. 30. Also when the CPU changed the operation state, the CPU preferably handles the TL frame as having an error because the TL frame may have been broken because of the change of the transmission routes.

Next, FIG. 30 shows a flowchart of process executed when the master node detects completion of reception of the S-th TL frame.

When the CPU of the controller 40 in the master node detects that the completion of reception of the S-th TL frame, the CPU starts the process shown in FIG. 30. The CPU firstly checks the FCS 105 to determine whether there is an error or not in the TL frame whose reception has been completed (S131). If there is no error and the value of an error flag EDF written in the received TL frame is "0" indicating no error (S132), the CPU judges that the received TL frame has normally circulated through the transmission route, and decides to generate the (S+2)-th TL frame based on the received S-th TL frame (S133). Hereinafter, the TL frame which is used as the base for generation of a new TL frame is called a "target frame."

Thereafter, the CPU writes a new frame ID into the target frame to generate a new TL frame (S134), and performs necessary control operation for reading and writing the waveform data, the Ethernet frame, the ITL frame and other information from/into the target frame (S135 to S138) so that the data to be outputted is written into the (S+2)-th TL frame.

The data to be read or written from/into the frame at Steps S135 to S137 is as has been described using FIG. 8. The data to be written at Step S138 includes the forward delay time Dfw, the backward delay time Dbw and the operation state OS of the system. The process at Steps S135 to S138 is not limited to the concrete order described in the figure, and of course may be performed in different orders, for example, the order in which writing of the data and information is performed after reading of them is completed.

Note that there is no data to be written into the ITL frame, data indicating the fact that there is no data to be written is written into the ITL frame region 106. This data can be written as data of the block having the number of blocks "1," a block ID "1," and data size "0." This also applies to ITL frame write process at other steps.

After Step S138, the CPU adds the FCS to the target frame to complete it as a TL frame (S139), waits until the timing of the (S+2)-th wordclock (S140), and starts transmission of the generated (S+2)-th TL frame (S141) in synchronization with the timing of the wordclock for transmission.

On the other hand, when there is an error or the value of the error flag EDF is "1" indicating that there is an error at Step S132, the CPU judges that the received TL frame has not normally circulated through the transmission route and decides to generate the (S+2)-th TL frame based on the latest TL frame for which normal circulation through the transmission route has been confirmed (S142). Also in this case, the TL frame which is used as the base for generation of a new TL frame is called a "target frame."

The CPU then performs the error process associated with the judgment of NO at Step S132 (S143). This process is executed because the data written in the received TL frame is unreliable, similar to process in a slave node which will be described later using FIG. 32. The CPU may perform process such as notification of the error to the upper layer, in step S144.

After Step S143, the CPU writes a new frame ID into the target frame to generate a new TL frame (S144), and performs necessary control operation for writing the waveform data, the Ethernet frame, the ITL frame and other information into the target frame (S145 to S148) so that the data to be outputted is written in the (S+2)-th TL frame. The process at Steps S145 to S148 is not limited to the concrete order described in the figure, as in the case of Steps S 135 to S138. Further, it is unnecessary here to read the data from the target frame.

After Step S148, the CPU proceeds to Step S139, starts transmission of the newly generated TL frame as in the case of no error, and ends the process.

By performing the above process, the master node can generate a new TL frame based on the TL frame whose normal circulation through the transmission route has been confirmed, to thereby generate a correct TL frame at all times.

Even if the value of the error flag EDF is "1," the data which has been written by the immediately preceding node is reliable when the received TL frame itself has no error. Therefore, it is preferable to read only the data in the ITL frame region among the data of the received TL frame and use the read data for process.

Further, the operation as has been described using FIG. 27 to FIG. 30 is for the case when the periodic update value k is "2". When the periodic update value k is a value greater than 2, the master node generates the (S+k)-th TL frame based on the S-th TL frame, and other than that point, the operation of the master node is basically same as the operation where the periodic update value k is "2".

More specifically, in the operation corresponding to the timing chart in FIG. 27, when the master node has completed normal reception of the S-th TL frame, it generates the (S+k)-th TL frame based on the S-th TL frame and starts transmission of the (S+k)-th TL frame at the timing of the (S+k)-th wordclock for transmission. In the operation corresponding to the timing chart in FIG. 28, when the master node could not normally receive the S-th TL frame, the master node waits for the completion of transmission of the (S+k−1)-th TL frame, and then generates the (S+k)-th TL frame based on "the data of the TL frame which has been normally received last" included in the (S+k−1)-th TL frame stored in the transmission buffer, and starts transmission of the (S+k)-th TL frame at the timing of the (S+k)-th wordclock for transmission.

By incrementing the periodic update value k, the upper-limit time for circulation of the TL frame in the audio network system can be increased to correspondingly increase the distance between the nodes and increase the number of nodes to be incorporated into the system. However, there is tradeoff that the delay in transfer of the audio signals in the audio network increases corresponding to the increase in the periodic update value k.

3.3 Operation of Shifting from Single Mode to Twin Mode

Next, process for shifting the system from the single mode to the twin mode will be described.

As has been described in the sections of "2.2 Operation at Forming System" and "2.3 Concrete Examples of Forming System", the formation of the two transmission routes for the operation in the twin mode itself can be realized by the process in the nodes at both ends of the cascade connection which are newly connected to form the loop connection (see (b) and (c) in FIG. 20). The master node can more or less grasp the new connection by the notification of change of the topology table.

However, when the shape of the transmission route is greatly changed due to the new connection, it is conceivable that normal transport of the TL frame itself can no longer be performed. Hence, in the audio network system 1, a process through which the master node grasps the change of the transmission route is prepared in addition to the notification of change of the topology table.

Figure 31:
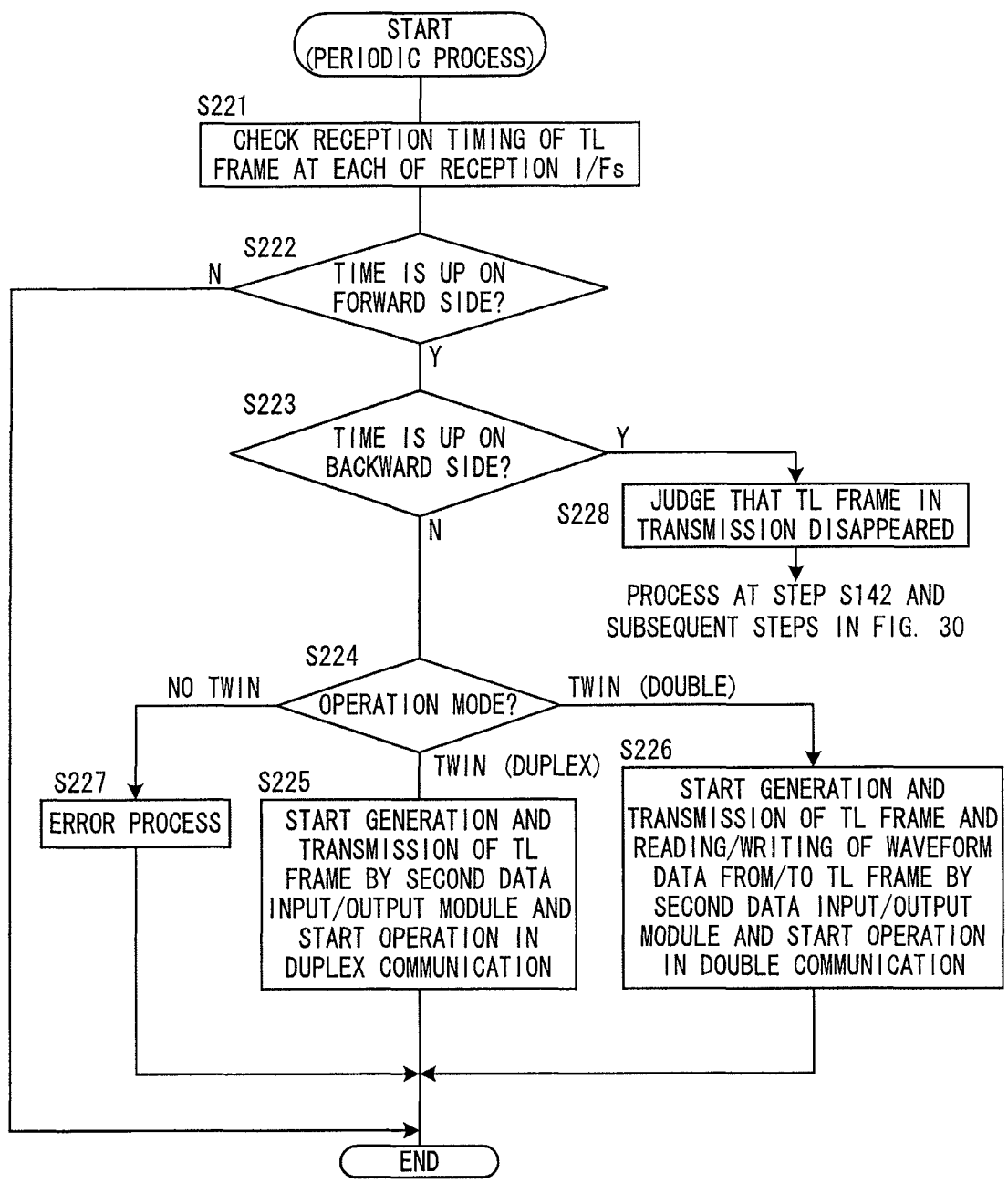
FIG. 31 is a flowchart of process executed by the master node to monitor shift to the twin mode.

A flowchart of process executed by the master node to monitor the shift to the twin mode is shown in FIG. 31.

In the node which has become the master node by the process shown in FIG. 15, the CPU of the controller 40 periodically executes the process shown in FIG. 31 in the audio network system 1 operating in the single RTL mode. The period of execution is preferably, for example, each sampling period.

In this process, the CPU of the controller 40 first checks the reception timing of the TL frame at each of the reception I/Fs 31 and 33 (S221).

In the single mode, the master node transmits the generated TL frame first to the forward side, and the TL frame is looped back at the node at the end of the cascade connection and returns to the reception I/F on the forward side. The delay time from the start of transmission of the TL frame from its head to the forward side to the start of reception of the returning TL frame from its head in that case does not greatly vary every transmission of the TL frame. Hence, the delay time on the forward side measured using the previous TL frame can be regarded as an estimation value of the delay time on the forward side for the next TL frame.

Alternatively, the delay time of the TL frame can be estimated based on the distances between nodes registered in the topology table (see Steps S16 to S18 in FIG. 9 and description thereof). This is more preferable as the method of estimating the delay time.

A value obtained by adding a variation allowance 13 to the estimation value of the delay time can be regarded as a limit time on the forward side.

Alternatively, the delay time of the TL frame circulating through the system should be within the limit time determined according to the periodic update value k (one sampling period when k is 2) in any case, and therefore a time obtained by subtracting the delay time measured on the backward side from the limit time of the system may be regarded as the limit time on the forwards side.

Hence, the CPU of the controller 40 judges whether or not reception of the returned TL frame from its head is started at the reception I/F on the forward side within the limit time on the forward side from the start of transmission of the TL frame from its head to the forward side (S222). If the reception was started, the time is not up (NO), and the CPU recognizes that the transmission route in the single mode is maintained and just ends the process. On the other hand, if there is no reception, namely, the time is up (YES), the CPU then proceeds to judgment for the backward side.

Conceivable cases where the time is up on the forward side include a case where two transmission routes for performing the operation in the twin mode have been formed and the case where normal transport of the TL frame was not performed because disconnection occurred at some portion in the cascade connection or the like.

In the former case among them, the transmitted TL frame passes through the newly formed transmission route and returns to the reception I/F on the backward side that is opposite to the side from which the TL frame was transmitted (see (c) in FIG. 20 and FIG. 1B). The time required for the TL frame to return to the master node should be within the limit time of the system determined according to the periodic update value k. On the other hand, in the latter case, the transmitted TL frame does not return to the forward side, which means that the transmitted TL frame has disappeared and never returns to the reception I/F of the master node.

Hence, the CPU of the controller 40 judges whether or not the reception of the returned TL frame from its head is started at the reception I/F on the backward side within the limit time of the system from the start of transmission of the TL frame from its head to the forward side (S223). If the TL frame has not been received, the time is up (YES), and the CPU judges that the TL frame disappeared (S228) and proceeds to the process at Step S142 and subsequent steps in FIG. 30 to generate a next TL frame based on the latest TL frame for which normal circulation through the transmission route has been confirmed as in the case where the reception I/F could not receive the TL frame normally. However, the state of the transmission route cannot be defined at this point in time, and therefore the system just continues operation in the single mode.

On the other hand, if the time is not up at Step 223, the CPU can judge that two transmission routes for operation in the twin mode have been formed. Then, the CPU confirms the setting of the operation mode in order to shift the operation state of the own processor to the twin mode (S224).

If the second mode permitting the twin mode in the duplex communication is set, the CPU starts generation and transmission of the TL frame by the second data input/output module 20, changes the operation state OS of the system to the twin mode in the duplex communication, and starts operation in the duplex communication (S225).

Note that in the case of duplex communication, the second data input/output module 20 may, of course, read/write the waveform data from/to the TL frame completely in the same manner as the first data input/output module 10. However, only for the purpose of achieving the object to immediately shift to the single mode even when disconnection has occurred at a portion of the ring to maintain continuous transmission of waveform data among nodes, dummy waveform data may be provided in the TL frame and the second data input/output module 20 does not have to read/write waveform data from/to the TL frame. Even in this case, however, it is preferable that the second data input/output module 20 reads/writes data from/to the control data region 104 for transport of Ethernet frames and ITL frames.

If the third mode permitting the twin mode in the double communication is set at Step 224, the CPU starts generation and transmission of the TL frame and reading/writing of the waveform data from/to the TL frame by the second data input/output module 20, changes the operation state OS of the system to the twin mode in the double communication, and starts operation in the double communication (S226).

In this case, the number of transmission channels of the waveform data is doubled, but if the reading/writing of the waveform data relating to the increased channels has been set, the second data input/output module 20 only needs to operate according to the setting, or if the setting has not been set yet, dummy data will be written in the waveform data region 103 in the TL frame generated by the second data input/output module 20 at the moment.

If the first mode not permitting the twin mode is set at Step 224, the CPU performs error process (S227). In the case where the single mode is set, if the operation of the system is normal, logic connection is not performed because the result of the process at Step S63 in FIG. 12 is NO even if the nodes at both ends of the cascade connection are physically connected to each other, so that two transmission routes for the twin mode will not be formed. Accordingly, in this case, it is conceivable that some abnormality has occurred in the operation of the system, and therefore the CPU preferably warns the user of the abnormality.

In this case, since the operation can be more or less continued even in the state where only the first data input/output module 10 generates and transmits of TL frames, it is conceivable that the CPU transmits, to one of the plural nodes connected in loop, a command to break the logic connection on one side of the node to thereby shift the operation state of the system back to the single mode. When branching to Step S227 repeatedly occurs, the CPU preferably resets the system once to reconstruct the logic connection.

In the audio network system 1, the master node performs the above process, whereby when two transmission routes for the twin mode are formed among nodes, the system can automatically and immediately shift to the operation in the twin mode in a short time such as one sampling period to several sampling periods (in two or three sampling periods, or five or six sampling periods or shorter) without waiting for the notification from the node which is newly connected.

Note that when the master node shifts to the operation in the twin mode, the slave node also automatically senses the shift by the operation state OS of the system written in the TL frame and starts the operation in the twin mode, and process for that will be described in the next section.

3.4 Handling of TL Frame in Slave Node

As has been described using FIG. 6 and FIG. 8, each node operating in the RTL mode in the audio network system reads the data to be processed by the node from the TL frame, and writes the data to be transmitted to the other processors, into the TL frame.

Next, process relating to transmission/reception of the TL frame in the slave node will be described. This process is executed regarding the reception I/F on one side in the slave node in the case where the operation state of the system is the single mode or the twin mode in the duplex communication, and executed regarding the reception I/Fs on both sides in the slave node for the twin mode in the double communication.

For simplification of explanation, it is assumed that each node reads/writes data from/to the TL frame (having a predetermined ring ID) proceeding in a direction from the backward side to the forward side in the node in the single mode or the twin mode in the duplex communication. Such a configuration is important to ensure normal operation in consideration of smooth shift from/to the single mode to/from the twin mode, but is not necessary in consideration of only the operation in the single mode.

Figure 32:
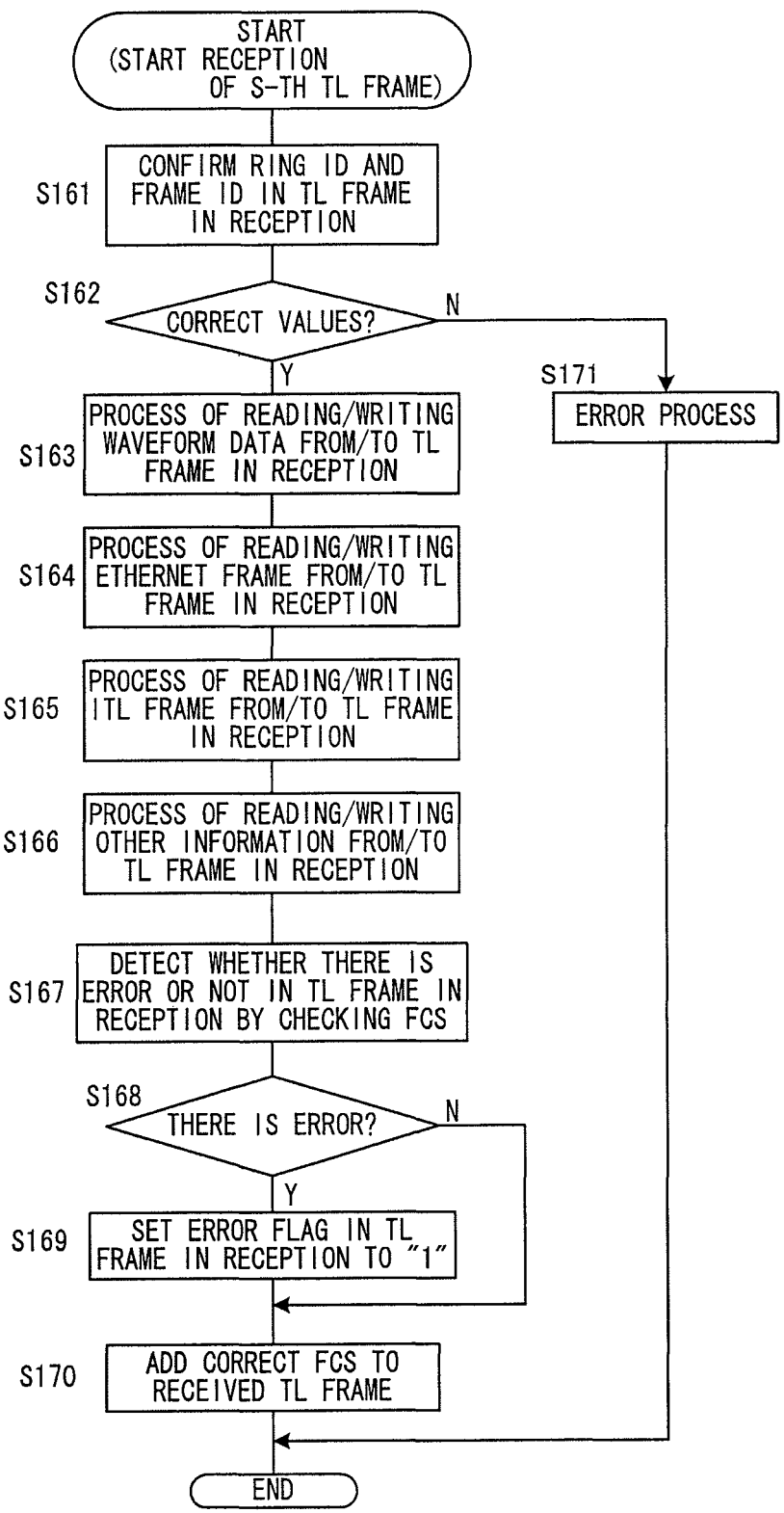
FIG. 32 is a flowchart of process executed when the slave node detects start of reception of the S-th TL frame.

FIG. 32 shows a flowchart of process executed when the slave node detects start of reception of the S-th TL frame.

The CPU of the controller 40 in the slave node starts the process shown in FIG. 32 when it detects the start of reception of the S-th TL frame. The CPU firstly confirms and stores the ring ID and the frame ID written as the management data in the TL frame in reception (S161) and judges whether or not the TL frame may be processed (S162).

The frame ID having a number consecutive to that of the preceding TL frame is correct, and the CPU naturally judges it as being the TL frame which may be processed. The CPU judges the TL frame having a number within a predetermined range after the number of the preceding TL frame also as the TL frame which may be processed because the TL frame after one or more TL frames are missed due to disconnection or the like should be received.

The ring ID that is the ID of the transmission route in which the reception I/F received the TL frame is included among one or two transmission routes formed in the system indicates that the TL frame having that ring ID may be processed. Note that when the ring ID is the ID specifying the system as well as the transmission route, the CPU preferably judges that the ring ID written in the TL frame is correct, if the ring ID specifies the system in which the own node is included (does not specify another system) in addition to the aforesaid conditions.

When the CPU judges that the TL frame may be processed, the CPU performs read and write process of the waveform data, the Ethernet frame, the ITL frame and other information from/into the received TL frame (S163 to S166).

Note that as has been described for FIG. 8, the slave node performs reading/writing of data from/into the received TL frame and also starts transmission of the received TL frame after the reading/writing to the next node without waiting for completion of reception of the whole TL frame. Accordingly, the reading/writing processes at Steps S163 to S166 are executed at appropriate timings according to the advance of the reception of the frame, and are not always performed according to the order described in the flowchart. The data to be read from the frame and written into the frame is as has been described using FIG. 8. Further, the transmission of the frame to the next node is started and advanced when a predetermined amount of the frame data is accumulated, independently of the process in FIG. 32.

Therefore, whether there is an error or not in the TL frame cannot be grasped at a time of reading/writing data from/to the TL frame in the slave node and, such a case is addressed by later-described process shown in FIG. 32.

After Step S166, when the CPU receives the FCS of the TL frame, the CPU detects whether there is an error or not in the TL frame in reception by checking the FCS (S167). If there is an error (S168), the CPU sets the error flag EDF in the TL frame in reception to "1" indicating that there is an error (S169). If there is an error here, the CPU finds that accuracy of the data written in the received TL frame is not guaranteed. However, accuracy of the data written by the slave node itself into the TL frame and outputted is guaranteed because the data is overwritten on the not guaranteed original data.

On the other hand, if there is no error at Step S168, the CPU does not change the value of the error flag EDF, and if "1" is set as the value of the error flag EDF, the CPU keeps the value unchanged. This is because the error flag EDF is a flag indicating whether or not an error has occurred even once during circulation of the TL frame.

In either case, the CPU finally adds a correct FCS to the received TL frame (S170) and ends the process. By referring to the added the FCS, the transmission destination node will recognize that there is no error in the frame outputted from the node which added the FCS. However, when the value of the error flag EDF is "1", it can be found that an error has occurred at some location from the master node to the own node.

By executing the above-described process, the slave node can read/write necessary data from/to the TL frame by the time when the slave node transmits the received TL frame to the next node.

On the other hand, if the ID does not have the correct value at Step S162, the CPU of the controller 40 performs the predetermined error process (S171) but performs no process on the received TL frame and lets the TL frame just flash the slave node. Therefore, the CPU just ends the process in FIG. 32.

Though illustration is omitted, the CPU in the slave node reads the operation state OS of the system written in the received TL frame, and changes the operation state of the own processor according to the read operation state OS of the system if the read operation state is different from the operation state currently recognized.

For example, when the CPU reads the OS indicating the twin mode in the double communication during operation in the single mode, the CPU shifts the own processor to the state of performing frame transport in the twin mode in the double communication such that the CPU causes also the data input/output module which does not perform reading/writing of the waveform data in the single mode to read/write the waveform data, changes formulas used for later-described timing adjustment of the wordclock to the formulas for the twin mode, and judges at Step S162 assuming that the first data input/output module and the second data input/output module are included in the transmission routes having different ring IDs, and so on.

Also when the CPU reads the OS indicating the twin mode in the duplex communication, the process is almost the same as above, but the change of operation of the data input/output modules is unnecessary if only one data input/output module reads/writes the waveform data in the duplex communication.

Conversely, when the CPU reads the OS indicating the single mode during operation in the twin mode in the double communication or the duplex communication, the CPU shifts the own processor to the state of performing frame transport in the single mode such that the CPU stops the reading/writing of the waveform data at the data input/output module which does not read/write the waveform data in the single mode, changes formulas used for later-described timing adjustment of the wordclock to the formulas for the single mode, and judges at Step S162 assuming that the first data input/output module and the second data input/output module are included in the transmission routes having the same ring ID and so on.

At the shift from the twin mode in the double communication to the single mode among the aforesaid mode shifts, it is necessary to immediately stop the reading/writing of the waveform data. This is because if data is written into the TL frame in the data input/output module which is not to be used in the operation in the single mode, the data to be transmitted will be erased by overwriting.

Therefore, regarding the shift from the twin mode in the double communication to the single mode, it is preferable that the shift is immediately performed by dedicated hardware. The hardware is realized, for example, by providing, apart from the CPU of the controller 40, a circuit which monitors the operation state OS of the system in the received TL frame and stops the reading/writing of the waveform data in one of the data input/output modules when the shift from the twin mode in the double communication to the single mode becomes necessary.

It is acceptable with no problem that the other shift operations are performed through the process executed by the CPU of the controller 40, because speeding up of them is not strongly demanded.

Figure 33:
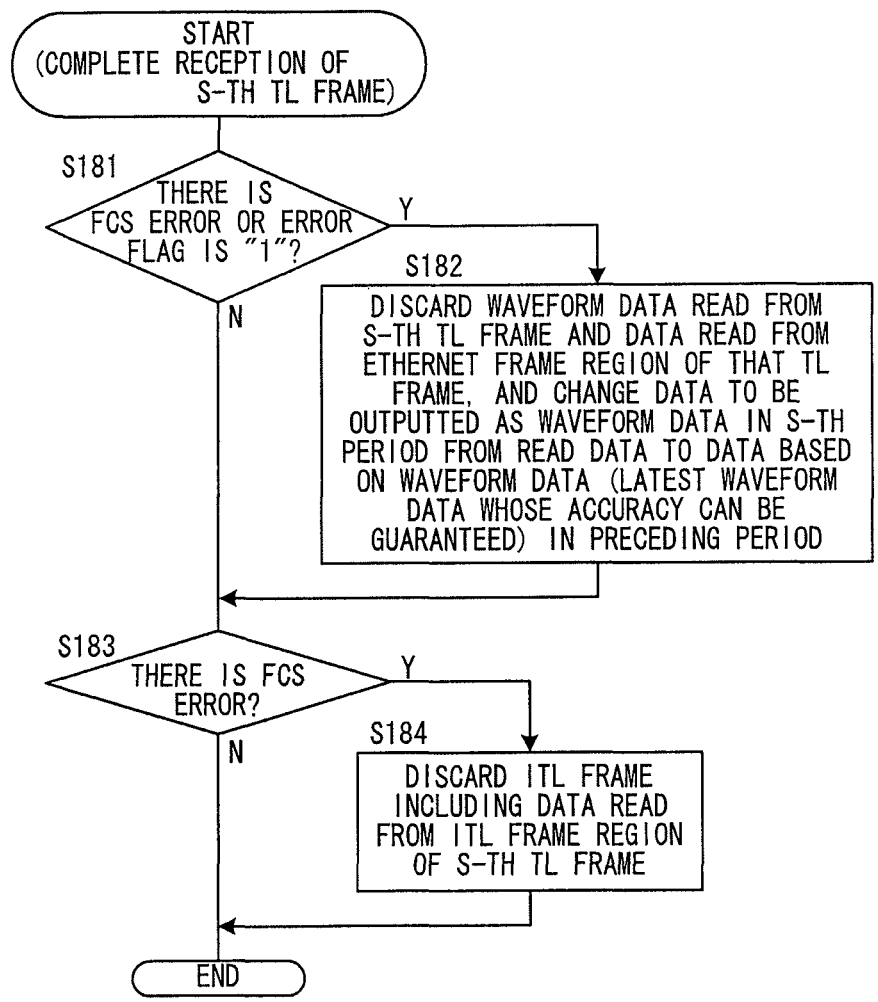
FIG. 33 is a flowchart of process executed when the slave node detects completion of reception of the S-th TL frame.

Next, FIG. 33 shows a flowchart of process executed when the slave node detects completion of reception of the S-th TL frame.

This process is for deciding whether or not data read from the received TL frame is used, according to the result of error check of the received TL frame. The CPU of the controller 40 in the slave node starts the process shown in FIG. 33 when it detects completion of reception of the S-th TL frame.

If there is an FCS error or the value of the error flag EDF is "1" (S181), the CPU recognizes that accuracy of the waveform data read from the S-th TL frame and the data read from the Ethernet frame region of the TL frame are not guaranteed. Therefore, the CPU discards the data and changes the data to be outputted as the waveform data in the S-th period from the read data to the data based on the waveform data in the preceding period (the latest waveform data whose accuracy can be guaranteed) (S182).

When there is an FCS error (S183), the CPU recognizes accuracy of the data read from the ITL frame region 107 of the S-th TL frame is not guaranteed. Therefore, the CPU discards the ITL frame including the data (S184). This is because, in the case where the ITL frame is divided into a plurality of blocks and written into ITL frame regions 107, if accuracy of only one of the blocks of data is not guaranteed, accuracy of the whole ITL frame is not guaranteed.

This is the end of the process in FIG. 33.

By executing the above process, even if the slave node reads/writes data from/to the received TL frame before confirming whether there is an error or not in the TL frame, the slave node can exclude the error data even after the reading/writing, from the TL frame for subsequent process.

If there is no FCS error, accuracy of the data in the ITL frame region 107 is guaranteed even if the value of the error flag EDF is "1." This is because when the data to be read by the own node is written in the ITL frame region 107, the node which wrote the data is the immediately preceding node, and the FCS guarantees that no transport error has occurred between the immediately preceding node and the own node.

4. Timing Adjustment of Wordclock

As has been described, in the audio network system 1, the master node generates a wordclock for transmission and defines the transmission timing of the TL frame based on the wordclock for transmission. The slave node generates a wordclock with reference to the reception timing of the TL frame to thereby obtain a wordclock for transmission in the same period as that of the master node.

The wordclock for transmission generated by this method, however, will be different in phase in each node, and if the configuration of the audio network system 1 is changed due to addition of nodes, disconnection, or the like, the reception timing of the TL frame in each node varies, whereby the period fluctuates.

Hence, in the audio network system 1, a function of adjusting the timing of the wordclock is provided to match the phases of the wordclocks in the nodes with each other and prevent the clocks from fluctuating even if the configuration of the system is changed so that the wordclock after the adjustment is used as the wordclock for signal processing which is the reference of the timing of signal processing.

Figure 35:
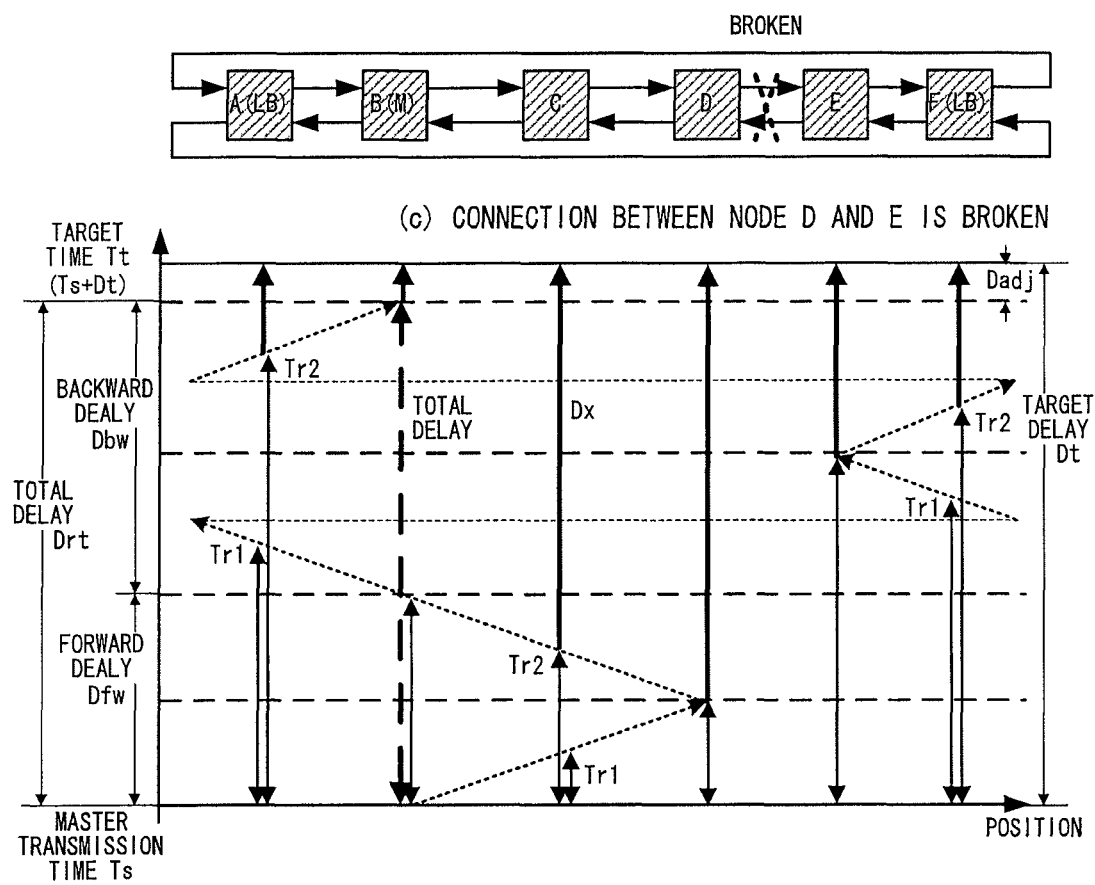
FIG. 35 is an illustration showing another example thereof.

The arrival timing of the head of the TL frame at each of the nodes constituting the audio network system is shown in FIG. 34 and FIG. 35. (a) in FIG. 34 shows an example of a system composed of six cascaded nodes A to F and operating in the single mode with the node B among the six nodes serving as a master node, and (b) in FIG. 34 shows an example of the system in which the node A and the node F at both ends were newly connected to each other and the system shifted to the operation in the twin mode in the loop connection, and (c) in FIG. 35 shows an example of the system in which a break of wire has occurred between the node D and the node E among the six nodes and the system shifted to the operation in the single mode in the cascade connection with the node D and the node E located at both ends.

The arrival timing of the TL frame is shown by a broken arrow in the drawings, and one TL frame passes through each node twice with a time difference therebetween in one sampling period except the nodes at both ends in the single mode as is clear from (a) in FIG. 34 and (c) in FIG. 35. Further, it is conceivable that the TL frame also passes through each of the nodes at both ends twice with the time difference therebetween being (almost) zero. The time at which the slave node receives the TL frame for the first time among the two passages shall be a first reception time Tr1, and the time at which the slave node receives the TL frame for the second time among the two passages shall be a second reception time Tr2. It is conceivable that Tr1=Tr2 for the nodes at both ends.

A forward delay Dfw is a time period from when the master node transmits a TL frame to the forward side at a transmission time Ts till when the TL frame returns to the master node for the first time. A backward delay Dbw is a time period from when the TL frame has returned to the master node for the first time and the master node then transmits the TL frame to the backward side till when the TL frame returns to the master node for the second time. Accordingly, Dfw+Dbw is a total delay Drt that is the time period required for the TL frame to circulate through the transmission route. Note that if the master node is located at an end of the audio network system 1, one of Dfw and Dbw (the delay on the side where no node is connected thereto) may be zero.

On the other hand, as is clear from (b) in FIG. 34, two TL frames pass through the slave node once each in opposite directions, twice in total, in one sampling period in the twin mode. The TL frame in which direction passes through the slave node earlier depends on the positional relation between the slave node and the master node. Also in this case, however, the slave node receives the TL frame twice in one sampling period as in the single mode, and therefore the time at which the slave node receives the TL frame for the first time shall be the first reception time Tr1, and the time at which the slave node receives the TL frame for the second time shall be the second reception time Tr2.

Further, the time period from when the master node transmits a TL frame till when the TL frame returns to the master node should be the same in both cases of the master node transmitting the TL frame to the forward side and transmitting to the backward side, because the TL frame returns to the master node passing through the communication cable of the same distance and the same number of nodes in both of the cases. Accordingly, assuming that a time period from when the master node transmits a TL frame to the forward side at a transmission time Ts till when the TL frame returns to the master node is the forward delay Dfw, a time period from when the master node transmits a TL frame to the backward side till when the TL frame returns to the master node is the backward delay Dbw, and a time period required for the TL frame to circulate through the transmission route is the total delay Drt as in the single mode, Drt=Dfw=Dbw.

In the audio network system 1, the timing of the wordclock used in signal processing is adjusted to a target time Tt by conducting control according to a target delay Dt in all of the nodes assuming that the transport of the TL frame as described above is performed respectively in the single mode and the twin mode.

Such timing adjustment of the wordclock is performed by the wordclock generator 41 of the network I/F card 215.

Figure 36:
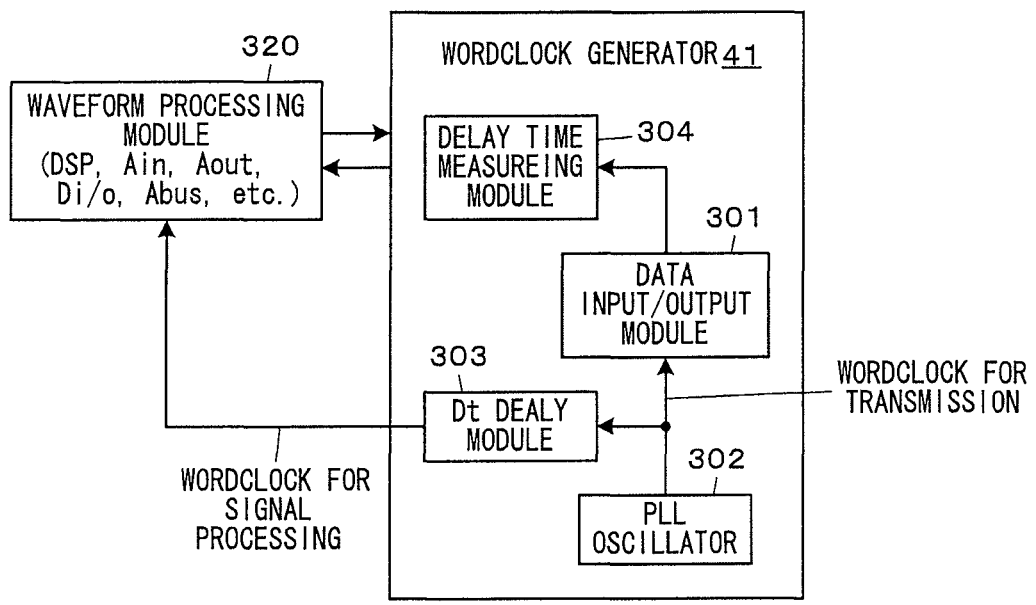
FIG. 36 is a diagram showing the configuration of the wordclock generator in the master node.
Figure 37:
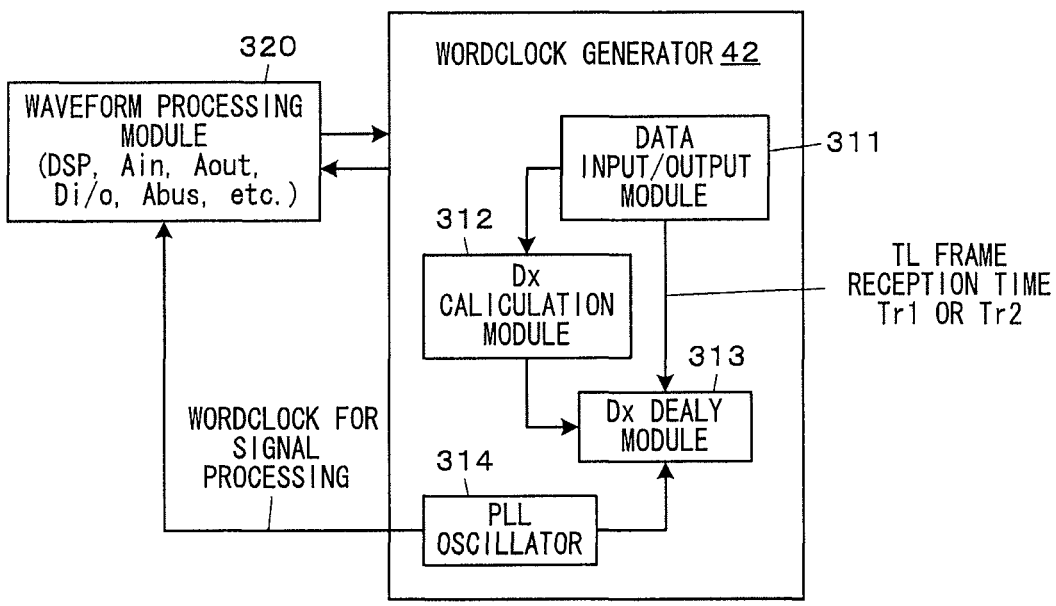
FIG. 37 is a diagram showing the configuration of the wordclock generator in the slave node.

The configuration of the wordclock generator 41 is shown in FIG. 36 and FIG. 37. FIG. 36 shows the configuration in the master node, and FIG. 37 shows the configuration in the slave node.

In the master node, a PLL (Phase Locked Loop) oscillator 302 shown in FIG. 36 generates a wordclock (WC) for transmission with the same frequency as the sampling frequency (the reciprocal of the sampling period) of the waveform data, and supplies the wordclock for transmission to a data input/output module 301 as a signal indicating the transmission time Ts. The data input/output module 301 collectively shows the first and second data input/output modules 10 and 20 shown in FIG. 8. In the single mode, only the first data input/output module 10 firstly transmitting the TL frame in each sampling period transmits the TL frame in synchronization with the wordclock for transmission, and thus it is enough to supply the wordclock for transmission only to the first data input/output module 10.

A waveform processing module 320 shows the signal processing module in each of other cards connected to the audio bus 217, and the wordclock for signal processing supplied to the waveform processing module 320 is a wordclock common in the cards including the network I/F card 215. The waveform processing module 320 corresponds to a part of the upper layer connected to the upper layer I/F 70 in FIG. 8.

A Dt delay module 303 in the drawing shows here that there is a timing difference corresponding to the delay amount Dt shown in Formula 1 between the wordclock for transmission and the wordclock for signal processing. The delay amount Dt is a constant that is previously set by the process in FIG. 15 when the system in the RTL mode is formed and transmitted from the master node to all of the nodes in the system. The transmission of the delay amount Dt can be performed by the ITL frame.

$$\text{Target Delay } Dt = \text{Target Time } Tt - \text{Master Transmission Time } Ts = \begin{cases} Dfw + Dbw + Dadj & \ldots \text{ in Single Mode Operation} \\ Dfw + Dadj & \ldots \text{ in Twin Mode Operation} \end{cases} \quad \text{Formula 1}$$

Generation of the wordclock for transmission by the PLL oscillator 302 can be performed according to the original timing when the network I/F card 215 is a clock master, or in synchronization with the wordclock supplied from another card via the audio bus 217 when that another card is a clock master.

In the former case, the wordclock generator 41 delays the wordclock for transmission generated by the PLL oscillator 302 by Dt in the Dt delay module 303 to thereby generate the wordclock for signal processing. In the latter case, the PLL oscillator 302 generates the wordclock for signal processing, and therefore the wordclock generator 41 can generate the wordclock for transmission in a phase preceding to the wordclock for signal processing by the delay amount Dt, by delaying the wordclock for signal processing by (the sampling period minus the delay amount Dt). In either case, there will be a timing difference corresponding to the delay amount Dt between the wordclock for transmission and the wordclock for signal processing.

The wordclock for signal processing should originally be the wordclock obtained by delaying the wordclock for transmission, and the reason why the wordclock for signal processing may be delayed to form the wordclock for transmission in an opposite manner is that the frequencies of the wordclocks vary very slowly and there is no or little difference in period length between the preceding period and the subsequent period.

A delay time measuring module 304 is a first measuring device measuring the forward delay Dfw and the backward delay Dbw based on the transmission/reception timing of the TL frame at the data input/output module 301. The data of the forward delay and the backward delay is written in the region of the management data 102 in the TL frame of each sampling period as the reference data that is used for reference of the timing of the wordclock for signal processing and sent to the other nodes in the system.

As has been described using FIG. 27, the master node generates the (S+2)-th TL frame based on the received S-th TL frame. However, the data of the delay time of the (S+1)-th TL frame should be obtained before the start of transmission of the (S+2)-th TL frame by measuring the delay time with reference to the head of the TL frame, so that the master node preferably writes the data of the delay time and the operation state OS of the system at that moment into the (S+2)-th TL frame waiting for transmission before starting transmission of the TL frame. This enables the master node to immediately transmit the data of the delay time to slave nodes to cause wordclocks in the slave nodes to successively follow the wordclock in the master node.

Next, as shown in FIG. 37, in the slave node, a timing signal generated at receiving the TL frame detected by a data input/output module 311 is basically inputted into a PLL oscillator 314 which stabilizes the period of the timing signal to generate the wordclock for signal processing. In this event, a DX delay module 313 delays the received timing signal by an amount corresponding to the data of the delay time written in the TL frame, whereby the timing to supply the timing signal to the PLL oscillator 314 (the target time Tt) does not vary even if the reception timing of the TL frame at the slave node varies due to an increase/decrease in the number of nodes and the change of the transmission route between the single mode and the twin mode in the audio network system.

The delay amount Dx in this event can be found in a Dx calculation module 312 by measuring the two reception times Tr1 and Tr2 while the TL frame in one sampling period circulates through the transmission route(s) and using the values of the reception times Tr1 and Tr2 as well as the forward delay Dfw, the backward delay Dbw and the operation state OS of the system read from the TL frame, and the target delay Dt previously notified from the master node (an adjustment delay Dadj may be employable) and using any one of Formula 2 to Formula 4 depending on the operation state OS and the position of the node. Note that Tr1 and Tr2 indicate two reception times of one TL frame in the single mode, whereas they indicate one reception time of each of the two TL frames transmitted through different transmission routes in the twin mode. The adjustment delay Dadj can be found by Formula 5.

Formula 2:
Formulas to Calculate Delay Dx in Node on Forward Side in Single Mode Operation $$Dx = Dbw + (Dfw - (Tr2 - Tr1))/2 + Dadj \quad \text{Delay from Tr2}$$
$$= Dt - (Dfw + (Tr2 - Tr1))/2$$

$$Dx = Dbw + (Dfw + (Tr2 - Tr1))/2 + Dadj \quad \text{Delay from Tr1}$$
$$= Dt - (Dfw - (Tr2 - Tr1))/2$$

Formula 3:
Formulas to Calculate Delay Dx in Node on Backward Side in Single Mode Operation $$Dx = (Dbw - (Tr2 - Tr1))/2 + Dadj \quad \text{Delay from Tr2}$$
$$= Dt - Dfw - (Dbw + (Tr2 - Tr1))/2$$

$$Dx = (Dbw + (Tr2 - Tr1))/2 + Dadj \quad \text{Delay from Tr1}$$
$$= Dt - Dfw - (Dbw - (Tr2 - Tr1))/2$$

Formula 4:
Formula to Calculate Delay Dx in All Nodes in Twin Mode Operation $$Dx = (Dfw - (Tr2 - Tr1))/2 + Dadj \quad \text{Delay from Tr2}$$
$$= Dt - (Dfw + (Tr2 - Tr1))/2$$

$$Dx = (Dfw + (Tr2 - Tr1))/2 + Dadj \quad \text{Delay from Tr1}$$
$$= Dt - (Dfw - (Tr2 - Tr1))/2$$

Total Delay $Drt =$      Formula 5

$$\begin{cases} \text{Forward Delay } Dfw + \\ \text{Backward Delay } Dbw \end{cases} \ldots \text{in Single Mode Operation}$$
$$\begin{cases} \text{Forward Delay } Dfw \\ (= \text{Backward Delay } Dbw) \end{cases} \ldots \text{in Twin Mode Operation}$$

In Formulas 2 and 3, the node on the forward side means the node through which the TL frame passes from being transmitted from the master node until returning to the master node for the first time, and the node on the backward side means the node through which the TL frame thereafter passes until returning to the master node for the second time. Further, the signal supplied to the Dx delay module 313 as the reference of delay may be the timing signal generated at the time Tr1 or may be the timing signal generated at the time Tr2 in the case of using Formulas 2 and 3 as well as Formula 4.

Figure 38:
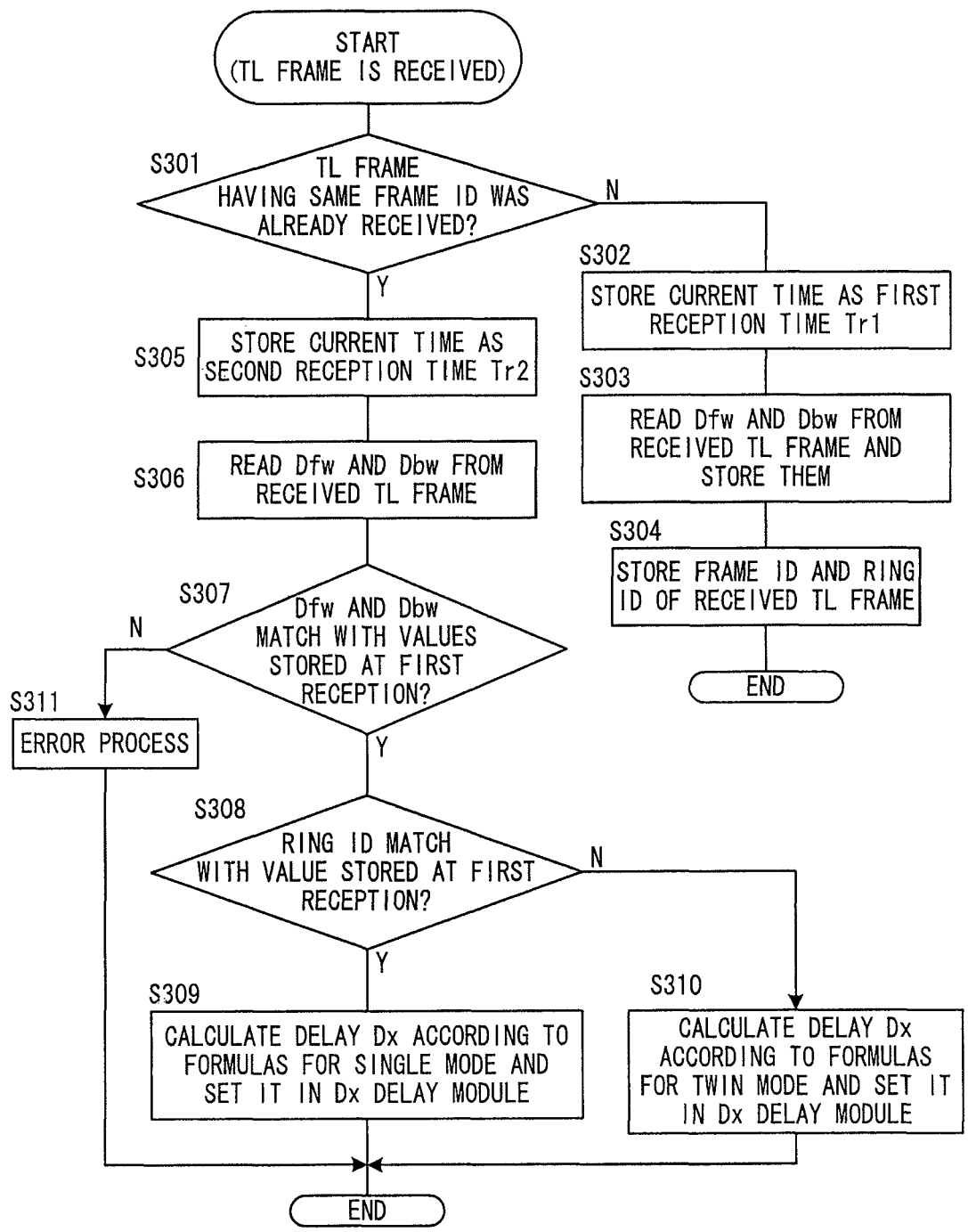
FIG. 38 is a flowchart of process executed by the Dx calculation module when one of the reception I/Fs receives the TL frame in the slave node.

FIG. 38 shows a flowchart of process executed by the Dx calculation module 312 to set Dx.

The process in FIG. 38 is executed by the Dx calculation module 312 when one of the reception I/Fs receives the TL frame. This process is executed irrespective of whether or not the frame process module 220 reads/writes waveform data from/to the received TL frame.

In the process in FIG. 38, the Dx calculation module 312 first judges whether or not the data input/output module already received a TL frame having the same frame ID (a TL frame of the same sampling period) as that of the received TL frame (S301). If the audio transport frame has not been received yet, the Dx calculation module 312 finds that the TL frame is received for the first time in that sampling period, and therefore stores the current time as the first reception time Tr1 (S302), reads Dfw and Dbw from the received audio transport frame and stores them (S303), stores the frame ID and the ring ID of the received TL frame (S304) and ends the process. The data stored at Step S304 is used for the judgment at Step S301.

On the other hand, when the TL frame having the same frame ID has already been received at Step S301, the Dx calculation module 312 finds that the reception of the TL frame this time is the second reception in the sampling period, and therefore stores the current time as the second reception time Tr2 (S305), and reads Dfw and Dbw from the received TL frame (S306).

Then, the Dx calculation module 312 performs error process (S307 and S311) if the values of Dfw and Dbw do not match with the values stored at Step S303, but the Dx calculation module 312 proceeds to Step S308 in order to decide Dx if they have a match.

Then, the Dx calculation module 312 judges whether or not the ring ID matches with the value stored at Step S304 at the first reception (S308). If there is a match at Step S308, the Dx calculation module 312 finds that the same TL frame arrived twice at the own node, and therefore judges that the current mode is the single mode, calculates the delay amount Dx according to Formula 2 or Formula 3 for the single mode and sets the delay amount Dx in the Dx delay module 313 (S309), and ends the process. On the other hand, there is no match at Step S308, the Dx calculation module 312 finds that the TL frames on the two transmission routes separately arrive at the own node, and therefore judges that the current mode is the twin mode, calculates the delay amount Dx according to Formula 4 for the twin mode and sets the delay amount Dx in the Dx delay module 313 (S310), and ends the process.

The timing signal supplied to the Dx delay module 313 is delayed by the set delay amount Dx and supplied from the Dx delay module 313 to the PLL oscillator 314 at the timing of the time Tt. The PLL oscillator 314 uses the timing signal supplied from the Dx delay module 313 in each sampling period as the reference signal to generate the wordclock (WC) for signal processing that is almost the same in frequency as, more stable than, and almost the same in phase as the timing signal.

As in the above manner, the wordclock for signal processing is generated at almost the same timing as the target time Tt in either of the master node and the slave node. Further, as described above, since the network I/F card 215 is the master of the audio bus 217 in the slave node, the other cards of the card I/O generate wordclocks in synchronization with the wordclock for signal processing respectively.

The above timing adjustment is similarly performed even when the configuration of the system is changed due to removal of the existing node during execution of signal processing or addition of a new node or when the operation state of the system changes between the single mode and the twin mode. In this case, the individual values of Dfw, Dbw, Tr1 and Tr2 vary according to the configuration and the operation state of the system, but if there is no fluctuation in the wordclock outputted by the master node and the target delay Dt is constant, the wordclock at the timing made by delaying the wordclock for transmission of the master node by Dt can be obtained with good accuracy in all of the nodes by adjusting the value of the delay time Dx using the measured values at that time in each of the slave nodes. Accordingly, even if Dfw, Dbw, Tr1 and Tr2 greatly vary, the fluctuation of the wordclock can be suppressed and the phases of the wordclocks in the nodes can be matched with each other.

In order to normally operate the system, the target delay Dt has to be larger than the total delay Drt at all times. For example, when the system can operate with the periodic update value k being "2", the total delay Drt is about one sampling period or less even if it varies, so that the target delay Dt is preferably set to a value slightly larger than the total delay Drt.

Alternatively, if the target delay Dt is set to just one period of the wordclock, the signal before delay by the Dt delay module 303 and the signal after the delay are in the same phase in the master node, so that even if delay is not performed, the signal substantially the same as that when delay has been performed can be supplied to the waveform processing module 320. Therefore, the Dt delay module 303 can be omitted in this case.

Though the transmission/reception timing is measured with reference to the head of the TL frame here, another position may be used as a reference. However, it is preferable to use the head of the TL frame as a reference because its position is apparent and the process can be simplified.

When the operation state of the system changes, the transmission period may fluctuate for about two sampling periods until the transport of the TL frame is appropriately performed in the new operation state. Therefore, in such a case, the output of the Dx delay module 313 of the slave node may be stopped so that the period of the wordclock for signal processing is held until the value of Dx can be stably calculated. Alternatively, the output of the Dx delay module 313 of the slave node may be stopped when all of the values of Dfw, Dbw, Tr1, Tr2 and so on are not prepared to fail to calculate Dx.

Alternatively, for the positional relation between the Dx delay module 313 and the PLL oscillator 314, the reception timing of the TL frame may be supplied first to the PLL oscillator 314 to generate a clock signal, and then the clock signal may be delayed by the Dx delay module 313 to generate the wordclock for signal processing.

Further, it is conceivable for the arrangement of the PLL oscillators 302 and 314, the Dt delay module 303, and the Dx delay module 313 that they are provided outside the network I/F card 215.

In the twin mode, it is not essential for the master node to write the forward delay Dfw and the backward delay Dbw into the TL frame in both the first and second data input/output modules 10 and 20. Only to transmit the data to the slave node, it is enough for the master node to write the data into the TL frame in one of the first and second data input/output modules 10 and 20. In this case, the processes at Step S306 and S307 in FIG. 38 in the slave node are just omitted.

5. Modifications

The explanation of the embodiments comes to an end, and it is of course that the configuration of processor, the configuration of data, concrete process steps, and so on are not limited to those in the above-described embodiments.

Further, it is not essential to circulate one TL frame through one transmission route in one sampling period, but it is also conceivable to circulate a plurality of TL frames in one sampling period, or to circulate one TL frame in a plurality of sampling periods (constant time length) into which, for each channel, plural samples of waveform data corresponding to the plurality of sampling periods are written.

Although the explanation has been made such that the master node and the slave node are different in function in the above-described embodiments, each processor cannot recognize which processor becomes the master node until the audio network system is actually constituted. Hence, each processor is preferably configured to be able to function selectively as the maser node or as the slave node so that each processor can enables an appropriate function depending on whether or not the processor decides that the processor itself functions as the master when it shifts to the TTL mode, or the processor has received the designation to be the master in the RTL mode by the OM command. However, it is also adoptable that even a processor which is not provided with the function of the master node can be incorporated into the system, the processor does not automatically become the master (including the temporary master), and the processor cannot be designated as the master. In this case, even if the master cannot be decided for this reason, it is only necessary to inhibit the processor from shifting from the ITL mode to the TTL mode.

It is of course possible to change the ratio of the waveform data to the control data in the TL frame. The size of either region could be reduced to 0.

In addition to the above, the periodic update value k is a variable value in the above-described embodiments, and may also be a fixed value. In this case, the upper-limit time corresponding to the periodic update value k is also a fixed value, and the number of nodes which can be added to the system is limited by that upper-limit time.

The various kinds of frames including the TL frame are not limited to the IEEE 802.3 format but may be in any other format.

Although the sampling frequency is 96 kHz in the above-described embodiments, the system can be designed with any frequency such as 88.2 kHz, 192 kHz, or the like. The system may be designed such that the sampling frequency can be switched.

These modifications and the modifications described in the explanation of the embodiments are applicable in any combination in a range without contradiction. Inversely, it is not always necessary for the network system and the audio signal processor to have all of the features which have been described in the explanation of the embodiments.

As is clear from the above description, the network system or the audio signal processor of the invention makes it possible for a network system in which an audio transport frame generated by a master node and including a plurality of storage regions for audio signals circulates along a loop transmission route formed among nodes to transport audio signals among the series of connected nodes, to shift by a simple and high-speed process from/to a state in which one transmission route for the audio transport frame is formed and a frame circulates through the transmission route to/from a state in which two transmission routes for the audio transport frame are formed and frames circulate through the transmission routes respectively.

Further, the network system or the audio signal processor of the invention makes it possible for a network system, in which an audio transport frame generated by a master node and including a plurality of regions for audio signals circulates along a loop transmission route formed among nodes to transport audio signals among the series of connected nodes, such that even when the nodes constituting the system are connected in a loop form to form two transmission routes for the audio transport frame and frames circulate through the transmission routes respectively, a timing of a wordclock can be stably transmitted using the same transmission route as that for the audio signals.

Accordingly, application of the invention can improve convenience of the network system.

What is claimed is:

1. A network system comprising a series of a plurality of connected nodes, each node having two interface sets of receivers and transmitters, each of the receivers and the transmitters performing communication in a single direction respectively, the plurality of nodes are connected in such a manner that one interface set including a receiver and a transmitter in one node is connected with one interface set including a transmitter and a receiver in a next node, respectively, in the series wherein each one node X in the series which receives a frame from one next node Y via the receiver in one interface set S1 in the node X, if the node X is positioned at the end of the series only the one interface set S1 of the two interface sets S1 and S2 in the node X is connected to the one next node Y, transmits the received frame back to the one next node Y via the transmitter in the one interface set S1 and, if the node X is positioned at the middle of the series the two interface sets S1 and S2 in the node X are connected to the one next node Y and another next node Z, transmits the received frame ahead to the another next node Z via the transmitter in another interface set S2 in the node X, thereby a ring transmission route is formed among said nodes connected in the series, one of the plurality of nodes operates as a master node which generates and transmits an audio transport frame at a constant period, the audio transport frame circulates along said formed ring transmission route at said constant period, said audio transport frame including a plurality of storage regions for audio signals, and each of said nodes writes audio signals to or reads audio signals from the audio transport frame to thereby transport the audio signals among said nodes connected in series, said master node operates in a single mode and in a twin mode, the master node in the single mode transmits the audio transport frame generated by the master node from the transmitter in one interface set SM1 among the two interface sets in the master node at said constant period, and the master node in the twin mode transmits two frames from the respective transmitters in the two interface sets in the master node at said constant period, at least one of said two frames including the audio transport frame generated by the master node, said master node comprises:
a first judging device that judges whether or not the master node receives, within a first predetermined time after transmitting an audio transport frame from the transmitter in said one set SM1, the audio transport frame by the receiver in the same set SM1;
a second judging device that judges whether or not the master node receives, within a second predetermined time after transmitting an audio transport frame from the transmitter in said one set SM1, the audio transport frame by the receiver in another set SM2; and
a mode shifting device that shifts the master node into the twin mode, if judgment by said first judging device is negative and judgment by said second judging device is positive.

2. The network system according to claim 1, wherein the master node comprising:
a first clock generator that generates a wordclock for transmission at constant period which indicates transmission timing of the audio transport frame;
a second clock generator that generates a wordclock for signal processing which corresponds to the wordclock for transmission delayed by a predetermined target delay;
a signal processor that processes audio signals in synchronization with the wordclock for signal processing; and
a writing device that writes a reference information for reproducing timing of the wordclock for signal processing into respective audio transport frames which the master node transmits,
each of the nodes other than the master node comprising:
a wordclock generator that generates a wordclock for signal processing with its phase almost same as that of the wordclock for signal processing generated in the master node, based on reception timing of the audio transport frames; and
a signal processor that processes audio signals in synchronization with the wordclock for signal processing generated by the wordclock generator of the node, and
wherein said wordclock generator in each of the nodes other than the master node generates its respective wordclock for signal processing, such that the phase of its wordclock for signal processing is suppressed from fluctuating even when operation of the master node shifts from the single mode to the twin mode.

3. The network system according to claim 1, wherein when a master node is newly determined in the network system or the whole network system is reset, the master node starts operation in said single mode.

4. The network system according to claim 1, wherein when two end nodes positioned at the ends of the series among the nodes are connected to each other and as a result the nodes constructing the network system are connected into a loop, the connected end nodes stop transmission of the frame received from the one next node Y back to the one next node Y and start transmission of the frame received from the one next node Y ahead to the another next node Z as nodes other than the end nodes in one to several cycles of said circulation, thereby two ring transmission routes each having opposite directions are formed among said nodes connected in the loop.

5. The network system according to claim 4, wherein while the master node operates in the twin mode, the master node generates one audio transport frame and transmits the generated one audio transport frame to each of the two ring transmission routes every period of said constant period, and each of the plurality of nodes writes audio signals to or reads audio signals from only the audio transport frame circulating along a predetermined one transmission route among the two ring transmission routes.

6. The network system according to claim 4, wherein while the master node operates in the twin mode, the master node generates two audio transport frames respectively corresponding to the two ring transmission routes and transmits each of the two generated audio transport frames to its respectively corresponding transmission route every period of said constant period, and each of the plurality of nodes writes audio signals to or reads audio signals from only the audio transport frame circulating along a predetermined one transmission route among the two ring transmission routes.

7. The network system according to claim 4, wherein while the master node operates in the twin mode, the master node generates two audio transport frames respectively corresponding to the two ring transmission routes and transmits each of the two generated audio transport frames to its respectively corresponding transmission route every period of said constant period, and each of the plurality of nodes writes audio signals to or reads audio signals from at least one of the two audio transport frames circulating along a predetermined one transmission route among the two ring transmission routes.

8. The network system according to claim 1, wherein an end node positioned at an end of the series among the nodes comprises a detector that detects connection with another node P newly provided at the receiver and the transmitter in interface set S2 other than said one interface set S1, and
when the detector detects the connection with said another node P, the end node automatically changes its operation from transmission of the frame received from the one next node Y back to the one next node Y to transmission of the frame received from the one next node Y ahead to the another node P.

9. The network system according to claim 1, wherein an error check code is included in the audio transport frame which the master node generates and which each of the other nodes receive, and each of the nodes other than the master node detects an error in the received audio transport frame based on the error check code included in the audio transport frame, and if the node detects an error in the received audio transport frame, the node prevents the audio signals read from the received audio transport frame from being outputted from the node.

10. An audio signal processor configured to function as the master node in the network system according to claim 1.

11. An audio signal processor configured to function selectively as the master node or as a first node among the plurality of nodes in the network system according to claim 1, wherein the first node is different from the master node.

* * * * *